United States Patent
Cohen

(10) Patent No.: US 10,869,434 B2
(45) Date of Patent: Dec. 22, 2020

(54) ELLIPTICAL IN LINE BUTTON DRIPPER WITH EXTENDED BONDING ZONES

(71) Applicant: Amirim Products Development & Patents Ltd., Doar-Na Misgav (IL)

(72) Inventor: Amir Cohen, Doar-Na Misgav (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 63 days.

(21) Appl. No.: 15/959,453

(22) Filed: Apr. 23, 2018

(65) Prior Publication Data
US 2018/0235161 A1 Aug. 23, 2018

Related U.S. Application Data

(63) Continuation-in-part of application No. 15/289,252, filed on Oct. 10, 2016, now Pat. No. 10,455,780, and a continuation-in-part of application No. 14/596,580, filed on Jan. 14, 2015, now Pat. No. 9,949,448, said application No. 15/289,252 is a continuation of application No. 13/937,294, filed on Jul. 9, 2013, now Pat. No. 9,462,760.

(51) Int. Cl.
*A01G 25/02* (2006.01)

(52) U.S. Cl.
CPC ........... *A01G 25/023* (2013.01); *A01G 25/02* (2013.01); *A01G 25/026* (2013.01); *Y02A 40/22* (2018.01)

(58) Field of Classification Search
CPC .... A01G 25/023; A01G 25/02; A01G 25/026; Y02A 40/237
See application file for complete search history.

(56) References Cited

U.S. PATENT DOCUMENTS

| | | | |
|---|---|---|---|
| 3,667,685 | A | 6/1972 | Rinkewich |
| 4,209,133 | A | 6/1980 | Mehoudar |
| 4,210,287 | A | 7/1980 | Mehoudar |
| 4,281,798 | A | 8/1981 | Lemelstrich |

(Continued)

FOREIGN PATENT DOCUMENTS

| | | |
|---|---|---|
| CN | 102933071 | 2/2013 |
| WO | WO 92/05689 | 4/1992 |

(Continued)

OTHER PUBLICATIONS

Applicant-Initiated Interview Summary dated Feb. 27, 2019 From the US Patent and Trademark Office Re. U.S. Appl. No. 15/289,252. (3 pages).

(Continued)

*Primary Examiner* — Tuongminh N Pham

(57) ABSTRACT

An in-line button drip emitter may include a core fitting into a cover. For example, the core may include a cylindrical section with an elliptical cross section. For example the cover may close over a pressure reducing labyrinth formed in the outer cylindrical sides of the core. Optionally the cover has a long axis which is parallel to the long axis of the cross section of the core. In some embodiments, the bonding surface has an arched profile. Optionally, the arched profile fits an inner wall of an irrigation tube. For example, an axis of the arched profile may be parallel to the long axis of the elliptical cross section of the core and/or the arched profile may be parallel to the axis of the cover.

7 Claims, 29 Drawing Sheets

(56) References Cited

U.S. PATENT DOCUMENTS

| | | | |
|---|---|---|---|
| 4,366,926 | A | 1/1983 | Mehoudar |
| 4,369,923 | A * | 1/1983 | Bron .................... B05B 1/3006 239/533.1 |
| 4,533,083 | A | 8/1985 | Tucker |
| 4,589,595 | A | 5/1986 | Havens |
| 4,850,531 | A | 7/1989 | Littleton |
| 5,137,216 | A | 8/1992 | Hanish |
| 5,183,208 | A | 2/1993 | Cohen |
| 5,279,462 | A | 1/1994 | Mehoudar |
| 5,294,058 | A | 3/1994 | Einav |
| 5,295,506 | A | 3/1994 | Smith |
| 5,443,212 | A | 8/1995 | Dinur |
| 5,636,797 | A | 6/1997 | Cohen |
| 5,820,028 | A | 10/1998 | Dinur |
| 6,027,048 | A | 2/2000 | Mehoudar |
| 6,206,305 | B1 | 3/2001 | Mehoudar |
| 6,250,571 | B1 | 6/2001 | Cohen |
| 6,302,338 | B1 | 10/2001 | Cohen |
| 6,481,645 | B1 | 11/2002 | Taylor-McCune et al. |
| 6,568,607 | B2 | 5/2003 | Boswell et al. |
| 6,698,629 | B2 | 3/2004 | Taylor-McCune |
| 7,270,280 | B2 | 9/2007 | Belford |
| 7,681,810 | B2 | 3/2010 | Keren |
| 8,141,589 | B2 | 3/2012 | Socolsky |
| 8,317,111 | B2 | 11/2012 | Cohen |
| 8,511,586 | B2 | 8/2013 | Einav et al. |
| 9,022,059 | B2 | 5/2015 | Cohen |
| 9,307,705 | B2 | 4/2016 | Akritanakis |
| 9,462,760 | B2 | 10/2016 | Cohen |
| 2005/0284966 | A1 | 12/2005 | DeFrank |
| 2009/0165879 | A1 * | 7/2009 | Socolsky ............. A01G 25/023 138/42 |
| 2009/0212135 | A1 | 8/2009 | Keren |
| 2010/0237170 | A1 | 9/2010 | Rosenberg et al. |
| 2012/0012682 | A1 | 1/2012 | Einav |
| 2012/0097254 | A1 * | 4/2012 | Cohen .................. A01G 25/023 137/1 |
| 2012/0267454 | A1 | 10/2012 | Einav et al. |
| 2013/0248616 | A1 | 9/2013 | Ensworth et al. |
| 2014/0246520 | A1 | 9/2014 | Einav |
| 2015/0012682 | A1 | 1/2015 | Yang et al. |
| 2015/0014446 | A1 | 1/2015 | Cohen |
| 2015/0289458 | A1 | 10/2015 | Cohen |
| 2016/0198643 | A1 | 7/2016 | Cohen |
| 2017/0020086 | A1 | 1/2017 | Cohen |
| 2017/0290277 | A1 | 10/2017 | Cohen |

FOREIGN PATENT DOCUMENTS

| | | |
|---|---|---|
| WO | WO 98/10635 | 3/1998 |
| WO | WO 99/33571 | 7/1999 |
| WO | WO 2011/092557 | 8/2011 |
| WO | WO 2012/015655 | 2/2012 |
| WO | WO 2012/038766 | 3/2012 |
| WO | WO 2015/004652 | 1/2015 |
| WO | WO 2016/113739 | 7/2016 |

OTHER PUBLICATIONS

Official Action dated May 8, 2018 From the US Patent and Trademark Office Re. U.S. Appl. No. 15/480,404. (18 pages).
Communication Pursuant to Article 94(3) EPC dated Nov. 14, 2019 From the European Patent Office Re. Application No. 14739568.5. (8 Pages).
Official Action dated Jul. 13, 2018 From the US Patent and Trademark Office Re. U.S. Appl. No. 15/289,252. (46 pages).
Translation Dated Jul. 14, 2019 of Notification of Office Action dated Jul. 5, 2019 From the State Intellectual Property Office of the People's Republic of China Re. Application No. 201680003742.7. (6 Pages).
Applicant-Initiated Interview Summary dated Jun. 23, 2017 From the US Patent and Trademark Office Re. U.S. Appl. No. 14/596,580. (3 pages).
Communication Relating to the Results of the Partial International Search dated Apr. 7, 2016 From the International Searching Authority Re. Application No. PCT/IL2016/050045.
Examination Report dated Mar. 14, 2017 From the Australian Government, IP Australia Re. Application No. 2014288784. (2 Pages).
International Preliminary Report on Patentability dated Apr. 20, 2017 From the International Preliminary Examining Authority Re. Application No. PCT/IL2016/050045. (21 Pages).
International Preliminary Report on Patentability dated Jan. 21, 2016 From the International Bureau of WIPO Re. Application No. PCT/IL2014/050586.
International Search Report and the Written Opinion dated Nov. 5, 2014 From the International Seaching Authority Re. Application No. PCT/IL2014/050586.
International Search Report and the Written Opinion dated Jun. 14, 2016 From the International Seaching Authority Re. Application No. PCT/IL2016/050045.
Notice of Allowance dated Dec. 21, 2017 From the US Patent and Trademark Office Re. U.S. Appl. No. 14/596,580. (19 pages).
Notification of Office Action and Search Report dated Sep. 28, 2017 From the State Intellectual Property Office of the People's Republic of China Re. Application No. 201480039100.3 and Its Summary in English. (14 Pages).
Official Action dated Jan. 13, 2016 From the US Patent and Trademark Office Re. U.S. Appl. No. 13/937,294.
Official Action dated Jul. 16, 2015 From the US Patent and Trademark Office Re. U.S. Appl. No. 13/937,294.
Official Action dated May 17, 2017 From the US Patent and Trademark Office Re. U.S. Appl. No. 14/596,580. (37 pages).
Official Action dated Jun. 29, 2016 From the US Patent and Trademark Office Re. U.S. Appl. No. 14/746,868.
Restriction Official Action dated Apr. 4, 2018 From the US Patent and Trademark Office Re. U.S. Appl. No. 15/289,252. (7 pages).
Restriction Official Action dated Apr. 6, 2016 From the US Patent and Trademark Office Re. U.S. Appl. No. 14/746,868.
Restriction Official Action dated Apr. 16, 2015 From the US Patent and Trademark Office Re. U.S. Appl. No. 13/937,294.
Restriction Official Action dated Feb. 21, 2018 From the US Patent and Trademark Office Re. U.S. Appl. No. 15/480,404.(5 pages).
Restriction Official Action dated Feb. 22, 2017 From the US Patent and Trademark Office Re. U.S. Appl. No. 14/596,580. (8 Pages).
Translation of Notification of Office Action dated Sep. 28, 2017 From the State Intellectual Property Office of the People's Republic of China Re. Application No. 201480039100.3. (14 Pages).
Written Opinion dated Jan. 25, 2017 From the International Preliminary Examining Authority Re. Application No. PCT/IL2016/050045. (7 Pages).
Notification of Office Action and Search Report dated May 31, 2018 From the State Intellectual Property Office of the People's Republic of China Re. Application No. 201480039100.3. (14 Pages).
Official Action dated May 15, 2019 From the US Patent and Trademark Office Re. U.S. Appl. No. 15/289,252. (11 Pages).
Official Action dated Jan. 3, 2019 From the US Patent and Trademark Office Re. U.S. Appl. No. 15/480,404. (16 pages).
Notification of Office Action dated Dec. 14, 2018 From the State Intellectual Property Office of the People's Republic of China Re. Application No. 201480039100.3. (14 Pages).
Office Action dated May 31, 2018 From the State Intellectual Property Office of the People's Republic of China Re. Application No. 201480039100.3 and Its Translation of the Notification of Office Action Into English. ().
Translation Dated Jul. 3, 2018 of Notification of Office Action dated May 31, 2018 From the State Intellectual Property Office of the People's Republic of China Re. Application No. 201480039100.3. (16 Pages).
Official Action dated Jan. 18, 2019 From the US Patent and Trademark Office Re. U.S. Appl. No. 15/289,252. (21 pages).
Examination Report Under Sections 12 & 13 of the Patents Act, 1970 and the Patents Rules, 2003 dated Jun. 1, 2020 From the Government of India, Intellectual Property India, Patents, Designs, Trade Marks, Geographical Indications, The Patent Office Re. Application No. 201727012884. (6 Pages).

(56) References Cited

OTHER PUBLICATIONS

Notification of Office Action dated Mar. 20, 2020 From the State Intellectual Property Office of the People's Republic of China Re. Application No. 201680003742.7 and Its Summary in English. (10 Pages).

Translation Dated Apr. 16, 2020 of Notification of Office Action dated Mar. 20, 2020 From the State intellectual Property Office of the People's Republic of China Re. Application No. 201680003742.7. (7 Pages).

Examination Report Under Sections 12 & 13 of the Patents Act, 1970 and the Patents Rules, 2003 dated Jun. 28, 2019 From the Government of India, Intellectual Property India, Patents, Designs, Trade Marks, Geographical Indications Re. Application No. 3296/MUMNP/2015. (6 Pages).

Notification of Office Action and Search Report dated Jul. 5, 2019 From the State Intellectual Property Office of the Peoples Republic of China Re. Application No. 201680003742.7. (11 Pages).

* cited by examiner

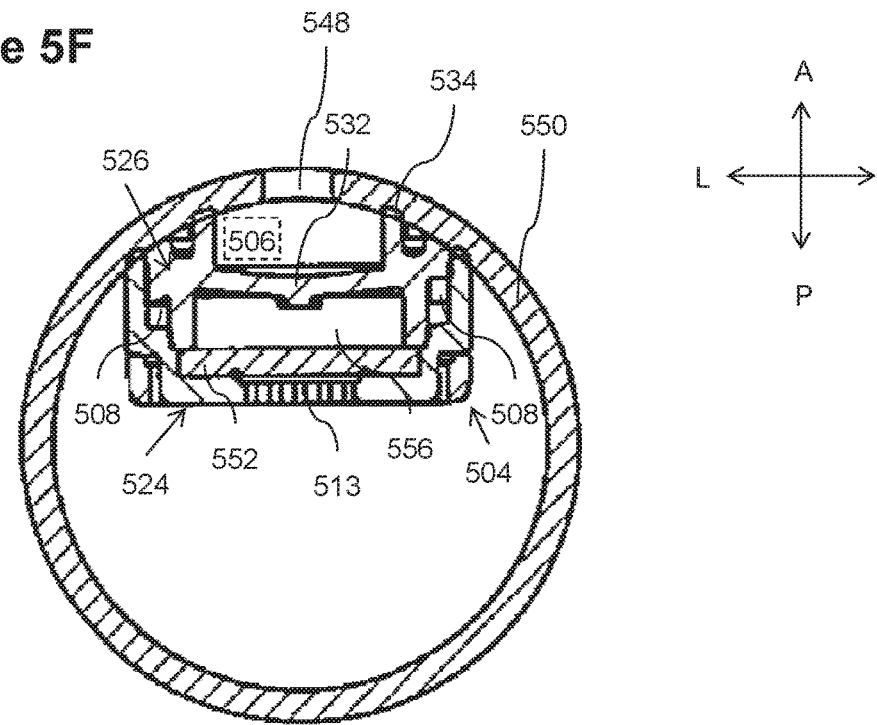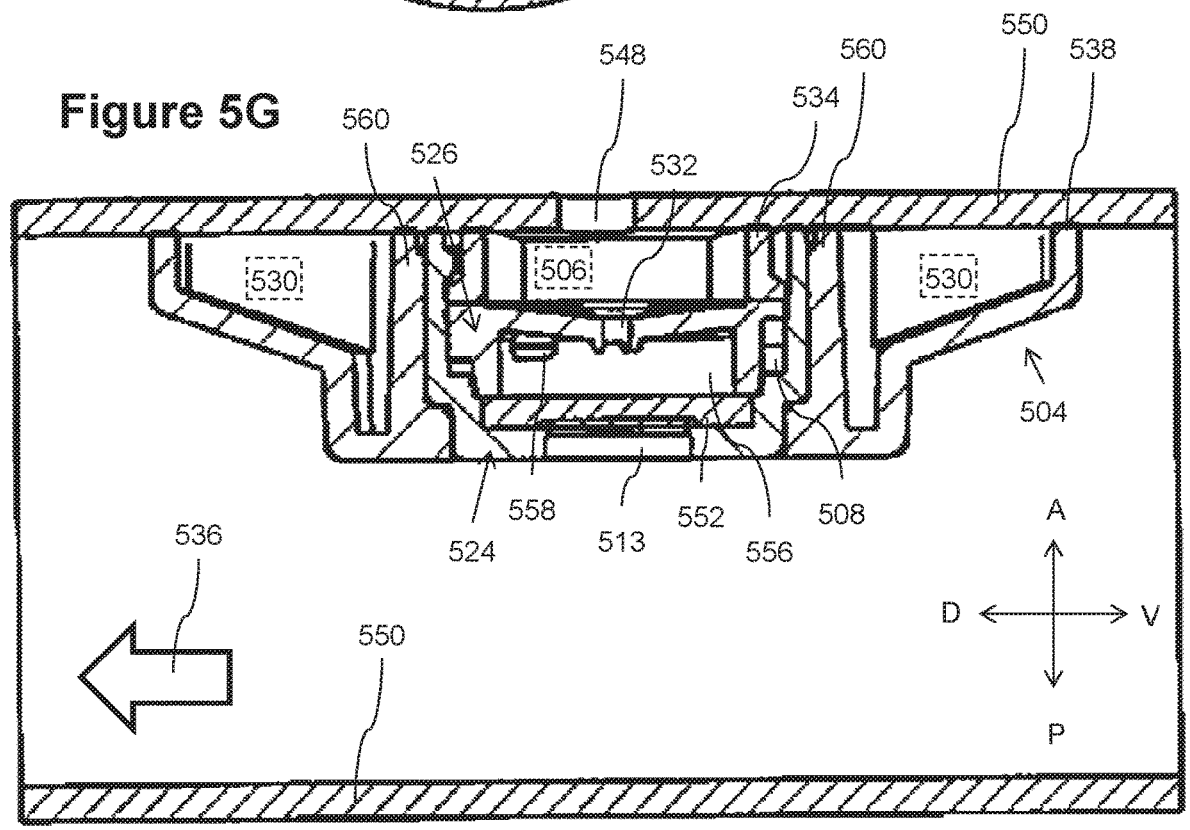

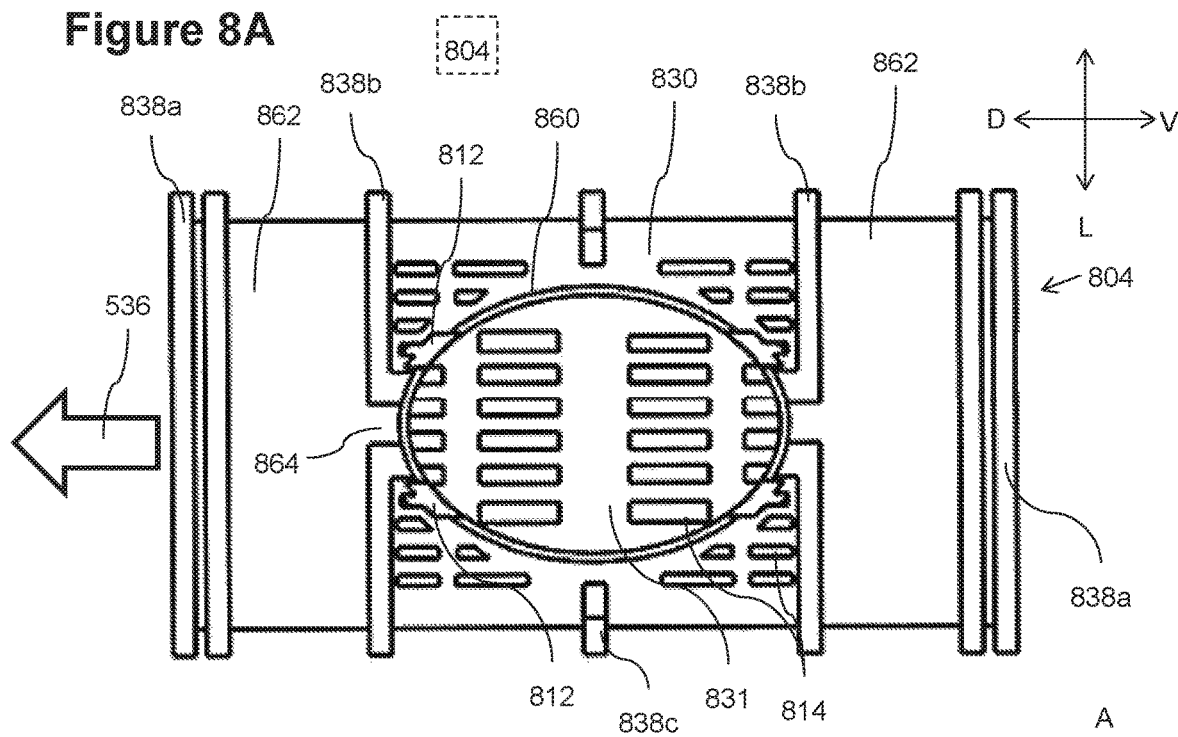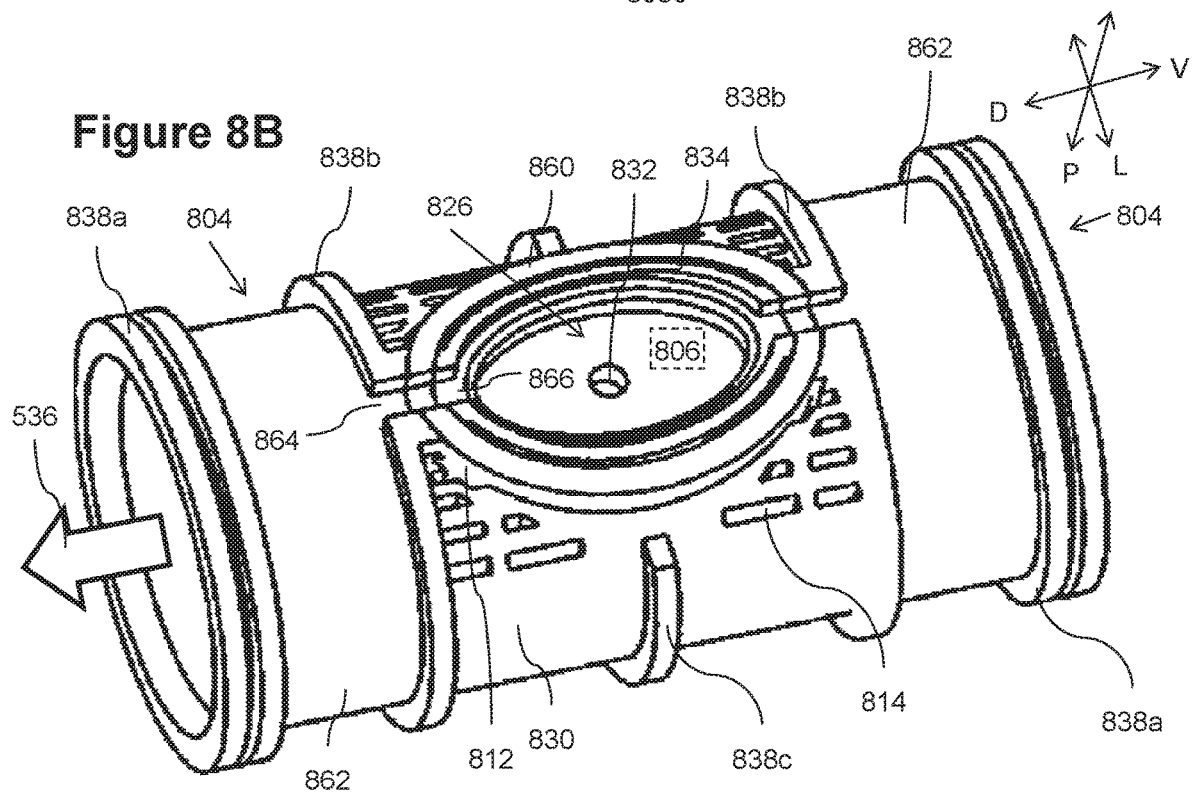

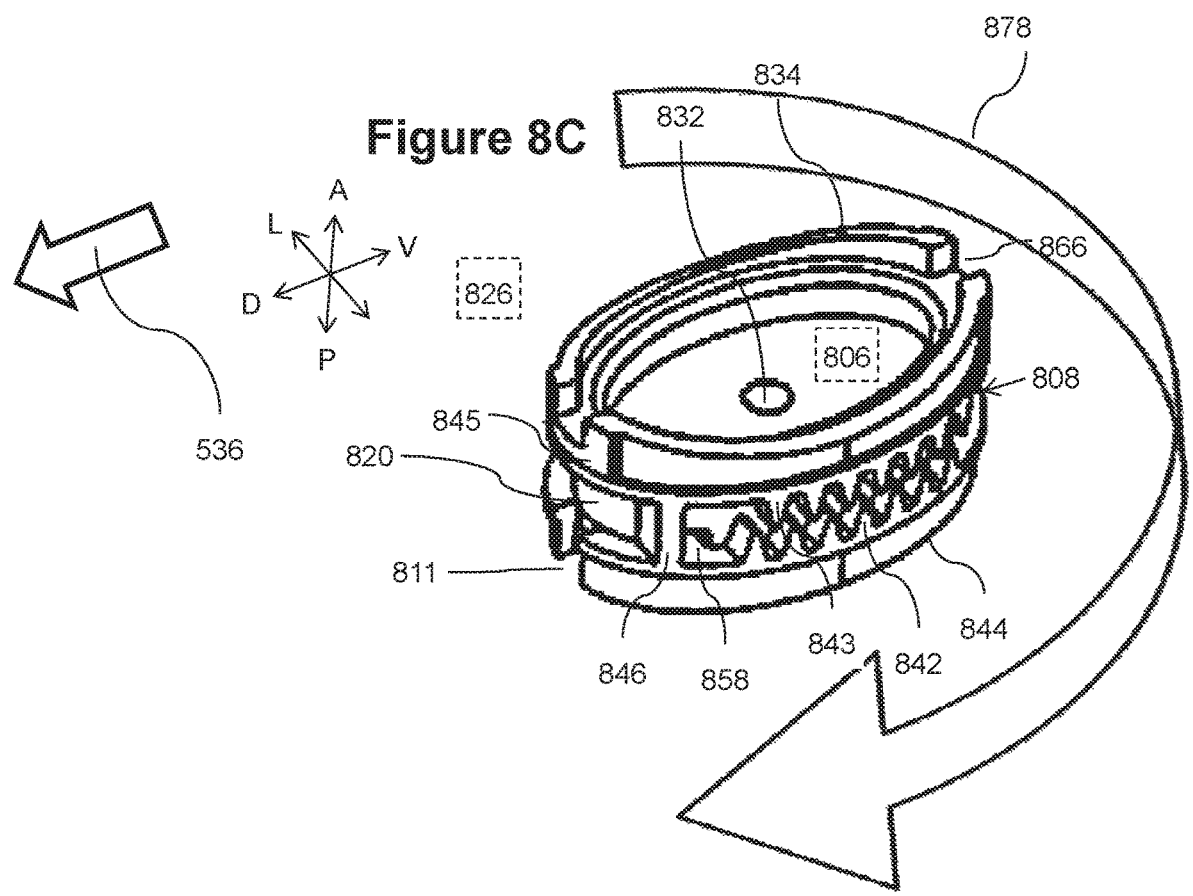

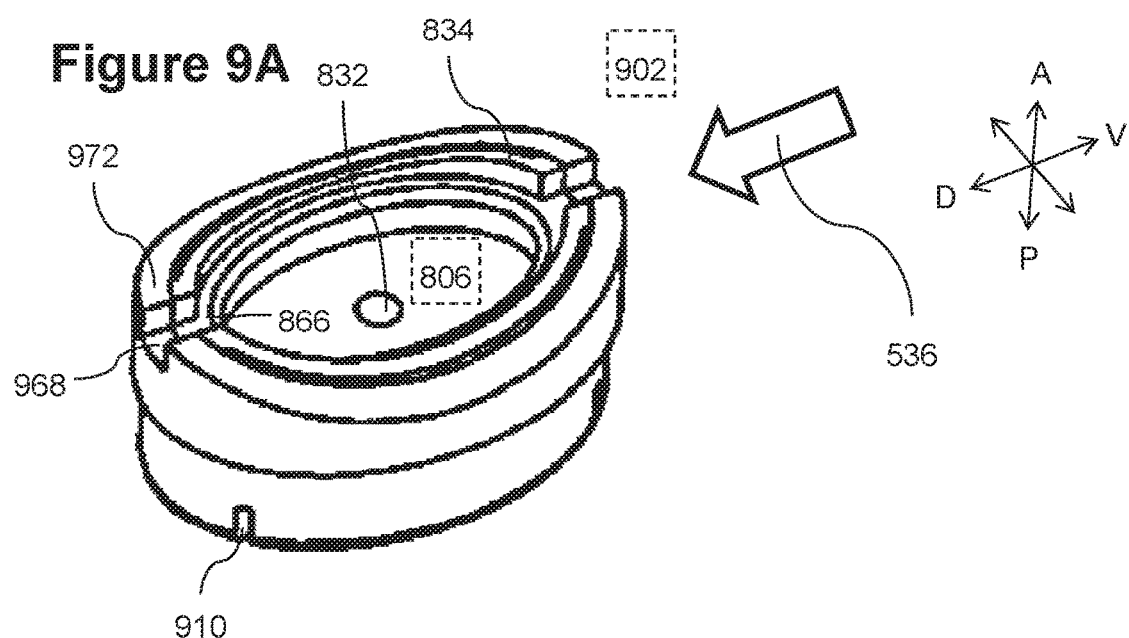
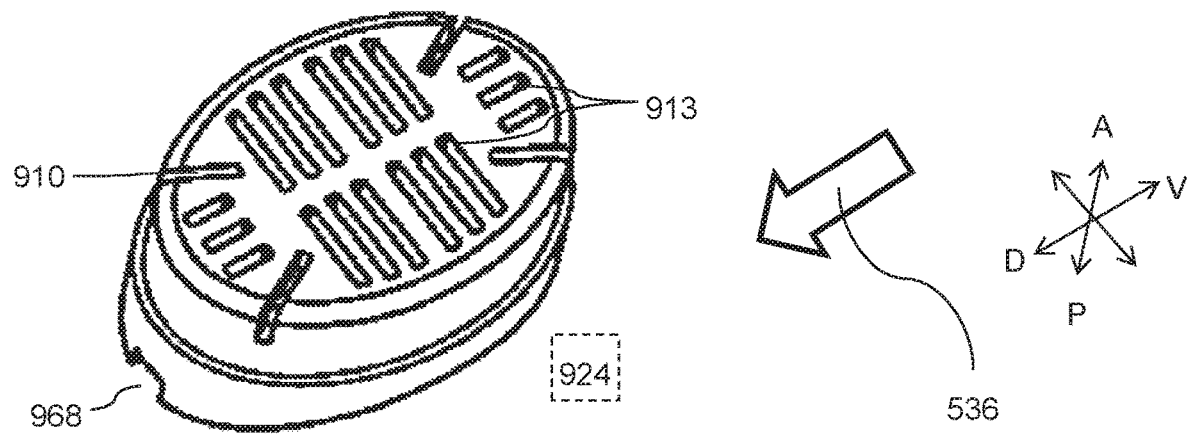

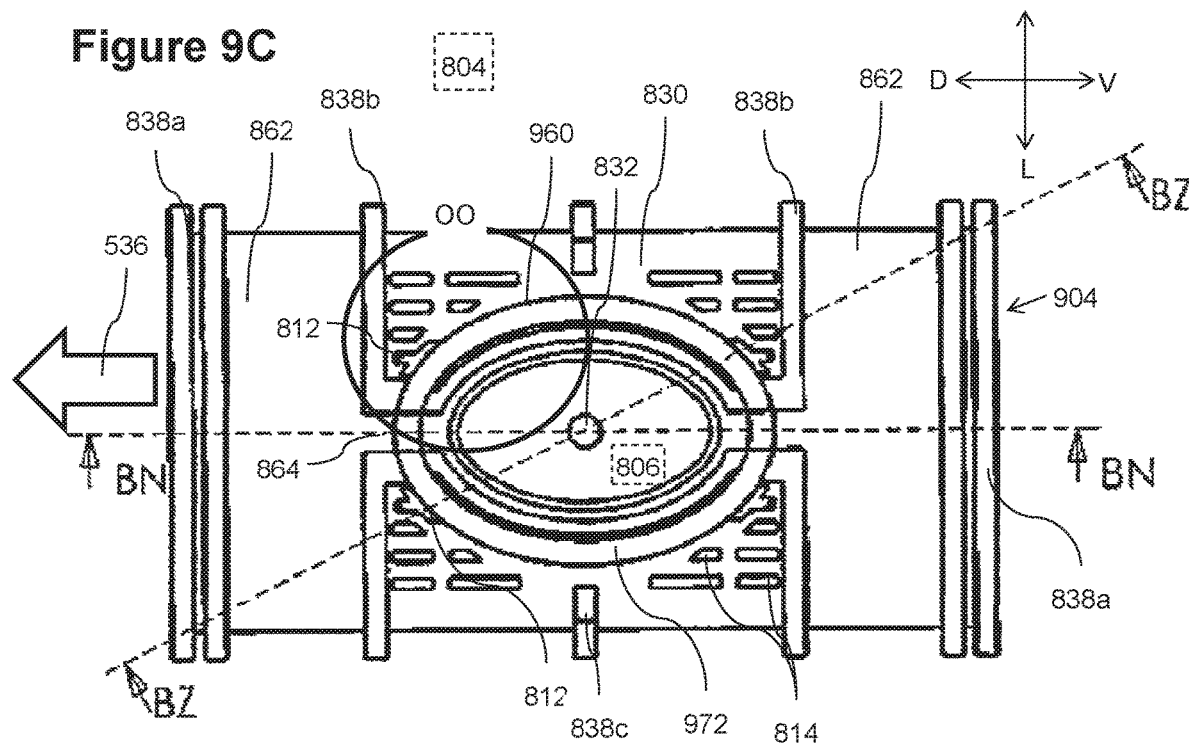
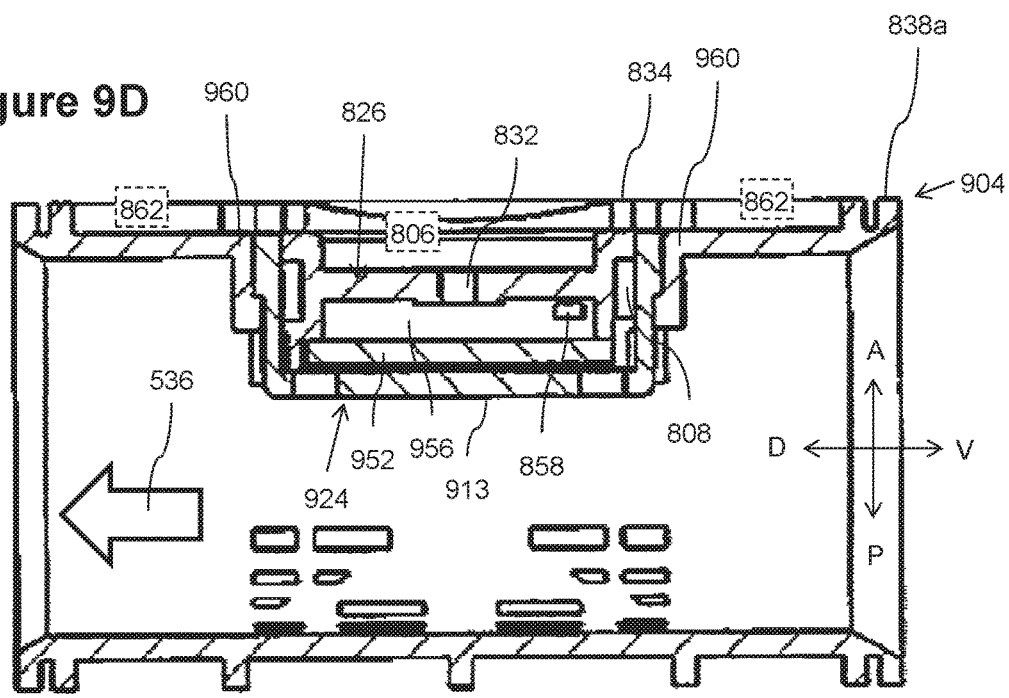

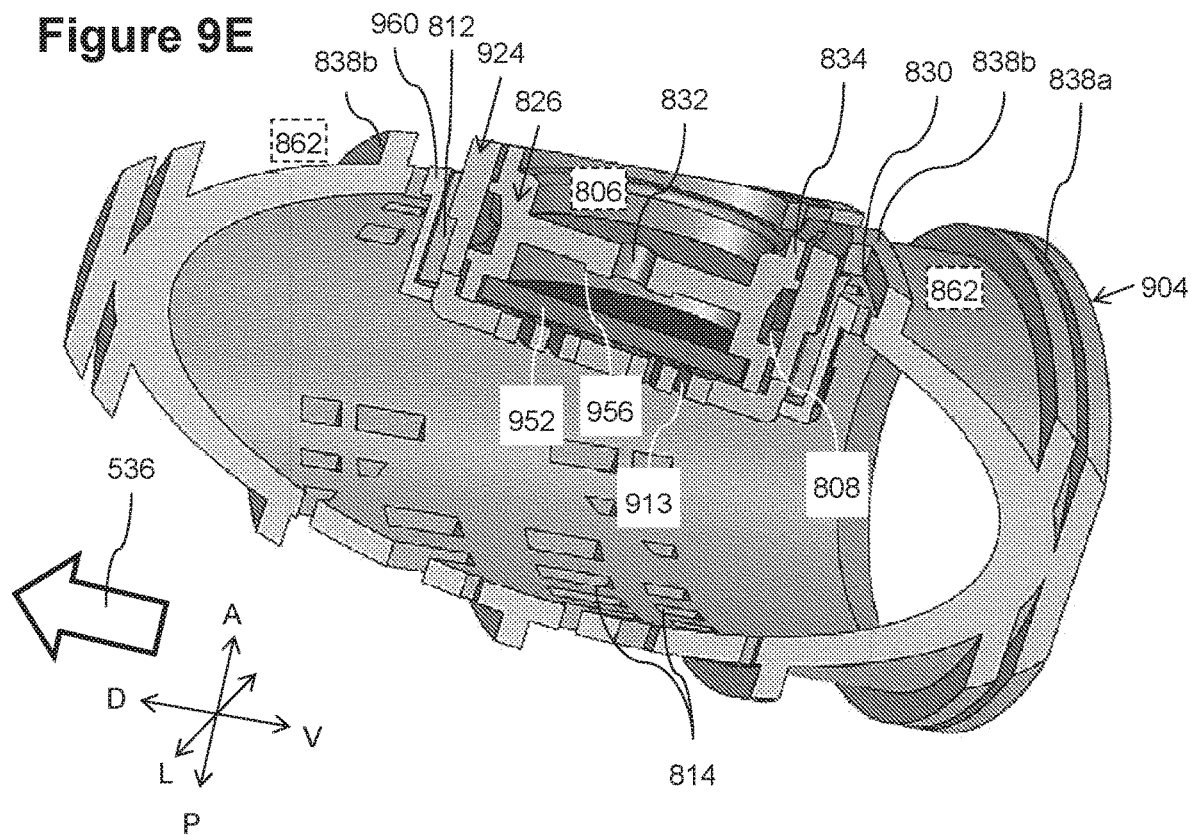
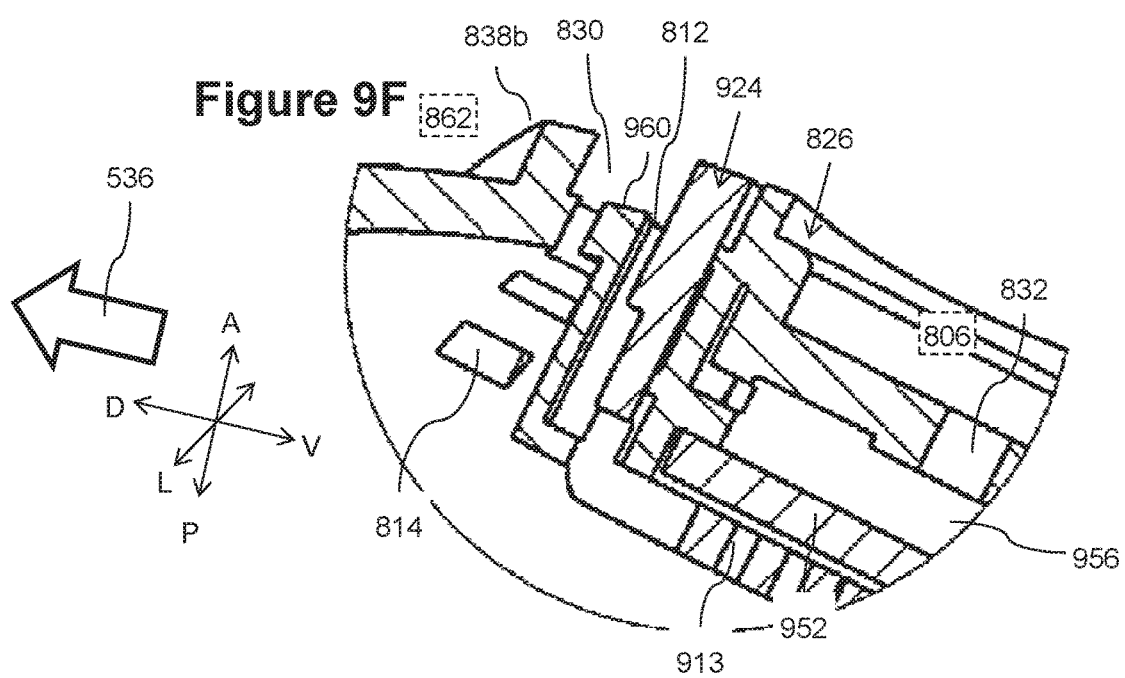

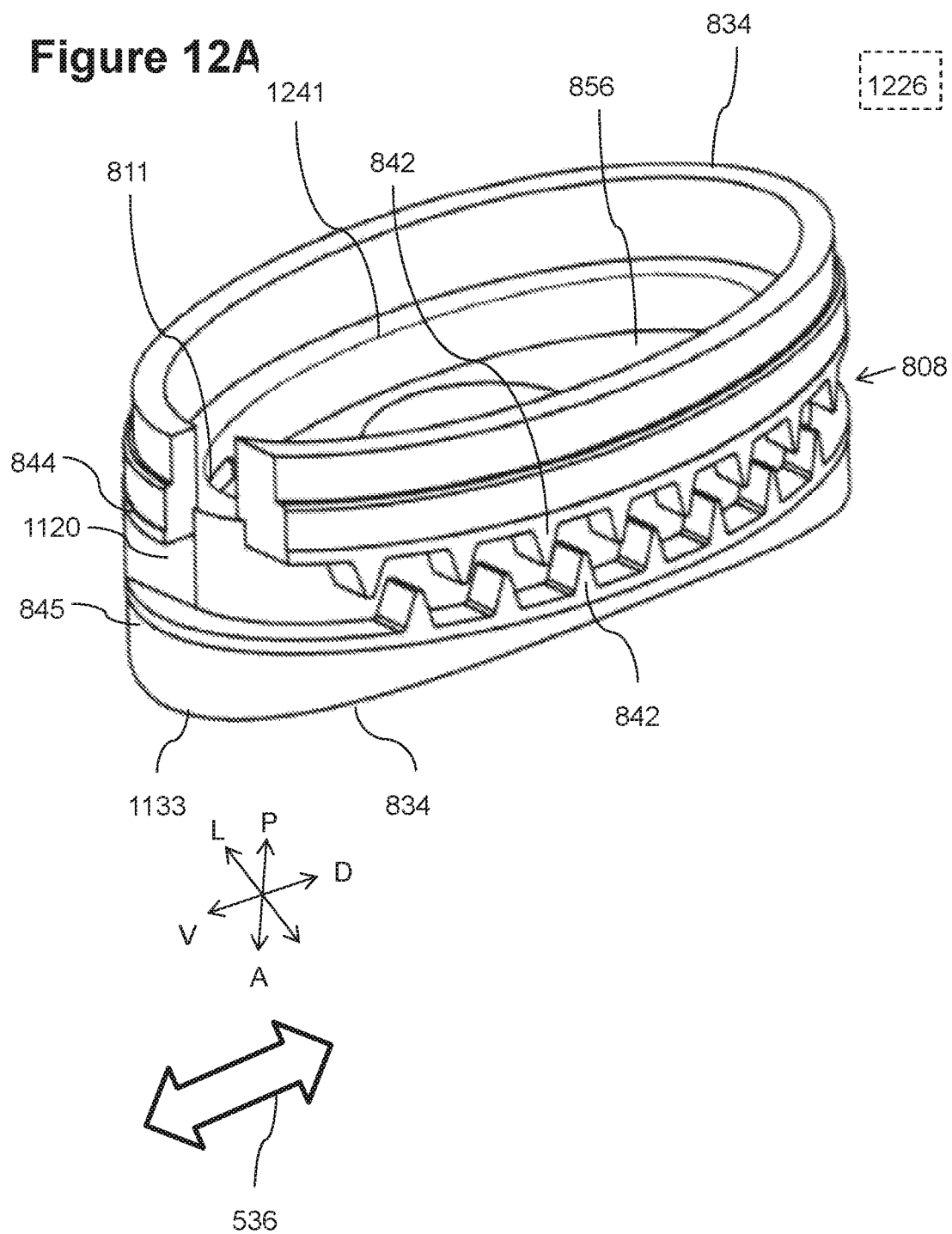

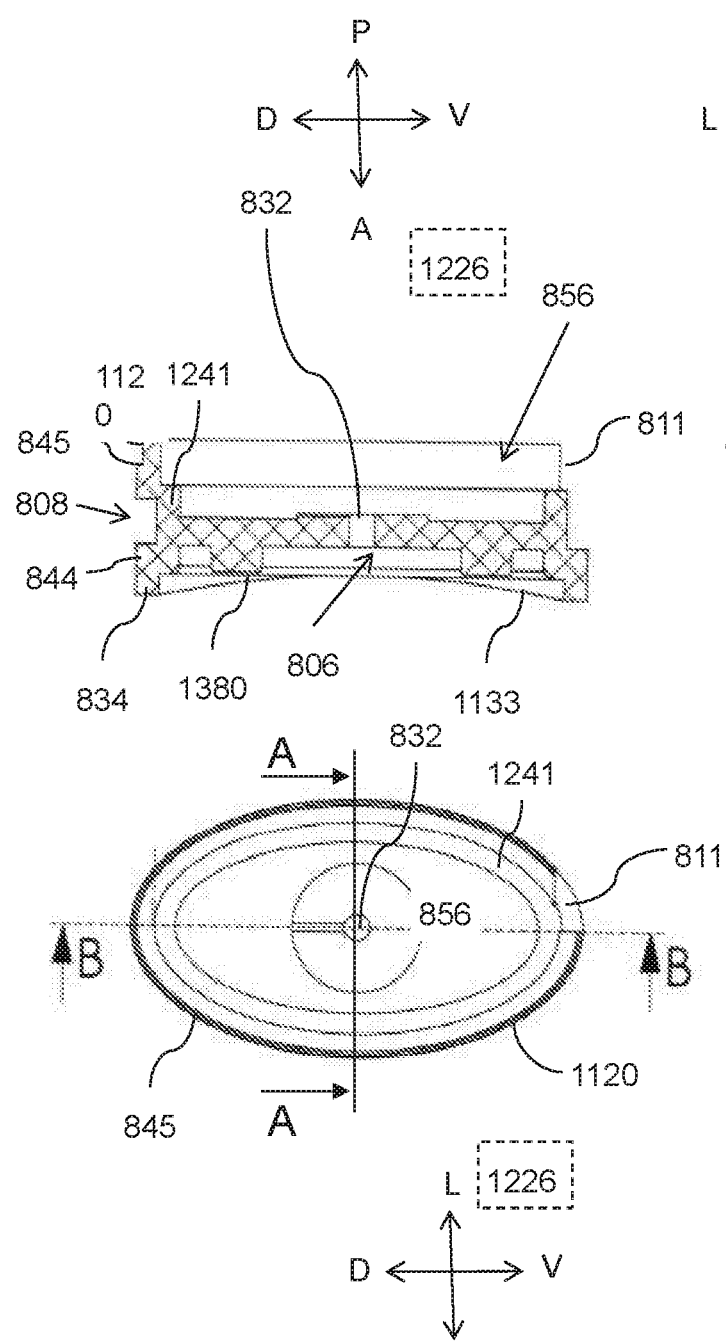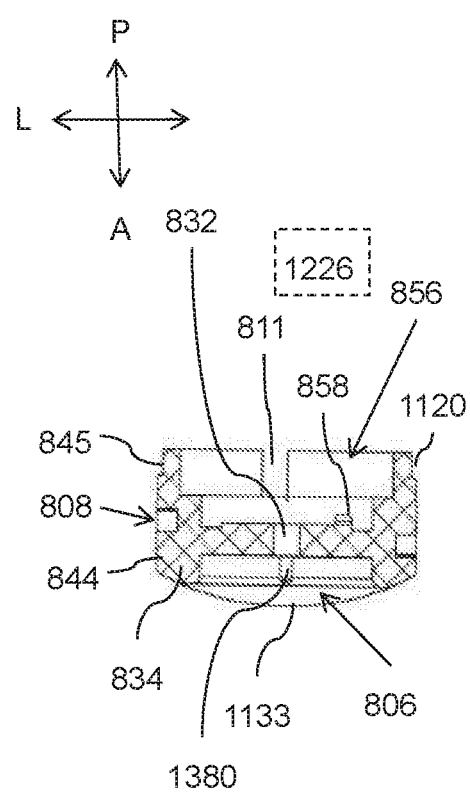

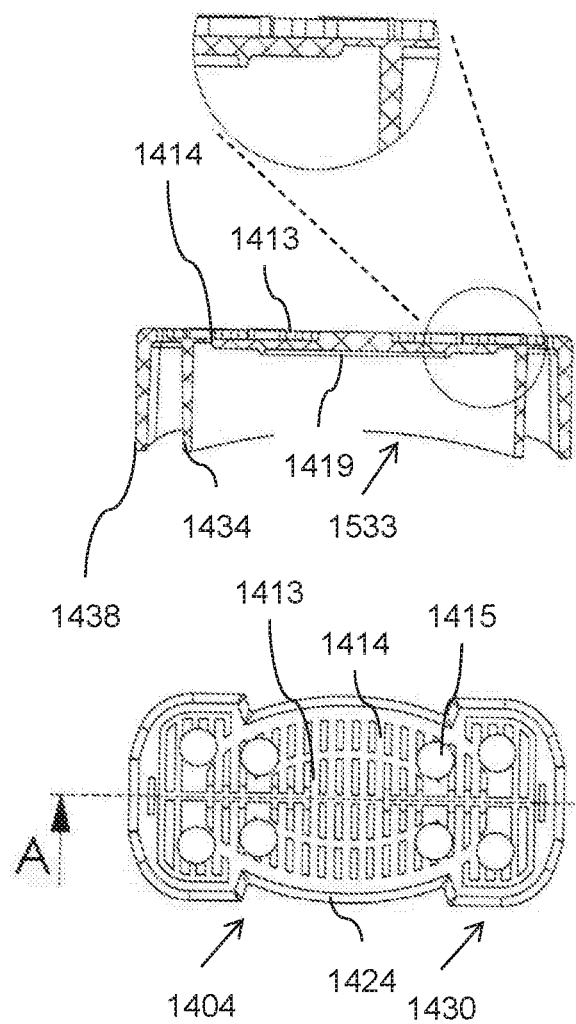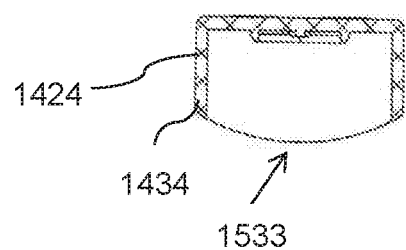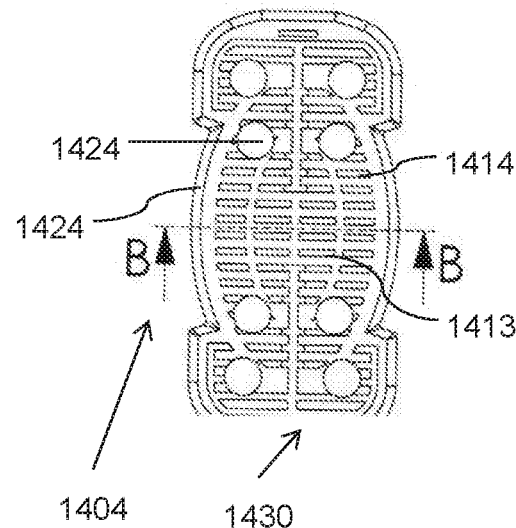
Figure 15A'
Figure 15B
Figure 15A
Figure 15C
Figure 15D

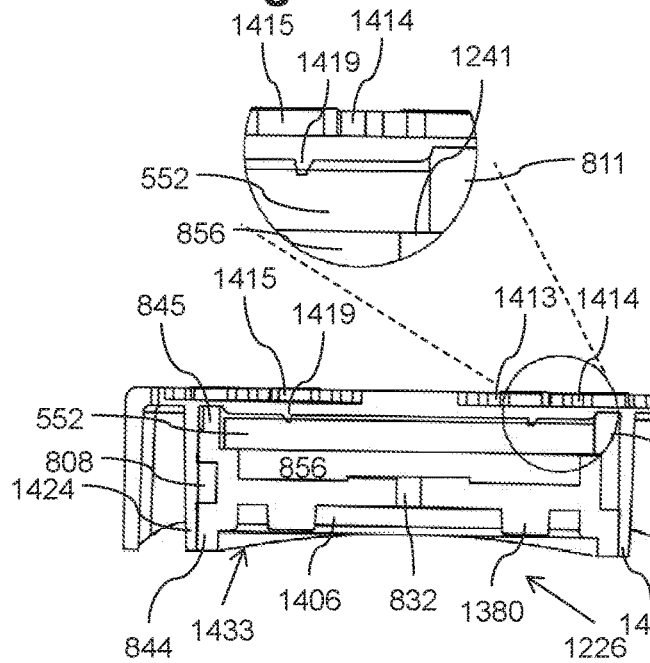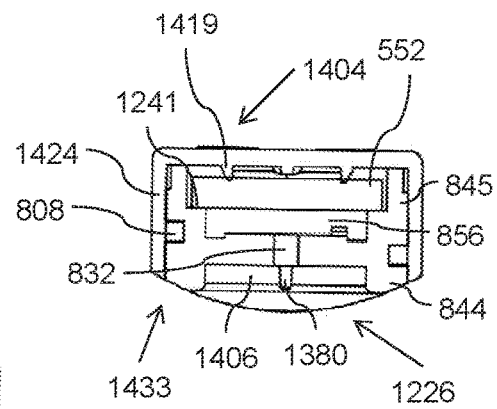

ELLIPTICAL IN LINE BUTTON DRIPPER WITH EXTENDED BONDING ZONES

RELATED APPLICATIONS

This application is a continuation in part of U.S. patent application Ser. No. 14/596,580 filed on Jan. 14, 2015.

This application is also a continuation in part of U.S. patent application Ser. No. 15/289,252 filed on Oct. 10, 2016 which is a continuation of U.S. patent application Ser. No. 13/937,294, now U.S. Pat. No. 9,462,760 filed on 9 Jul. 2013.

The contents of the above applications are all incorporated by reference as if fully set forth herein in their entirety.

FIELD AND BACKGROUND OF THE INVENTION

The present invention, in some embodiments thereof, relates to an in hose drip emitter and, more particularly, but not exclusively, an in hose drip emitter having a cylindrical core and one or more attachments.

International Patent Application Publication No. WO/1992/005689 to Dermitzakis discloses "an irrigation pipe with dripping elements soldered to its inner side made of a continuous plastic pipe which does not have however a constant cross-sectional area over its whole length. The dripping element may be designed either as a simple meander or other channel shape or have a pressure-compensating function. In the embodiment with pressure-compensating function, a constant water outflow rate from the dripping element is ensured within a determined pressure range. The dripping elements are successively introduced into the pipe during the production phase of the latter, are enveloped by the sheath of the pipe and secured to the inner wall of the pipe. The sheath of the pipe forms outer bulges at these locations. The cross-section of the irrigation pipe remains absolutely free over its whole length. The dripping element may also be provided with a small water outlet pipe which clearly projects from the outer side of the pipe."

U.S. Pat. No. 7,270,280 to Belford discloses "an integral in-line dripper to be used bonded to the internal surface of an irrigation pipe. The dripper has an inlet facing the inside of the pipe and an outlet connected to an exit opening in the pipe wall. The dripper has a flattened shape defined between a first surface with an open meandering channel formed therein, the channel's inlet being connected to the dripper's inlet, and a second surface opposite the first surface. The topography of the first surface is so designed that the dripper can be bonded to the internal surface of the pipe in any orientation about a radius of the pipe passing through the first and the second surface, so as to form a flow-restriction labyrinth connected to the outlet of the dripper."

U.S. Pat. No. 5,636,797 to Cohen discloses "a drip irrigation emitter including a tube having a plurality of flow control units bonded to its inner face providing a flow control passageway between the interior of the tube and each of a plurality of discharge openings formed through the wall of the tube. Each flow control unit includes a body member bonded to the inner face of the tube, a cover also bonded to the inner face of the tube, and a deformable elastomeric membrane between the body member and cover and defining a pressure-compensated flow control passageway through the flow control unit. A drip irrigation emitter includes a body member having an inlet for receiving pressurized water, an outlet, and a connecting passageway having a plurality of baffles spaced from each other in the direction of the water flow from the inlet to the outlet to define a labyrinth flow path cooperable with a deformable membrane which regulates the flow through the labyrinth flow path in response to the inlet pressure. The baffles are formed with notches in the sides thereof facing the membrane such that the membrane is deformed by an increase in the inlet pressure first into engagement with the sides of the baffles facing the membrane, and then into the notches, to regulate the flow to the outlet." According to Cohen, "The inner face of body member 10 (i.e., the face exposed to the interior of tube 2) is formed with a flat outer rim 13 (FIG. 5) of generally rectangular configuration for seating the cover 30 . . . . The longitudinal side sections 34, 35 of cover 30 are further formed with curved surfaces 34b, 35b, conforming to the curvature of tube 2."

U.S. Pat. Nos. 6,206,305 and 6,027,048 to Mehoudar disclose "an emitter unit to be integrally bonded to an internal surface of a conduit and comprising an elongated housing, a housing inlet adapted to communicate with an interior of said conduit and a housing outlet adapted to communicate with a conduit outlet. An elongated, flow-restricting flowpath is formed in the housing having a flowpath inlet communicating with the housing inlet and a flowpath outlet communicating with the housing outlet. A resiliently flexible membrane is mounted in the housing which is of closed box-like shape and is constituted by an elongated receiving member and a correspondingly elongated cover member. Projections and recesses are formed along the lengths of elongated rim portions of the members and are directed substantially transversely to longitudinal axes of said members such that projections of one member are adapted to form a close pressure fit within corresponding recesses of the other member."

U.S. Pat. No. 5,279,462 to Mehoudar discloses "an irrigation emitter unit comprising an outer member of substantially cylindrical shape and having a tapering base portion with fluid flow coupling means; an inwardly directed peripherally flanged edge portion of the outer member; an inner member having a body portion of substantially cylindrical shape substantially sealingly fitted within the outer member and having a cover portion formed integrally therewith; a peripheral edge portion of the cover portion juxtaposed below the flanged edge portion of the outer member; an elongated groove formed in the cylindrical surface of the body portion; a cavity formed in the body portion and communicating at one end thereof with a fluid flow inlet; an inwardly directed flange formed integrally with the walls of the cavity; and a resiliently flexible membrane located within the unit."

U.S. Pat. No. 4,209,133 to Mehoudar discloses "a drip level irrigation emitter unit having flow restricting means, a control mechanism, inlet and outlet control chambers of the control mechanism, resiliently flexible membrane sealingly separating the control chambers, the membrane being displaceable with respect to the flow restricting means, the inlet and outlet chambers respectively communicating with an inlet and an outlet of the flow restricting means, the outlet chamber being formed with an outlet aperture of substantially smaller area than that of the membrane, the arrangement being such that upon the liquid pressure in the inlet chamber exceeding the liquid pressure in the outlet chamber by a predetermined amount, the membrane flexes elastically towards the outlet aperture so as to define, with a rim of the aperture, a restricted outflow path thereby limiting variations in the outflow rate."

U.S. Pat. No. 7,681,810 to Keren discloses "an emitter comprising: a plurality of inlet apertures through which liquid enters the emitter; a manifold flow channel into which liquid that passes through the apertures flow; an elastic diaphragm that seats on the manifold flow channel; an outlet aperture through which liquid that enters the emitter exits the emitter; wherein liquid that enters the inlet apertures displaces only a portion of the diaphragm from the manifold channel so that the liquid can leave the manifold channel and flow through the emitter to reach the outlet aperture."

U.S. Patent Application Publication No. 2012/0097254 to Cohen discloses "an apparatus for a self adjusting regulator suited for an irrigation emitter. A curved flow channel is integrated into a concave dome shaped surface. A deformable member deforms to approach the surface to adjust the resistance to flow. The concave dome shaped surface may match a deformed shape of the membrane. Irregularities in the interface between the surface and the deformable member are configured to achieve a desired discharge under varying flow conditions. The deformable member may activate an inlet filter cleaner by pushing a ram and thereby unclogging the filter."

SUMMARY OF THE INVENTION

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to an aspect of some embodiments of the invention, there is provided a drip emitter for bonding to an inner surface of a conduit over less than the circumference thereof of including: a core including a cylindrical element having a main axis and an elliptical cross section, a closed perimeter fluid outlet zone bounded by a bonding surface having an arched profile which lies on a substantially cylindrical virtual surface matching an inner wall of an irrigation tube, wherein an axis of the substantially cylindrical virtual surface is substantially perpendicular to the main axis of the cylindrical element; a cover including a cylindrical inner surface fitting to elliptical side walls of the cylindrical element and a fluid inlet; and a labyrinth flow path confined between the cylindrical element and the cylindrical inner surface and wherein the labyrinth flow path is disposed between the fluid inlet and the closed perimeter fluid outlet zone.

According to some embodiments of the invention, a long axis of the elliptical cross section is parallel to the axis of the substantially cylindrical virtual surface.

According to some embodiments of the invention, the drip emitter further includes: an orientation element indicating an orientation of the arched profile for aligning the arched profile with the inner surface of the conduit.

According to some embodiments of the invention, the core further including: a flow regulating chamber having an open face with a face flange on and end of the core; a flexible membrane closing the flow regulating chamber; and a face flange on the cover facing the face flange of the regulating chamber, the face flange of the cover is laterally offset from the face flange of the core and wherein the membrane is fixed between the face flange of the cover and the face flange of the core.

According to some embodiments of the invention, the face flange of the cover overhangs a ledge of the regulating chamber.

According to some embodiments of the invention, the cover further includes: a curved bonding surface for bonding the cover to the inner surface of the conduit.

According to some embodiments of the invention, the drip emitter further includes an orientation element on the cover for aligning the curved bonding surface of the cover with the inner wall of an irrigation tube.

According to some embodiments of the invention, attached to an inner surface of an irrigation tube, the irrigation tube includes a plurality of openings, each opening surrounded by the closed perimeter bonding surface of a respective emitter of the plurality of drip emitters.

According to some embodiments of the invention, the orientation element includes a flat surface aligned with a long axis of the elliptical cross section.

According to some embodiments of the invention, the core fits into the cover in more than one orientation.

According to some embodiments of the invention, the drip emitter where the more than one orientation include a first orientation and a second orientation rotated 180 degrees around the main axis with respect to the first orientation.

According to some embodiments of the invention, the core is not symmetric along at least one of a long axis of the elliptical cross section and a short axis of the elliptical cross section.

According to an aspect of some embodiments of the invention, there is provided a drip emitter including: A) cover including: i) a cavity having a first end, a second end and a side wall having a curved inner surface and a cross section of the cavity having a long axis and a short axis, ii) a fluid inlet B) a flexible membrane and C) a core formed as an non-circular cross section fitting into the cavity including; a fluid outlet chamber, the fluid outlet chamber having an open face directed toward a first end of the core a perimeter of the open face suitable for bonding to an inner surface of a conduit over less than the circumference thereof with a long axis of the non-circular cross section directed substantially parallel to the main flow direction in the conduit; a regulating chamber having an open face directed towards a second end of the core opposite the first end, the regulating chamber in fluid communication with the fluid outlet chamber; and at least one open faced labyrinth flow channel on at least one long side of an outer curved surface of the core, when the core is fit into the cavity, the labyrinth flow channel providing fluid communication between the fluid inlet of the cover and the regulating chamber.

According to some embodiments of the invention, the drip emitter where the cross section of the core is elliptical.

According to some embodiments of the invention, attached to an inner surface of an irrigation tube, the irrigation tube includes a plurality of openings, each opening surrounded by the perimeter of the outlet chamber of a respective emitter of the plurality of drip emitters.

According to some embodiments of the invention, the drip emitter includes a self contained button flow restrictor.

According to some embodiments of the invention, the core fits into the cover in more than one orientation.

According to some embodiments of the invention, the drip emitter where the more than one orientation include a first orientation and a second orientation rotated 180 degrees around a main axis of the core with respect to the first orientation.

According to some embodiments of the invention, the core is not symmetric along at least one of a long axis of the non-circular cross section and a short axis of the circular cross section.

According to some embodiments of the invention, the open face of the regulation chamber includes a face flange, and wherein the cover includes a face flange facing the facing and overhanging a ledge surrounding the regulating chamber.

According to an aspect of some embodiments of the invention, there is provided an in-line drip emitter including a flow restrictor. The flow restrictor may including one or more fluid inlets, a fluid outlet chamber having an open face suitable for sealing to an inner surface of a conduit over less than the circumference thereof, a rate limiting fluid path providing fluid communication between the one or more fluid inlets and the fluid outlet chamber, the rate limiting fluid path producing a predefined range of flow rate over a predefined pressure differential range between the one or more fluid inlets and the fluid outlet. The emitter may further include an inlet attachment sized and shaped to mount to the flow restrictor. The flow inlet attachment may include an inlet opening oriented for receiving fluid from the conduit, one or more fluid outlets and a mount sized to engage the flow restrictor from at least two opposing sides thereof with the flow restrictor oriented for exposing the open face of the fluid outlet chamber for the sealing to the inner surface of a conduit and aligning each of the one or more fluid outlets to at least one fluid inlet of the one or more fluid inlets of the flow restrictor.

According to some embodiments of the invention, the mount includes opposing surfaces for hold the flow restrictor by compression.

According to some embodiments of the invention, the inlet attachment further includes: an open faced inlet chamber suitable for sealing to the inner surface of the conduit, the inlet chamber providing fluid communication between the inlet opening and the one or more fluid outlets.

According to some embodiments of the invention, the inlet attachment further includes: an open faced outlet chamber suitable for sealing to an inner surface of a conduit, the outlet chamber providing fluid communication between the outlet chamber of the flow restrictor and an outlet opening of the conduit.

According to some embodiments of the invention, the inlet attachment has the form of a sleeve insertable into the conduit.

According to some embodiments of the invention, the inlet attachment has the form of a sleeve insertable into the conduit and wherein the outlet chamber of the inlet attachment surrounds at least 70% of a circumference of the sleeve.

According to some embodiments of the invention, the in-line dripper further includes: a longitudinal extension of the sleeve and wherein the outlet chamber of the inlet attachment surrounds at least 90% of a circumference of the longitudinal extension.

According to some embodiments of the invention, the outlet chamber of the flow restrictor is formed on an anterior face thereof and the flow restrictor further includes: a curved outer surface and wherein at least a portion of the rate limiting fluid path is at least partially delimited by a portion of the curved outer surface and revolves at least partially around a longitudinal axis of the flow restrictor.

According to some embodiments of the invention, the in line dripper further includes: a smooth sealing surface surrounding the curved surface.

According to some embodiments of the invention, the in-line dripper further comprises: a cover including an interior lateral surface and wherein the at least a portion of the rate limiting fluid path is enclosed between the curved outer surface and the inner surface of the cover.

According to some embodiments of the invention, the one or more fluid outlets are in the cover.

According to some embodiments of the invention, the rate limiting fluid path is at least partially delimited in an anterior direction by an outward protrusion from the curved outer surface.

According to some embodiments of the invention, the rate limiting fluid path is at least partially delimited in a posterior direction by an outward protrusion from the curved outer surface.

According to some embodiments of the invention, the rate limiting fluid path is at least partially delimited in a posterior direction by an inward protrusion from the inner surface.

According to some embodiments of the invention, a traverse cross section of the flow restrictor has a long axis and a short axis and wherein a ratio of the long axis and short axis is at least 1.1 to 1.

According to some embodiments of the invention, the long axis is oriented substantially parallel to a mean flow direction in the conduit.

According to an aspect of some embodiments of the invention, there is provided a drip emitter including: a flow restrictor producing a predefined range of flow rate over a predefined pressure differential range. The flow restrictor may include: a fluid inlet, a fluid outlet having a periphery suitable for bonding to an inner surface of a conduit over less than the circumference thereof; and a flow restricting fluid path. The drip emitter may further include an attachment mountable to the flow restrictor including: a slow release ingredient at a concentration at least 20 times the concentration in the flow restrictor, a inlet opening a duct providing fluid communication between inlet opening and the inlet of the flow restrictor.

According to an aspect of some embodiments of the invention, there is provided a drip regulation emitter including: a core. The core may include: a closed perimeter fluid outlet chamber facing in an anterior direction a perimeter of the outlet chamber suitable for bonding to an inner surface of a conduit over less than the circumference thereof; an curved lateral surface; a side opening between the fluid outlet chamber and the curved lateral surface; a first set of baffles arranged around the curved lateral surface of the core. The emitter may further include: a cover fitting over the core. The cover may include: a curved inner surface sealing fitting to the curved lateral surface of the core; a fluid inlet; a fluid duct connecting between the fluid inlet and an annular region confined between the curved lateral surface of the core and the curved inner surface of the cover; and a second set of baffles arranged along the curved inner surface of the cover, the second set of baffles spaced to cooperate with the first set of baffles of the core to produce a labyrinth flow path around the annular region between the fluid inlet and the side opening.

According to some embodiments of the invention, the core further includes a regulating chamber interposing between the side opening and the outlet chamber; the regulating chamber having an open end directed in a posterior direction.

According to some embodiments of the invention, the drip emitter further comprises: a flexible membrane interposed between the fluid inlet of the cover and the open end of the regulating chamber.

According to an aspect of some embodiments of the invention, there is provided a drip emitter including a cover. The cover may include a cavity a curved inner surface and a long axis and a short axis, a fluid inlet. The emitter may also include a flexible membrane and a core formed as a non-circular cross section fitting into the cavity. The core may include; a fluid outlet chamber, the fluid outlet chamber having an open face directed toward a first end of the core a perimeter of the open face suitable for bonding to an inner surface of a conduit over less than the circumference thereof with a long axis of the elliptical cross section directed substantially parallel to the main flow direction in the conduit; a regulating chamber having an open face directed towards a second end of the core opposite the first end, the regulating chamber in fluid communication with the fluid outlet chamber; and at least one open faced labyrinth flow channel on at least one long side of an outer curved surface of the core, when the core is fit into the cavity, the labyrinth flow channel providing fluid communication between the fluid inlet of the cover and the regulating chamber.

According to some embodiments of the invention, the cross section is elliptical.

According to an aspect of some embodiments of the invention, there is provided an insert for a dripper hose including: a mount shaped and sized to hold a flow restrictor; an axial extension; a fluid outlet chamber girdling the axial extension; the outlet chamber having an open face suitable for sealing to an inner surface of a conduit over the circumference thereof; a channel providing fluid communication between an outlet of the flow restrictor and the outlet chamber.

According to an aspect of some embodiments of the invention, there is provided an emitter including: a flow restrictor including: a fluid inlet, a fluid outlet; and a fluid path producing a predefined range of flow rate over a predefined pressure differential range between the fluid inlet and the fluid outlet; and a curved outer surface and wherein at least a portion of the rate limiting fluid path is at least partially delimited by a portion of the curved outer surface and revolves at least partially around a longitudinal axis of the flow restrictor. The emitter may further include a sleeve sized to insert into a conduit the sleeve including: an annular outlet open faced outlet chamber attachable to the outlet of the flow restrictor, a periphery of the annular outlet chamber contacting an inner wall over at least 70% of a circumference thereof a mount for engaging to the flow restrictor.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5F is a cross section view of a flow restrictor with an input attachment installed in a conduit in accordance with an embodiment of the present invention;

FIG. 5G is a longitudinal cross section view of a flow restrictor with an input attachment installed in a conduit in accordance with an embodiment of the present invention;

FIG. 8A is a view of a cylindrical hose insert with a mount for a flow restrictor core in accordance with an embodiment of the present invention;

FIG. 8B is a perspective view of a cylindrical hose insert with a mount and a flow restrictor core in accordance with an embodiment of the present invention;

FIG. 8C is a perspective view of an elliptical flow restrictor core in accordance with an embodiment of the present invention;

FIG. 9A is an a perspective view of a elliptical flow restrictor in accordance with an embodiment of the present invention;

FIG. 9B is a perspective view of an elliptical flow restrictor cover in accordance with an embodiment of the present invention;

FIG. 9C is an anterior view of a cylindrical hose insert with a mount and a flow restrictor in accordance with an embodiment of the present invention;

FIG. 9D is a longitudinal cross-sectional view of a cylindrical hose insert with a mount and a flow restrictor in accordance with an embodiment of the present invention;

FIG. 9E is an oblique cross-sectional view of a cylindrical hose insert with a mount and a flow restrictor in accordance with an embodiment of the present invention;

FIG. 9F is a close up oblique cross-sectional view of a cylindrical hose insert with a mount and a flow restrictor in accordance with an embodiment of the present invention;

FIGS. 12A and 12B are a perspective views of an elliptical flow restrictor core in accordance with an embodiment of the present invention;

FIGS. 13A, 13B and 13C are orthogonal views of an elliptical flow restrictor core in accordance with an embodiment of the present invention;

FIGS. 15A, 15A', 15B, 15C and 15D are orthogonal views of an elliptical flow restrictor cover in accordance with an embodiment of the present invention;

FIGS. 16A, 16A' and 16B are orthogonal views of an assembled elliptical flow restrictor in accordance with an embodiment of the present invention;

FIG. 16C is an anterior perspective view of an assembled elliptical flow restrictor in accordance with an embodiment of the present invention.

DESCRIPTION OF SPECIFIC EMBODIMENTS OF THE INVENTION

Figure 1:
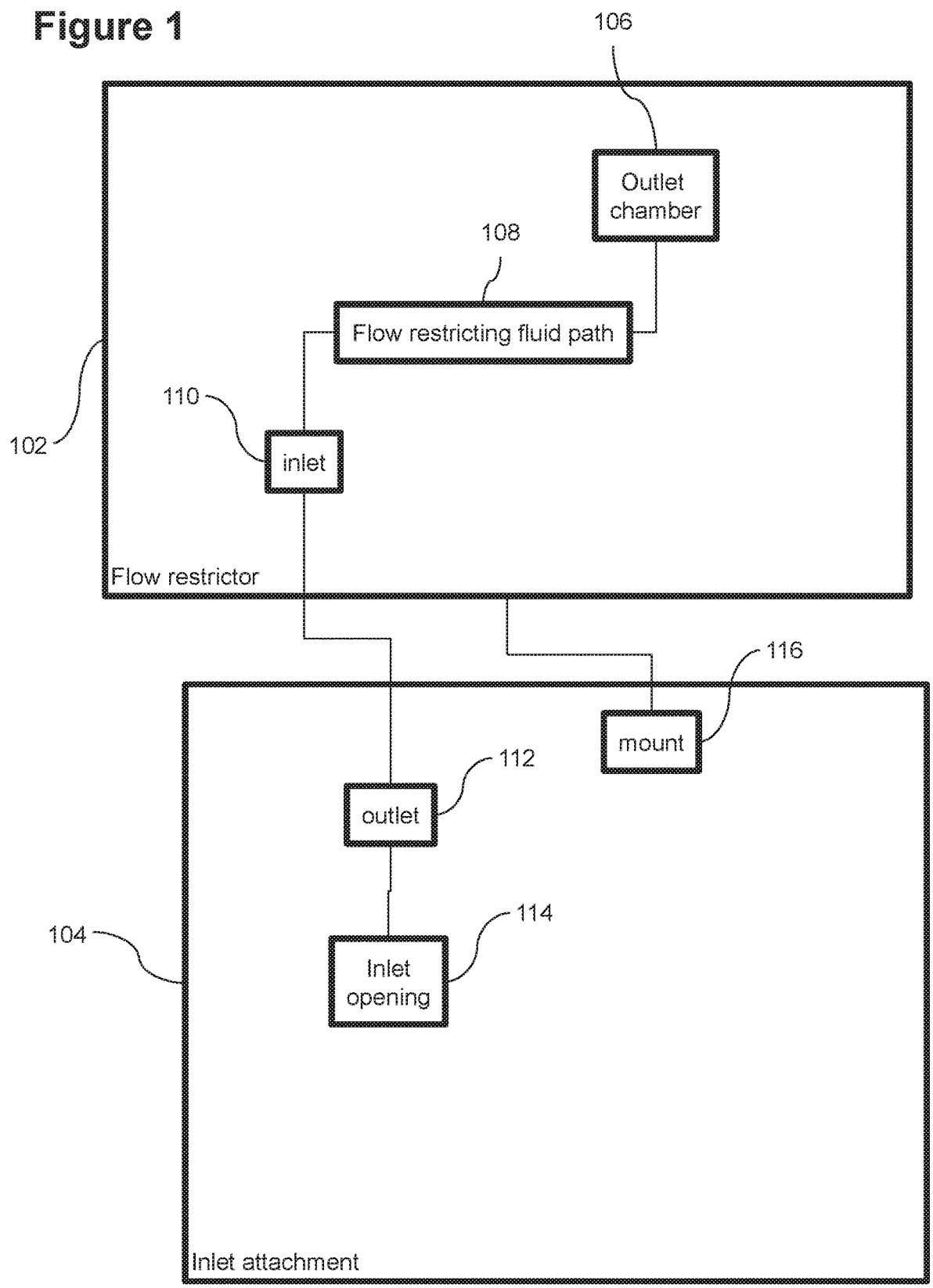
FIG. 1 is a block diagram illustrating a flow restrictor and an inlet attachment in accordance with an embodiment of the present invention.

The present invention, in some embodiments thereof, relates to an in hose drip emitter and, more particularly, but not exclusively, an in hose drip emitter having a cylindrical flow restrictor and one or more attachments.

Overview

Inlet Attachment for a Flow Restrictor

An aspect of some embodiments the current invention relates to an inlet attachment for an in-hose flow restrictor. For example the flow restrictor may be included in a drip emitter conduit. Optionally, a single flow regulator may be suitable for use autonomously and/or with one or more inlet attachments. For example a different attachment may be suitable for different applications and/or performance requirements and/or for fitting to different sized conduit. For example, the inlet attachment may include a slow release chemical and/or a filter. Optionally the slow release chemical may not be included in the flow restrictor. For example the concentration of the slow release chemical in the flow restrictor may be between ½ and ⅕ the concentration in the attachment and/or between ⅕ and 1/20 the concentration in the attachment and/or less than 1/20 the concentration in the attachment.

In some embodiments, a flow regulator and/or an inlet attachment may attach and/or be bonded to less than half the circumference of an inner wall of an irrigation hose. For example an angular extent of a boding zone may be less than 45°. Alternatively or additionally, in some embodiments, the angular extent of the bonding zone may be between 20° and 180°. Alternatively or additionally, in some embodiments, the angular extent of the bonding zone may be greater than 180°. Alternatively or additionally the inlet attachment may take the form of a hose insert, for example including a cylindrical sleeve for inserting into an irrigation hose. The sleeve may contact an inner wall over the entire circumference thereof and/or a part thereof for example ranging between 30 to 50% and/or between 50 to 70% and/or between 70 to 90% and/or between 90 to 100%.

In some embodiments, an inlet of the flow restrictor may be connected and/or in fluid communication with an outlet duct of the inlet attachment. Optionally, the flow restrictor may be configured for autonomous operation, for example as an in-line drip emitter. The outlet duct of the inlet attachment may optionally connect to the inlet that is used by the flow restrictor in autonomous operation (for example including a filter of the autonomous dripper). Alternatively or additionally, the outlet duct of the inlet attachment may optionally connect to a special inlet of the flow restrictor for attachment to the inlet attachment. Optionally, attachment to the inlet connector may open an inlet of the flow restrictor. Optionally substantially all fluid entering the flow restrictor may pass through the inlet attachment. Alternatively or additionally, some fluid may enter the flow restrictor through the inlet attachment and/or some fluid may enter the flow restrictor without passing through the inlet attachment.

In some embodiments, an inlet attachment of a dripper may include a filter for fluid entering a flow restrictor. For example, the filter of the inlet attachment may act as a prefilter with respect to the inlet filter of the flow restrictor. Optionally, the flow restrictor may include its own filter. In some embodiments, the input attachment may include a filter with a larger area. Alternatively or additionally, the filter of the inlet attachment may be courser than the inlet filter of the flow restrictor. For example the area of the filter of the inlet attachment may range between 1.5 to 3 times the area of the filter of the flow restrictor and/or between 3 to 10 times the area of the filter of the flow restrictor and/or between 10 to 100 times the area of the filter of the flow restrictor Alternatively or additionally, the filter of the inlet attachment may be finer than the inlet filter of the flow restrictor.

Outlet Attachment for a Flow Restrictor

An aspect of some embodiments the current invention relates to an outlet attachment for an in-hose flow restrictor. For example the flow restrictor may be included in a drip emitter conduit. For example, the outlet attachment may include a sleeve for insertion into a conduit, for example an irrigation hose. For example the outlet attachment may include an outlet chamber in fluid communication with an outlet chamber of the flow restrictor. Optionally the outlet chamber of the outlet attachment may have an annular geometry and/or may encircle the longitudinal axis of the sleeve. For example the sleeve may be inserted into a conduit and/or the outlet chamber of the sleeve may link to an outlet opening for example a hole and/or perforation of the conduit independent of the rotational orientation of the sleeve around its longitudinal axis. Optionally, the sleeve may include multiple outlet chambers. For example the sleeve may include dual outlet chambers on or near both ends of the sleeve. For example the sleeve may be inserted into a conduit and/or the outlet chamber of the sleeve may link to an outlet hole and/or perforation of the conduit independent of the longitudinal orientation of the sleeve. Alternatively or additionally, an outlet attachment may attach to the inside wall of a conduit over less than half a circumference thereof.

In some embodiments, an attachment for a flow restrictor may include both an inlet attachment and an outlet attachment. Optionally a single flow restrictor may be suitable to fit to different attachments for example for different applications and/or different conduit sizes. For example the attachment may fit ½ inch tubes and/or ¼ inch tubes. For example the tube may have a diameter ranging between 50 mm to 35 mm and/or from 35 mm to 30 mm and/or from 30 mm to 5 mm. The conduit wall thickness may range for example between 3 to 4 mm and/or between 2 and 3 mm and/or between 0.3 and 2 mm. The length of the sleeve may range for example between 1 to 3 cm and/or between 3 to 6 cm and/or between 6 to 9 cm. The width of the outlet channel of the sleeve may range for example between 5 and 10 mm and/or between 10 to 15 mm and/or between 15 to 20 mm and/or between 20 to 40 mm. The diameter of the perforations in the conduit wall may range for example between 0.1 to 0.7 mm and/or between 0.7 to 1.3 mm and/or between 1.3 to 2 mm and/or greater than 2 mm.

Optionally, snaps, interference elements, friction, a compression fit, welding and/or glue may be used to engage a flow restrictor and/or to hold an inlet and/or outlet attachment to a flow restrictor. Optionally the connection to a conduit holds an assembly (for example flow restrictor core and/or flow restrictor cover and/or attachment) together.

Eccentric Form Flow Restrictors

An aspect of some embodiments of the current invention relates to a flow restrictor having a non-circular shape, for example an eccentric shape. For example the flow restrictor may have a smooth and/or rounded shape with a long axis and/or a short axis. For example the flow restrictor may have an ellipsoid shape and/or the form of a cylinder with an elliptical cross section. Optionally, the flow restrictor may be mounted to a conduit (for example an irrigation hose) and/or an inlet attachment and/or an outlet attachment with the long axis substantially parallel to the mean flow direction in the conduit. In some embodiments, the cross section of the flow restrictor may be asymmetrical, for example egg shaped. Alternatively or additionally the cross section may have the shape of a rounded rectangle and/or parallelogram. Optionally an egg shaped emitter may be oriented for reduced drag. For example a wide end of an egg shaped emitter may be oriented upstream and/or a narrow end oriented downstream. Optionally, the aspect ratio of the axis of the flow restrictor may range between 1.01 to 1.1 and/or between 1.1 to 1.4 and/or between 1.4 to 2.0 and/or between 2.0 to 4.0 and/or greater than 4.

In some embodiments an eccentric rounded flow restrictor may include a core with a circumferential rate limiting flowpath. For example, the rate limiting flowpath may connect between inlet and an outlet of the flow restrictor. The rate limiting flowpath optionally includes a portion formed in a sidewall of the flow restricting core. For example the sidewall may be curved. Optionally the rate limiting flowpath includes one or more portions formed on opposite sidewalls by slip molding (for example a mold may include two portions that are separated by movement substantially perpendicular to the long axis of the core). Optionally, the rate limiting flowpath includes a portion formed on a long side of the core. For example the rate limiting flowpath may include a labyrinth flow path.

When fitting the dripper to the inside surface of the conduit, it may optionally be desirable to align the profile of the bonding surface to the axis of the conduit. A conventional button drip emitter, having axial symmetry, may lack an obvious external feature by which to judge the orientation of the bonding surface and its alignment with the conduit.

In some embodiments of the present invention an optional orientation element may facilitate orientation in one or more axes. For example, a bonding surface may be oriented toward the conduit wall. The bonding surface may optionally be oriented also with respect to the axis of the conduit. For example in some embodiments the bonding surface is curved to fit the internal cylindrical side of the conduit. In such a case, the bonding surface may be oriented parallel to the conduit. For example, an alignment element may include a flat surface and/or a pair of parallel flat surfaces. The flat surface may be aligned with the axis of the conduit. For example, the orientation element may include a step and or a protrusion that is aligned towards a wall of the conduit. In some embodiments the orientation element may be on an outlet attachment and/or on a core of the flow restrictor and/or on a cover thereof.

Flow Restrictors

In some embodiments, a flow restrictor may include a flow limiting subassembly including for example a core and/or a cover. The flow restrictor optionally includes a fluid outlet coupler and/or a fluid outlet attachment and/or a fluid outlet chamber adapted for bonding to an outlet zone on an inside surface of a fluid conduit. Optionally the flow restrictor may be self contained and/or button type and/or may include a pressure compensating regulator. Features disclosed in some embodiments of the current invention facilitate the aligning and/or bonding of a button dripper to a wall of cylindrical conduit with minimal disturbance to the exterior shape and/or properties of the conduit. In some embodiments, the outlet zone may be suitable for perforation by automated machinery. For example the outlet zone may optionally range between 200 to 500% larger than perforation size. Drippers may be spaced between 100 and 1000 mm apart in a conduit. The outlet chamber may allow for 0.5-2.0% misalignment, which may be useful in automatic perforation. For example the outlet chamber may have a width ranging between 2 mm and 10 mm and/or the outlet chamber may have a width ranging between 3 mm and 7 mm. For example the chamber may occupy an angular extent of less than 20° on the circumference of the conduit. For example the installation of the emitter may change the width of the conduit by less than 5%. Perforation may include for example punching, slicing, cutting and or other technologies.

In some embodiments the dripper may be installed in a hose having an inner diameter of between 5 to 30 mm. For example the dripper may be installed in a hose having a wall thickness of between 0.1 to 4 mm, and more particularly in some embodiment the dripper may be installed into a thin walled hose having a wall thickness of between 0.1 to 1.0 mm. For example the hose with the drippers may have a working pressure range between 1 to 3 atm or alternatively for example ranging between 0.2 to 4 atm.

In some embodiments the output flow rate of a flow restrictor is regulated. For example, the emitter may preserve a substantially constant flow rate ranging between 0.2 to 8 l/hr. For example, it may preserve a constant flow rate of about 0.5, 1, 2, 3, 4, or 8 l/hr. For example, the emitter may preserve the specified output flow rate to ±10% under variations of input pressure ranging between for example 1 to 3 atm or alternatively for example ranging between 0.2 and 4 atm, for example due to changes of elevation along the conduit and/or transient pressure changes and/or changes in pressure along the conduit (due for example to head loss along the conduit). The emitter may optionally include a one way valve to prevent back flow.

In some embodiments an outlet chamber and/or the body of the flow restrictor may be produced in a single piece of molded plastic. Optionally a bonding surface between the outlet chamber and the inner wall of the conduit may perpendicular to an axis of the flow restrictor. Optionally, the outlet chamber and/or the bonding zone may be thinner that the flow restrictor. Optionally, the flow restrictor may be disk and/or cylindrical and/or conical in shape. Optionally the flow restrictor may include pressure compensation.

Chemically Active Materials

In some embodiments, an inlet attachment and/or outlet attachment of a flow restrictor may include a chemically active component. Optionally the chemically active component may include a slow release chemical. For example, the slow release chemical may include an herbicide and/or a plant growth inhibitor, for example Rootguard® registered to A. I. Innovations N.V. in San Rafael, Calif., 94901 and/or Treflan® and/or Balan® available from Dow AgroSciences, LLC 9330 Zionsville Road, Indianapolis, Ind. 46268. For example a slow release chemical may include a biocide and/or a fungicide and/or an inhibitor of biofilm producing organisms. For example a chemically active component may prevent calcification and/or mineral precipitation. For example slow release granules may be associated with and/or fixed to the attachment and/or the attachment may be coated with a slow release chemical and/or the material of attachment may be impregnated with the slow release chemical and/or chemicals may be encapsulated inside the material of the attachment and/or encapsulated materials may be fixed to the attachment.

In some embodiments, an inlet attachment and/or an outlet attachment for a flow restrictor may be made of a different material from the flow restrictor. For example the attachment may include a chemically active component and/or the attachment may be made of a less expensive material than the flow restrictor and/or the attachment may be made of a more expensive material than the flow restrictor and/or the attachment may be made to a different (higher and/or lower) machining precision than the flow restrictor.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

An aspect of some embodiments of the current invention relates to an eccentrically shaped in line button drip emitter wherein the shape of the emitter facilitates aligning a attachment interface to an inner surface of an irrigation tube. Optionally, a flow restrictor may have an eccentric cross section with a long axis. For example the flow restrictor may have an elliptical cross section with a pressure reducing labyrinth surrounding an curved outer wall thereof. Optionally, an attachment surface may have an arched form (for example in the form of a cylindrical arch and/or a barrel arch fitting the inner wall of the irrigation tube). Optionally the long axis of the flow restrictor will be aligned to and/or parallel to the main axis of the arched attachment surface. Optionally, the long axis of the cross section of the flow restrictor may serve as an orientation indicator of the attachment surface. For example, by aligning the long axis of the cross section of the flow restrictor with the axis of the irrigation tube, the attachment surface of the drip emitter may be aligned with an inner wall of the irrigation tube. In some embodiments, the dripper may be insensitive to rotation 180 degrees around an axis perpendicular to the attachment surface. For example the cover of the emitter may have longitudinal and/or lateral symmetry. Optionally, the core may by asymmetric in the longitudinal and/or lateral directions. For example, the asymmetric core may fit into the symmetric cover.

An aspect of some embodiments of the current invention relates to an inline button dripper having a core with an elliptical cross section and a cover with extensions. For example, the extensions may extend the cover beyond the portion of the cover attached to the core. Optionally, the extensions may increase the surface area of the cover bonded to an inner surface of an irrigation hose. For example, the area of bonding surface of the extension may be greater than twice (200%) area of bonding of the portion of the cover attached to the core and/or the area of bonding surface of the extension may range between 150 to 200% the area of bonding of the portion of the cover attached to the core and/or the area of bonding surface of the extension may range between 80% to 150% the area of bonding of the portion of the cover attached to the core and/or the area of bonding surface of the extension may range between 40% to 80% the area of bonding of the portion of the cover attached to the core and/or the area of bonding surface of the extension may be less than 40% the area of bonding of the portion of the cover attached to the core.

An aspect of some embodiments of the current invention relates to a core and cover of an inline button drip emitter including corresponding face flanges for holding a flexible membrane. Optionally, a face flange on a cover may be offset with respect a face flange on the core. For example, a face flange on one component may surround a flange on a second component and/or face flanges may overlap. Optionally, a flexible membrane will flex at a joint between opposing offset face flanges. For example, a male flange may overhang a ledge of an opposing face.

EXEMPLARY EMBODIMENTS

Schematic Illustrations

FIG. 1 is a block diagram illustrating a flow restrictor with an inlet attachment in accordance with an embodiment of the present invention. In some embodiments, a flow restrictor 102 is attached to an inlet attachment 104. Optionally flow restrictor 102 is a complete flow restricting device capable of directing flow from an inlet 110 to an outlet chamber 106 and/or capable of limiting a flow rate from inlet 110 to outlet chamber 106 to within a predetermined defined volumetric flow rate over a predetermined range of head drops between inlet 110 and outlet chamber 106. For example, a flow restricting fluid pathway 108 may be a closed conduit connecting inlet 110 to outlet chamber 106. Optionally the closed conduit may be complete prior to connection to inlet attachment 104. Optionally, outlet chamber 106 has an open face suitable for sealing to an inner wall of a conduit. For example, flow restrictor 102 may be suitable for autonomous operation. Alternatively or additionally, flow restrictor 102 may be a modular part, suitable for attachment to one or more different inlet attachments.

In some embodiments, inlet attachment 104 includes a mount 116 for holding flow restrictor 102. Optionally mount 116 retains a fluid outlet 112 of inlet attachment 104 in fluid communication with inlet 110 of flow restrictor 102. Optionally inlet attachment 104 includes one or more inlet openings 114. For example, fluid may pass from a conduit into inlet openings 114 and be directed out outlet 112 to inlet 110 of flow restrictor 102. Optionally, mount 116 is configured to hold flow restrictor 102 with outlet chamber 106 exposed. For example, outlet chamber 106 of restrictor 102 may be exposed and/or attachable to a wall of a conduit while flow restrictor 102 is held in mount 116. Optionally, inlet attachment 104 is configured such that when flow restrictor 102 is mounted to mount 116 and outlet chamber 106 is attached to the inner wall of a conduit, inlet opening 114 is directed towards the inside and/or the axis of the conduit.

In some embodiments an inlet attachment may condition fluid before entering the flow restrictor. For example the inlet attachment may include a filter. The filter optionally removes particles from the inflowing fluid. Alternatively or additionally the inlet attachment may include a chemically active component. For example, an inlet attachment may include a slow release chemical, for example including an herbicide and/or root inhibitor and/or biocide.

Figure 2:
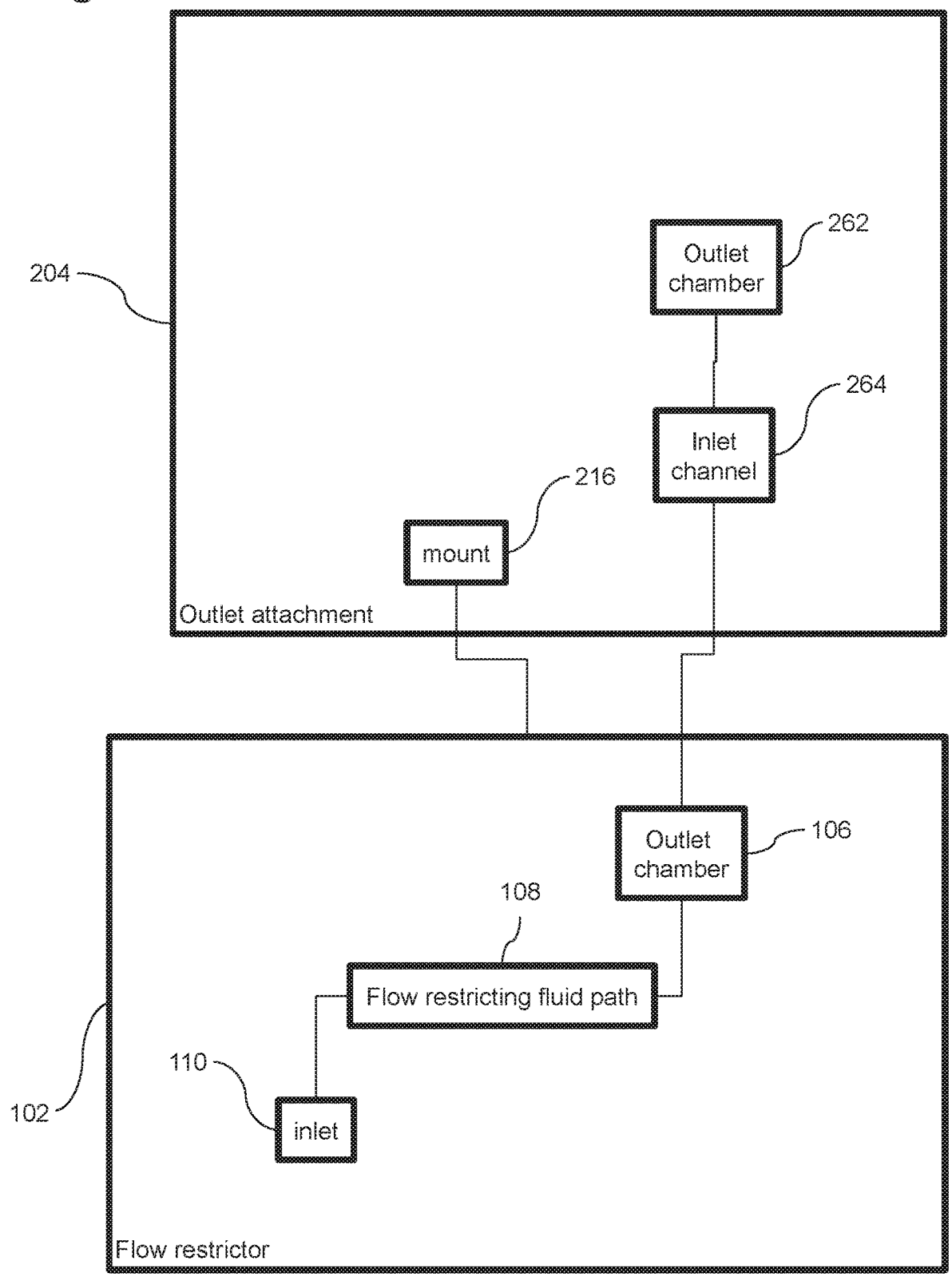
FIG. 2 is a block diagram illustrating a flow restrictor and an outlet attachment in accordance with an embodiment of the present invention.

FIG. 2 is a block diagram illustrating a flow restrictor 102 with an outlet attachment 204 in accordance with an embodiment of the present invention. In some embodiment fluid restrictor 102 may be attached to a mount 216 of outlet attachment 204. Optionally the same flow restrictor 102 may be suitable for use in a modular way with different inlet and/or outlet attachments. Optionally an outlet attachment may include a mount 216 that holds flow restrictor 102 with its outlet chamber 106 in fluid communication with an inlet duct 264 and/or an outlet chamber 262 of outlet attachment 204. For example, different outlet attachments of various geometries may be suitable to connect a modular flow restrictor to different conduits of different sizes, geometries and/or materials. For example, an attachment may include a sleeve for insertion into a hose.

In some embodiments an attachment for a flow restrictor may include one or both of an inlet attachment and/or an outlet attachment. Alternatively or additionally, an inlet and/or outlet attachment may include an adaptor to facilitate installation and/or use of a flow restrictor with machinery that is not suitable for installing or use with the flow regulator by itself. Optionally, an attachment for a flow restrictor may be made of the same material as the restrictor and/or of a different material and/or may include an additive (for example a slow release chemical). The material of the attachment may in some embodiments be more expensive than the material of the flow restrictor (for example with special properties (for example a slow release chemical) and/or less expensive (for example in order to make a large cheap filter for the regulator)).

Figure 3:
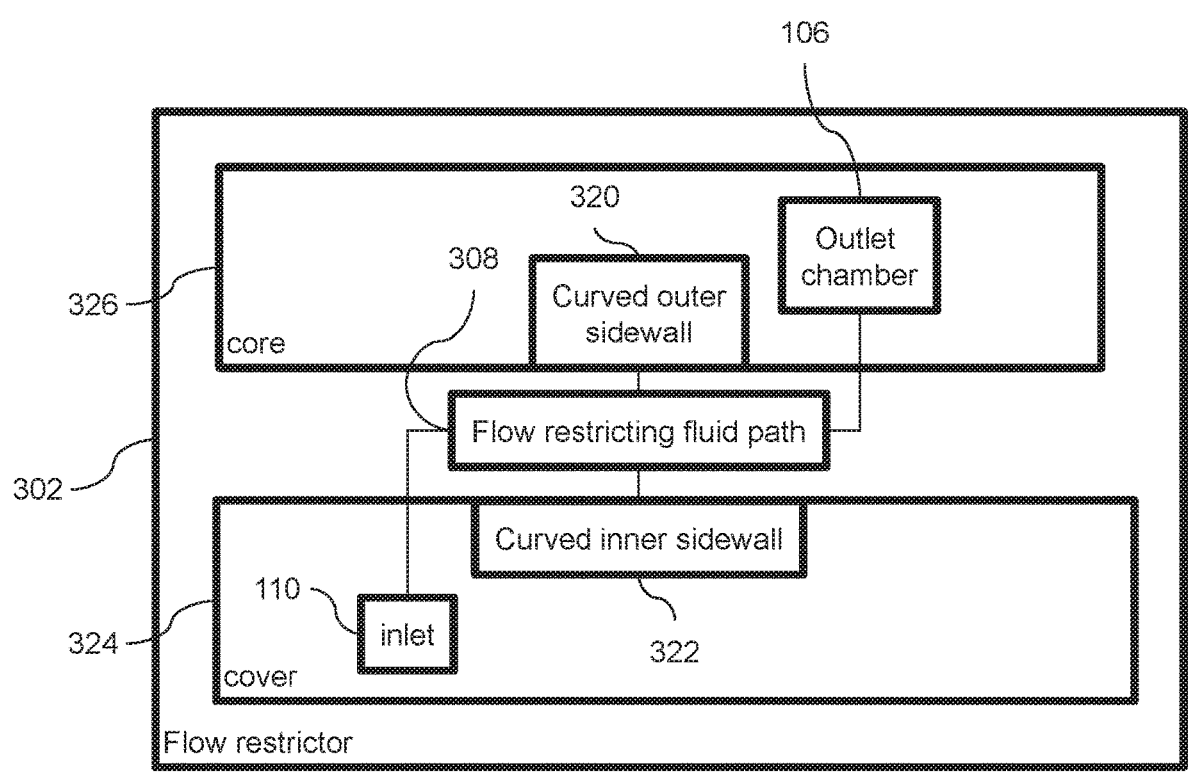
FIG. 3 is a block diagram illustrating a two part flow restrictor in accordance with an embodiment of the present invention.

FIG. 3 is a block diagram illustrating a two part flow restrictor in accordance with an embodiment of the present invention. In some embodiments flow restrictor 302 may include a cover 324 and/or a core 326. For example a flow restricting flow path 308 may be formed between a curved inner wall 322 of cover 324 and a curved outer wall 320 of core 326. Optionally two part fluid restrictor 302 may fit and/or be used with an inlet attachment (for example inlet attachment 104) and/or an outlet attachment (for example outlet attachment 204).

Optionally, flow restricting fluid path 308 may include a labyrinth flow path. For example, the labyrinth may be formed by baffles. Optionally some or all of the baffles may be formed on outer wall 320 and/or on inner wall 322.

Figure 4:
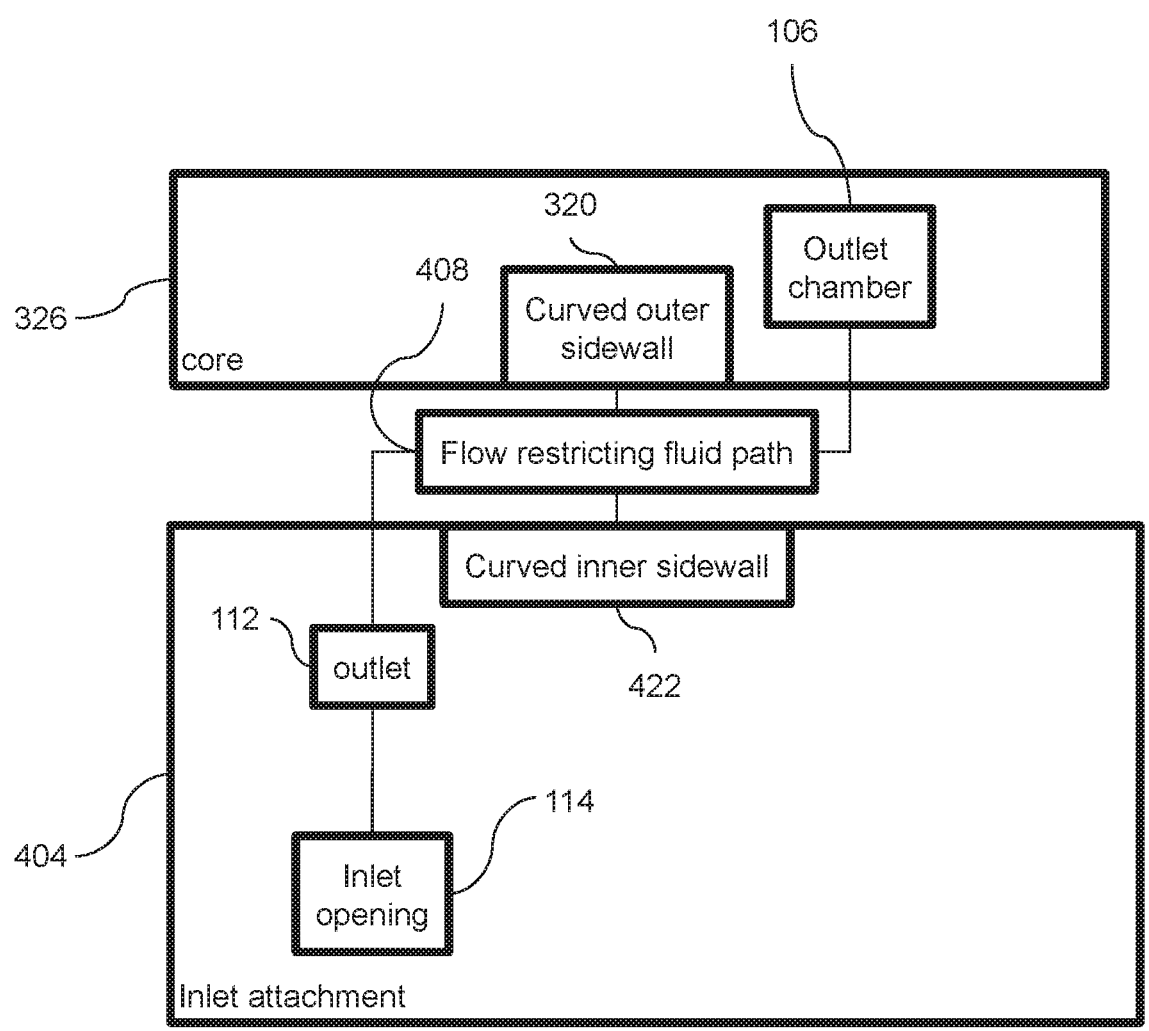
FIG. 4 is a block diagram illustrating a flow restrictor core and an inlet attachment in accordance with an embodiment of the present invention.

FIG. 4 is a block diagram illustrating a flow restrictor core with an inlet attachment in accordance with an embodiment of the present invention. In some embodiments, a fluid restrictor core 326 may be installed directly into an inlet and/or outlet attachment (for example inlet attachment 404). For example and an attachment may include a sleeve for insertion into an irrigation hose. For example the attachment may serve the function of cover 324. For example, a flow restricting fluid path 408 may be formed between an inner wall 422 of the attachment and an outer wall 420 of core 326. For example path 408 may supply fluid communication between an outlet 112 of the attachment and an outlet chamber 106 of core 426.

Round Button Flow Restrictor and Inlet Attachment

Figure 5A:
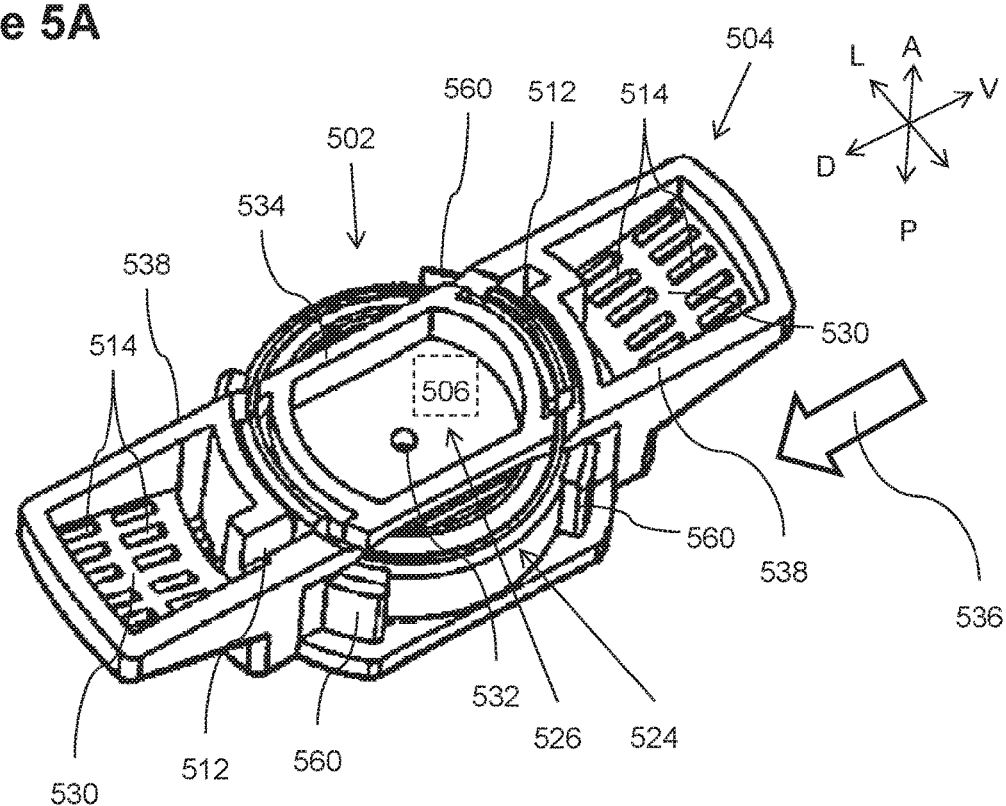
FIG. 5A is an anterior perspective view of a flow restrictor and an inlet attachment in accordance with an embodiment of the present invention.

FIG. 5A is an anterior perspective view of a flow restrictor 502 with an inlet attachment 504 in accordance with an embodiment of the present invention.

Optionally flow restrictor 502 includes a complete two part flow restrictor including a core 526 and a cover 524. Optionally flow restrictor 502 is suitable for use autonomously, for example as an in-line drip emitter attached to an inner wall of a conduit. For example, restrictor 502 may include an inlet with filtering openings 513 suitable for receiving fluid from the conduit and/or an outlet chamber 506 suitable for attaching to an inside wall of the conduit over an outlet perforation. Optionally, flow restrictor 502 is suitable to attach to an inlet attachment 504. For example, attachment 504 includes an enlarged filtering area with inlet openings 514 in fluid communication via an outlet 512 with an inlet 510 (for example see FIG. 5C) in cover 524 of flow restrictor 502. For example, as illustrated in FIG. 5A, a mounting 560 grasps cover 524 of flow restrictor 502. Optionally, attaching restrictor 502 to mounting 560 aligns and/or orients a periphery 534 of outlet chamber 506 and a periphery 538 of inlet chambers 530 of inlet attachment 504 for simultaneously attaching to an inner wall of a conduit (for example as illustrated in FIGS. 5F and 5G) forming an in-line drip emitter assembly with enlarged filter and/or inlet openings 513 and/or inlet opening 514 and/or inlet chambers 530.

In some embodiments the bonding surface (for example periphery 534 and/or periphery 538) is optionally flat. In some embodiments, bonding a flat bonding surface, to the conduit wall may distort the conduit. In some embodiments distortion may change the shape of the conduit, for example the diameter, less than 5%. An outlet perforation zone may occupy an angular ranging for example between 20° to 90° or less of the circumference of the conduit. In some embodiments a cover of the emitter and or an attachment may be bonded to the conduit wall. Alternatively or additionally, the cover and/or the attachment may not be bonded to conduit wall.

In some embodiments inlet 510 may be closed during autonomous operation. For example during manufacturing inlet 510 may be closed and/or attachment 504 may have an optional opening part that breaks open inlet 510 when cover 524 is mounted to mounting 560. Alternatively or additionally, inlet 510 may include one or more openings small enough to act as a filter.

In some embodiments flow restrictor 502 may be a regulated button dripper. For example inlets 510 and/or inlet openings 513 may lead via a flow restricting fluid path 508 to a regulating chamber 556 (for example see FIGS. 5F and 5G). Regulating chamber 556 is optionally in fluid communication with outlet chamber 506 via a port 532.

For convenience defining orientation, an exemplary set of axis are illustrated. The directions used herein include anterior A towards the outlet chamber of the flow restrictor (for example outlet chamber 506 of flow restrictor 502), posterior P away from the outlet chamber of the flow restrictor, ventral V facing the mean direction of flow in the conduit (illustrated by arrow 536), dorsal D opposite ventral V, and lateral L orthogonal to the other two axes.

In the exemplary embodiment of FIGS. 5A-5G, the flow restrictor 502 and attachment 504 are configured for attachment to the inner wall of a conduit over less than half the inner circumference thereof. Other forms of drip emitters may include a modular flow restrictor and/or inlet attachment. For example an inlet attachment may have the form of a cylindrical sleeve that is inserted into a conduit and/or contacts the inner wall of the conduit on opposing sides thereof and/or around a circumference thereof.

In the exemplary embodiment of FIGS. 5A-5G, flow restrictor 502 is a round regulated button restrictor. Optionally, other form of flow restrictors may be attached to an inlet attachment. For example, a simple non-regulated restrictor may be used. Alternatively or additionally a different shaped flow restrictor may be used. For example, an elliptical cross section flow restrictor may be mounted to an inlet attachment. Flow restrictor 502 is a two part flow restrictor. Alternatively or additional a flow restrictor with more or less parts may be mounted to an inlet attachment.

Figure 5B:
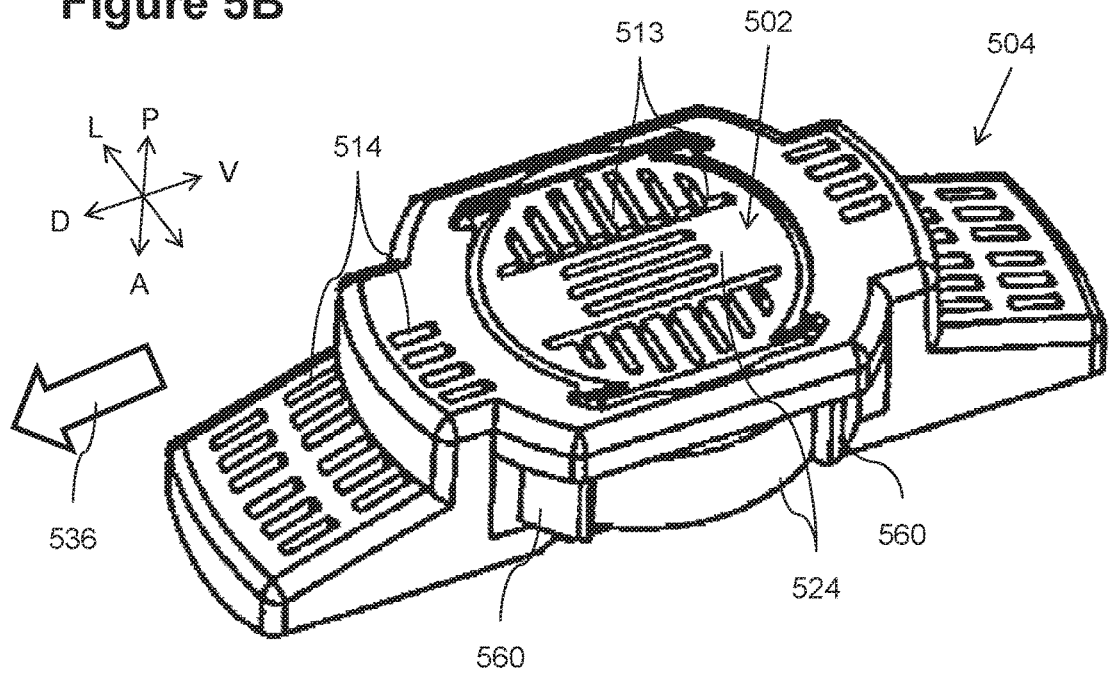
FIG. 5B is a posterior perspective view of a flow restrictor with an inlet attachment in accordance with an embodiment of the present invention.

FIG. 5B is a posterior perspective view of flow restrictor 502 mounted to inlet attachment 504 in accordance with an embodiment of the present invention. Optionally, inlet attachment 504 does not cover some of the inlet openings 513. For example, flow into restrictor 502 may be through inlet openings 514 and/or inlet 510 and/or directly from the conduit through inlet openings 513.

In some embodiment mounting 560 grasps flow restrictor 502 from opposing sides thereof. For example, in the example of FIGS. 5A-5G, mounting 560 grasps restrictor 502 from the dorsal and ventral sides thereof. Optionally, mounting 560 also keeps outlet 512 of attachment 504 aligned and/or in fluid communication with inlet 510 of flow restrictor 502. Optionally, the mount engages restrictor 502 by means of snaps, interference elements, friction, compression (for example between two opposing surface), welding and/or glue. Engaging may include holding inlet attachment 504 to flow restrictor 502. In some embodiments, periphery 534 and/or periphery 538 may be bonded to the inner wall of a conduit. Optionally the connection to the conduit holds the assembly together.

In the exemplary embodiment of FIGS. 5A-5G, the long axis (running from the dorsal to ventral ends) of inlet attachment 504 is optionally aligned with the mean flow direction in the conduit. Optionally the lateral width of inlet attachment 504 and the height (from the anterior to posterior ends) are approximately the same as the width and height of flow restrictor 502. For example the resistance to the mean flow in the conduit of the entire assembly (flow restrictor 502 and attachment 504) together may be approximately the same as the flow resistance of flow resistor 502 by itself.

Figure 5C:
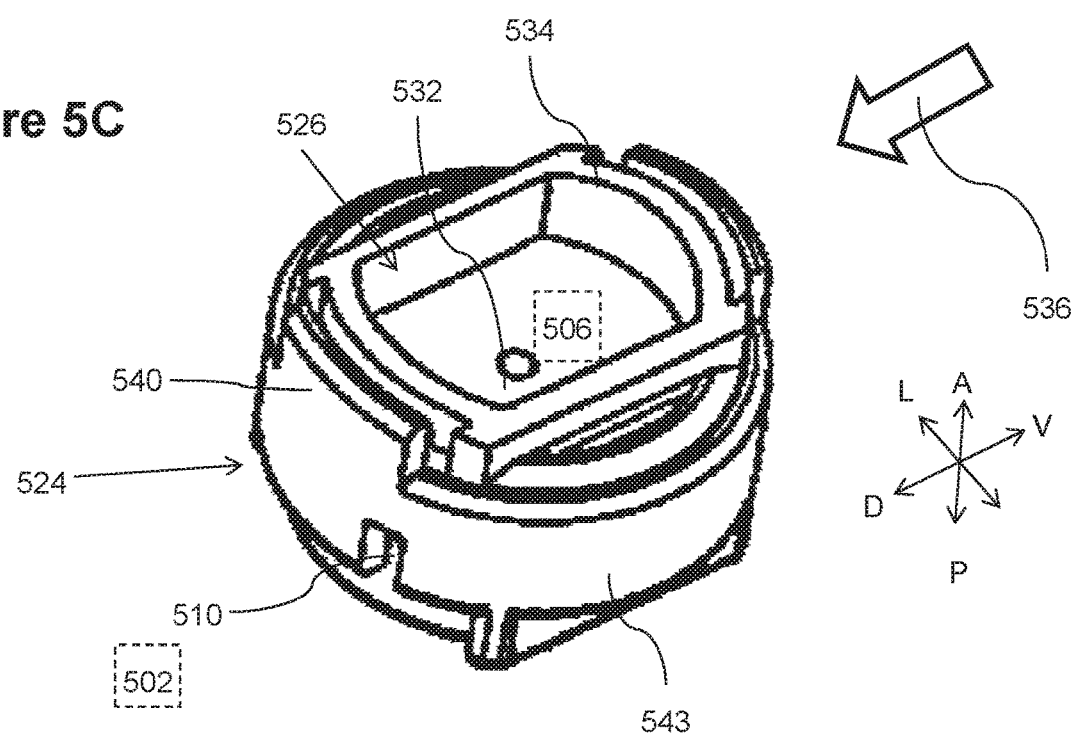
FIG. 5C is an anterior perspective view of a flow restrictor in accordance with an embodiment of the present invention.

FIG. 5C is an anterior perspective view of a flow restrictor in accordance with an embodiment of the present invention. In some embodiments, snaps and/or interference elements may hold cover 524 together with core 526. For example, snap arm extensions 540 on cover 524 snap onto a ledge 541 on core 526.

Figure 5D:
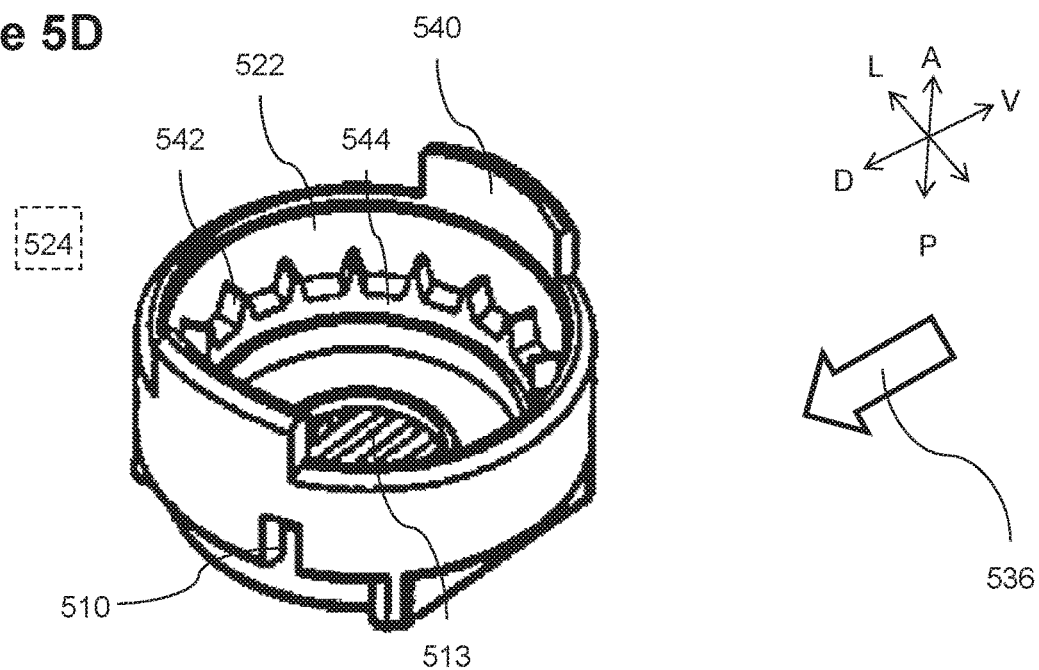
FIG. 5D is an anterior perspective view of a flow restrictor cover in accordance with an embodiment of the present invention.
Figure 5E:
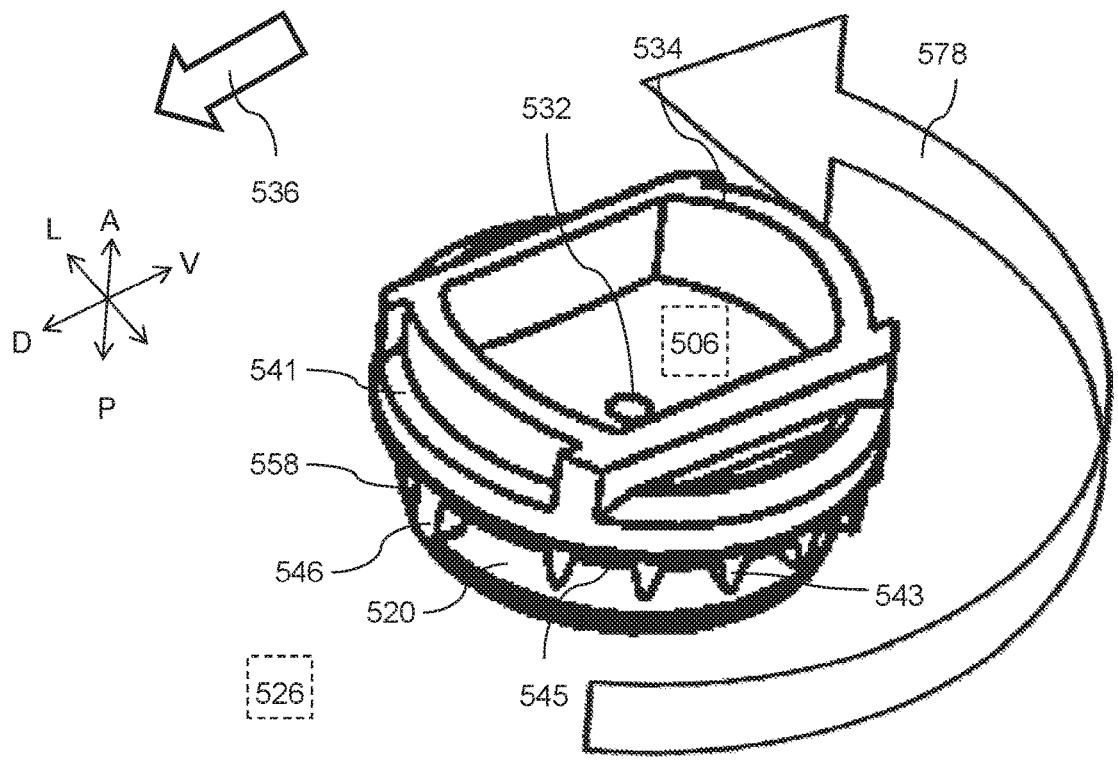
FIG. 5E is an anterior perspective view of a flow restrictor core in accordance with an embodiment of the present invention.

FIGS. 5D and 5E are anterior perspective views of a flow restrictor cover and core respectively in accordance with an embodiment of the present invention. In some embodiments, a flow restricting fluid pathway 508 (for example as illustrated on FIG. 5F) circles and/or revolves around all and/or part of a flow restrictor. For example, as is illustrated, for example, by arrow 578 in FIG. 5E, path 508 optionally runs from fluid inlet 510 between inner curved wall 522 of cover 524 and outer curved wall 520 of core 526 to opening 558. Flow optionally passes through opening 558 to regulating chamber 556. Path 508 is optionally bounded on the posterior side by a sealing ring 544 of cover 524. Path 508 is optionally bounded on the anterior side by a sealing ring 545 of core 526. For example sealing ring 544 may seal against outer curved wall 520 and/or sealing ring 545 may seal against inner curved wall 522. Optionally a divider 546 separates and/or prevents short circuit flow between flow inlet 510 and opening 558.

Flow resistance on path 508 is optionally provided by cooperating baffles. Optionally the baffles may intermesh. For example, when cover 524 is connected to core 526, baffles 542 protruding in an anterior direction from sealing ring 544 on cover 524 may intermesh (protrude between) baffles 543 protruding in a posterior direction from sealing ring 545 on core 526. The various features on cover 524 and/or core 526 may be designed for easy molding. For example, in the embodiment of FIGS. 5A-5G, core 526 and cover 524 are designed to allow molding with a two part mold and/or an injection mold where the mold and the molded parts are separated by longitudinal motion.

FIGS. 5F and 5G are ventral and lateral cross section views respectively of a flow restrictor with an input attachment installed in a conduit in accordance with an embodiment of the present invention. In some embodiments, the faces of inlet chamber 530 and/or outlet 506 are closed by sealing periphery 538 and/or periphery 534 against an inner wall 550 of the fluid conduit. In some embodiments, the assembly (flow restrictor 502 and/or attachment 504) is configured to reduce drag on flow in the conduit. For example, the long axis of the assembly is optionally oriented parallel to the mean flow in the conduit. For example, the assembly may be attached to inner wall of the conduit over less than half a circumference thereof.

In some embodiments inlet opening 513 provides fluid communication between a conduit and the inside of flow restrictor 502. For example, fluid pressure in the conduit may deform a flexible membrane 552 to bulge into regulating chamber 556. In some embodiments, fluid may flow through openings 513 into a duct (for example duct 1011 as illustrated in FIG. 10F) providing fluid communication between openings 513 and/or inlet 510 and/or the beginning of flow path 508. Inflowing fluid optionally circles along path 508 around regulating chamber 556 and/or outlet chamber 506. The fluid optionally exits path 508 at reduced pressure through opening 558 into regulating chamber 556. Fluid optionally exits regulating chamber through port 532 to outlet chamber 506. Fluid in outlet chamber 506 optionally exits the conduit through a perforation 548 in the conduit wall 550. In some embodiments, high pressure differential between outlet chamber 506 and inlet openings 513 and/or inlet 510 causes membrane 552 to bulge towards port 532 increasing the flow resistance in regulating chamber 556. Optionally increased flow resistance under high pressure differentials reduces flow under high pressure differentials and/or regulates flow.

Variations on an Inlet Attachment and Restrictor

Figure 6A:
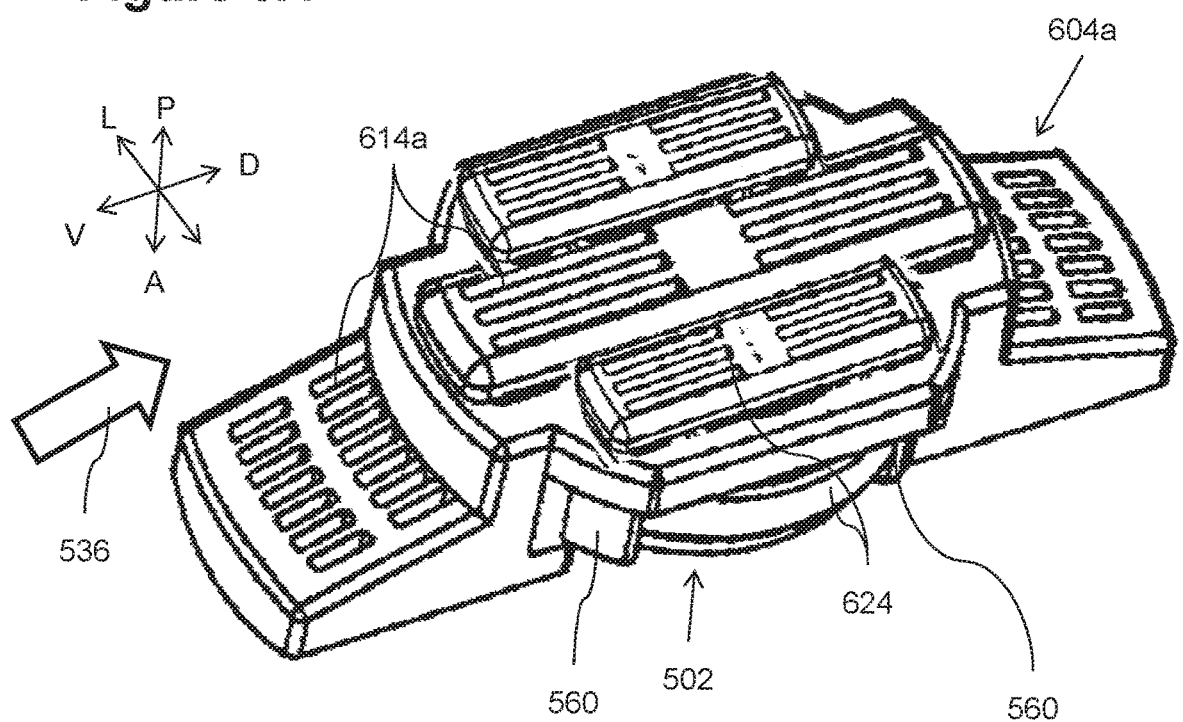
FIG. 6A is a posterior perspective view of a flow restrictor with a complete inlet attachment in accordance with an embodiment of the present invention.

FIG. 6A is a posterior perspective view of flow restrictor 502 with a complete inlet attachment 604a in accordance with an embodiment of the present invention. Optionally when flow restrictor 502 is mounted to attachment 604a, all and/or approximately all fluid entering flow restrictor 602 passes through filtering openings 614a in attachment 604a. Fluid entering openings 614a in attachment 604a may optionally flow into restrictor 502 through openings 513 and/or inlet 510.

Figure 6B:
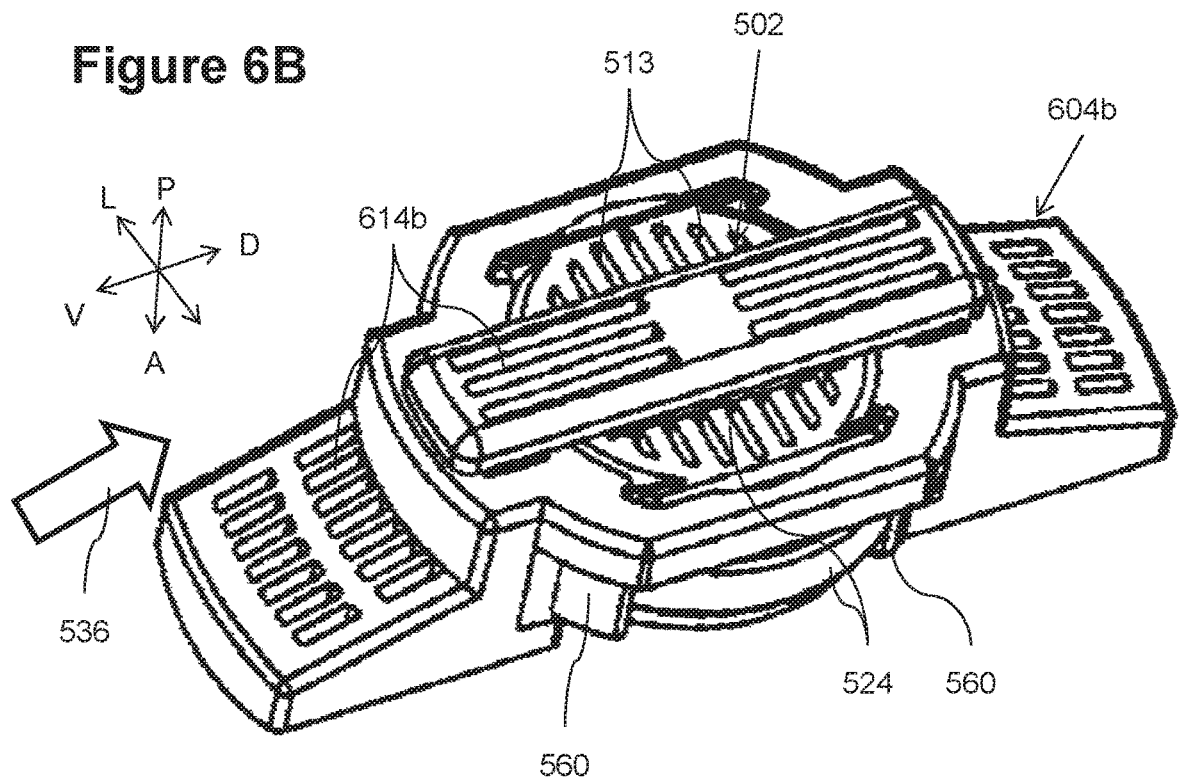
FIG. 6B is a posterior perspective view of a flow restrictor with a semi-complete inlet attachment in accordance with an embodiment of the present invention.

FIG. 6B is a posterior perspective view of flow restrictor 502 with a semi-complete inlet attachment 604b in accordance with an embodiment of the present invention. Optionally when flow restrictor 502 is mounted to attachment 604b, some fluid may enter flow restrictor 502 through inlet attachment 604b and/or some fluid may enter flow restrictor 502 directly from the fluid conduit through openings 513. Fluid entering openings 614b in attachment 604b may optionally flow into restrictor 502 through openings 513 and/or inlet 510.

Figure 6C:
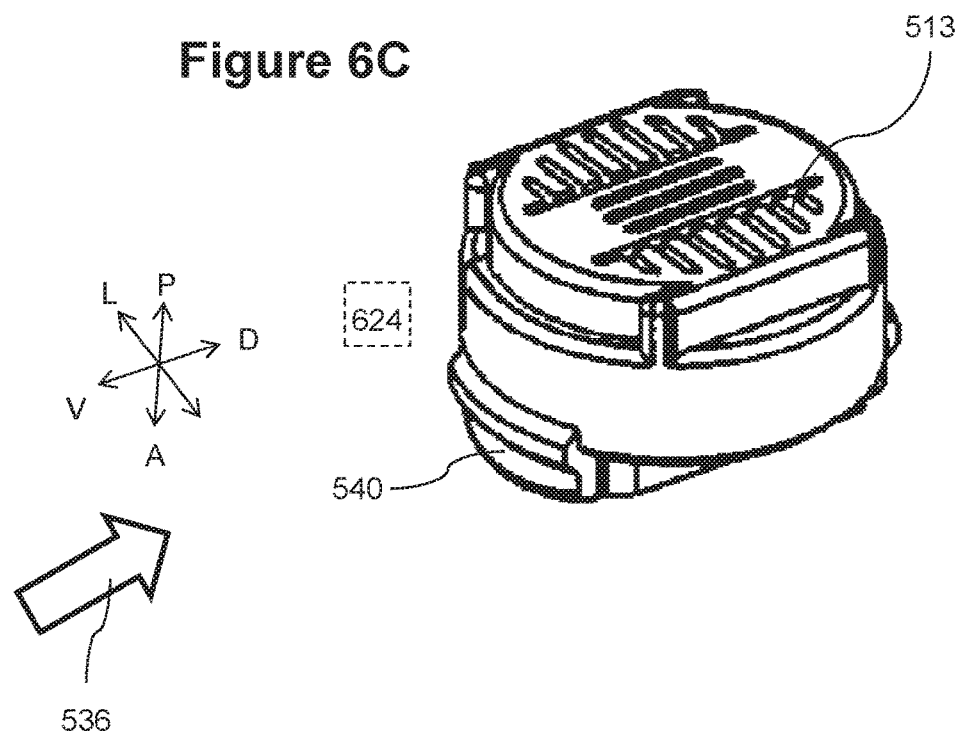
FIG. 6C is a posterior perspective view of a flow restrictor without an attachment inlet in accordance with an embodiment of the present invention.
Figure 6D:
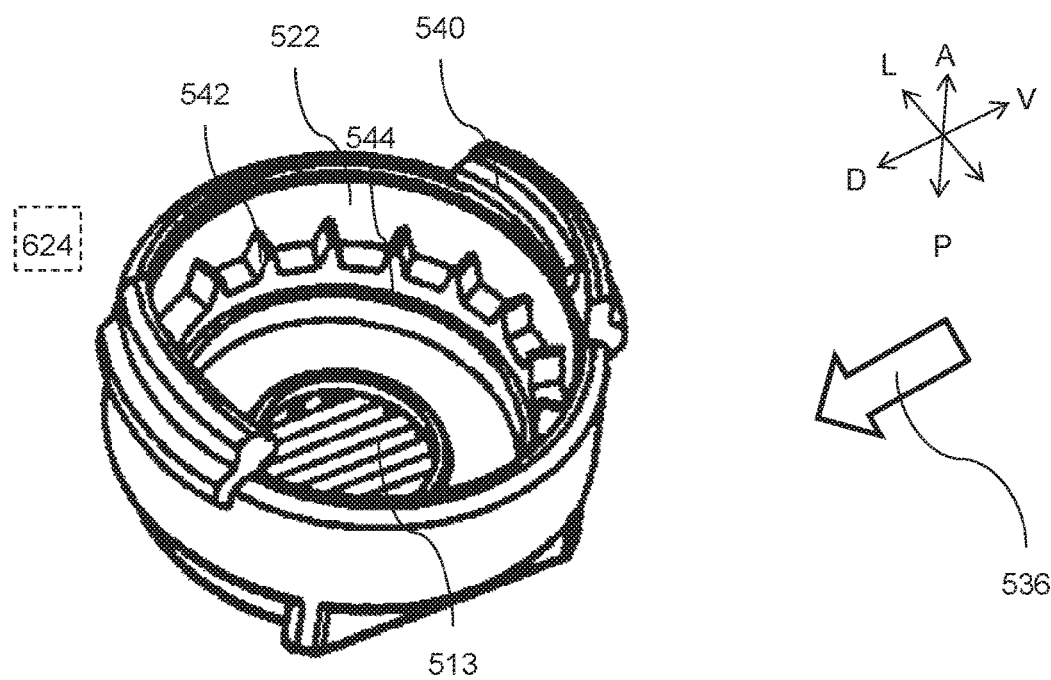
FIG. 6D is an anterior perspective view of a flow restrictor cover without an attachment inlet in accordance with an embodiment of the present invention.

FIGS. 6C and 6D are posterior and anterior perspective views respectively of a flow restrictor cover 624 without an attachment inlet 510 in accordance with an embodiment of the present invention. Cover 624 may optionally include a duct (for example see duct 1011 of FIG. 10F) supplying fluid communication between inlet openings 513 and the beginning of flow restricting fluid path 508. Optionally cover 624 and core 524 may be connected to form an autonomous in-line drip emitter and/or cover 624 and core 524 may be connected to inlet attachment 604a and/or attachment 604b such that all and/or some of fluid entering the flow restrictor passes through openings 614a and/or openings 614b.

Figure 7A:
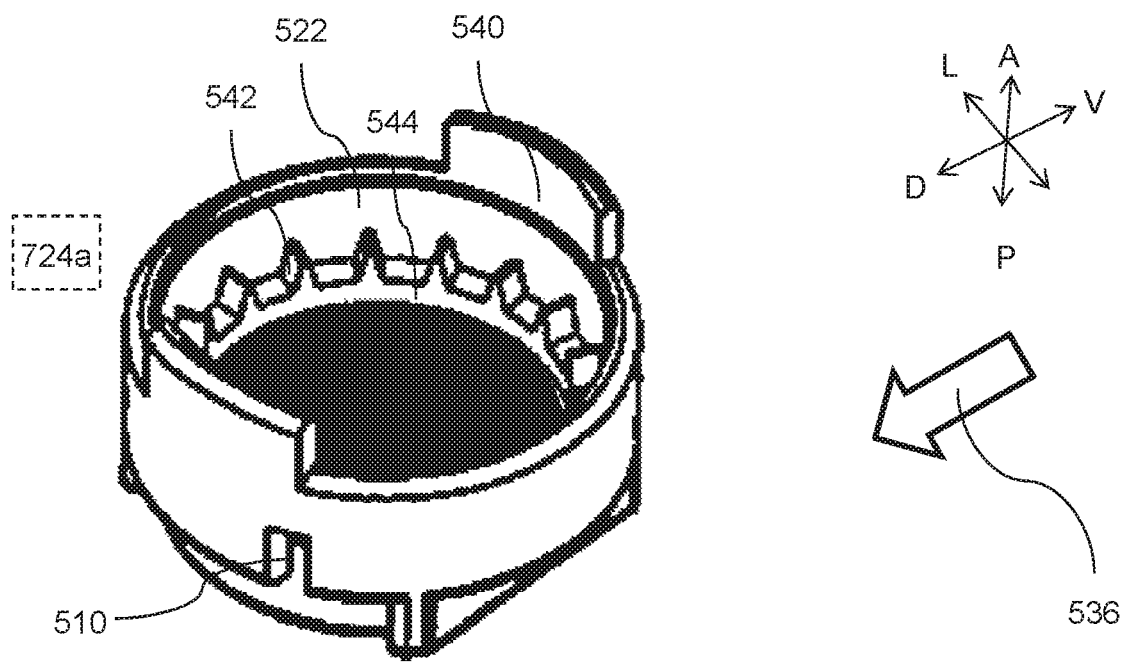
FIGS. 7A and 7B illustrate anterior perspective views of a flow restrictors cover without an inlet filter in accordance with an embodiment of the present invention.
Figure 7B:
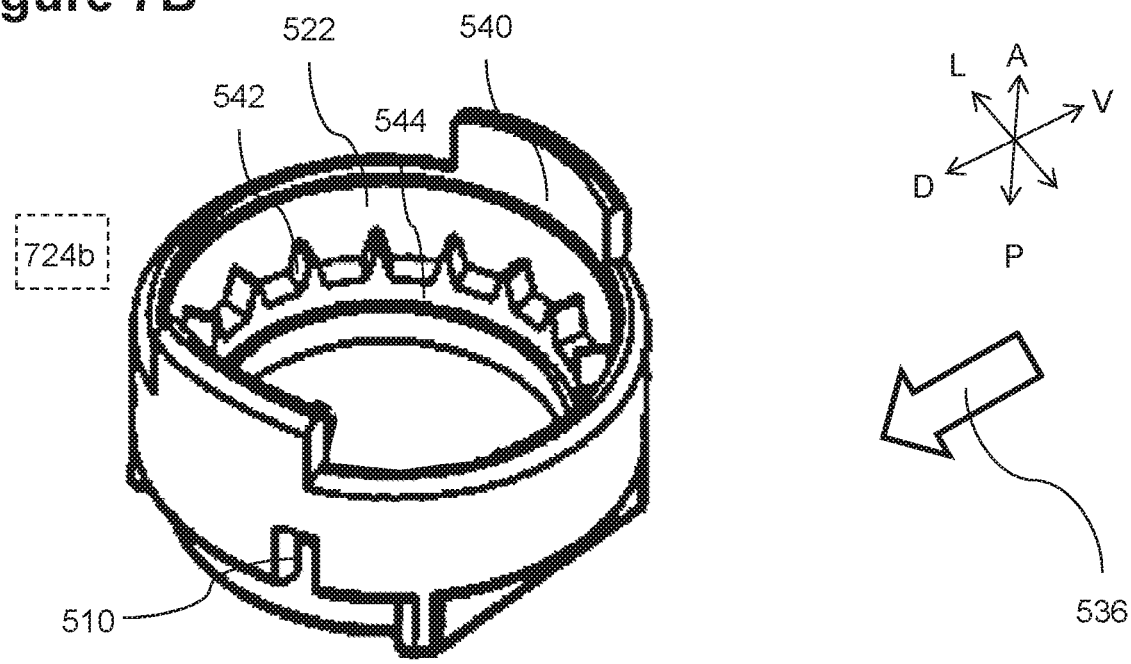

FIGS. 7A and 7B illustrate posterior perspective views of flow restrictors cover 724a and cover 724b in accordance with an embodiment of the present invention. The posterior side of cover 724a is optionally open. For example, cover 742a may be used with inlet attachment 604a. The posterior side of cover 724b is optionally substantially sealed. For example, all fluid entering cover 724b may be through attachment inlet 510. Additionally or alternatively, for a flow restrictor using cover 724b and core 526, fluid pressure on flexible membrane 552 may pass through inlet 510 and the duct connecting fluid inlet 510 to the inner side of the posterior wall of cover 724b (for example the duct may be the same size, shape and position as duct 1011 of FIG. 10F). A flow restrictor using cover 724b could be used for example with attachment 504, attachment 604a and/or attachment 604b. Cover 724b could optionally be used with attachment 504 to produce an assembly with a low profile (not needing extra material of the attachment of the posterior side of the flow restrictor) where essentially all fluid entering the flow restrictor comes through inlet openings 514 and/or inlet chambers 530 and/or outlet 512 of attachment 504.

Outlet Attachment Sleeve for Restrictor Core

FIG. 8A is a view of a cylindrical hose insert sleeve 804 with a mount 860 for a flow restrictor in accordance with an embodiment of the present invention. In some embodiments, sleeve 804 includes an open faced annular inlet chamber 830. Optionally, when a flow restrictor is mounted into mounting 860, fluid communication is provided from an inlet chamber 830 to an inlet of the flow restrictor (for example inlet duct 811 as illustrated in FIG. 8C and/or inlet 910 as illustrated in FIGS. 9B, 9E and/or 9F) via outlet ducts 812. Alternatively or additionally, duct 811 may provide fluid communication between a posterior inlet chamber 831 of mount 860 and fluid path 808 and/or ducts 812. For example, a flexible membrane may divide posterior inlet chamber 831 from a regulating chamber of the flow resistor. Alternatively or additionally, posterior input chamber 831 may be in fluid communication with a posterior inlet opening of a cover of the flow resistor (for example inlet openings 913 of resistor 902 of FIG. 9B). Optionally, sleeve 804 includes one or two open faced annular outlet chambers 862. For example annular outlet chambers 862 may be located on a longitudinal extension of sleeve 804. Fluid communication between outlet chambers 862 of sleeve 804 and an outlet chamber of the flow resistor is optionally by means of one or more fluid passageways (for example passageway 864 in mounting 860 and/or passageway 866 in walls of outlet chamber 806 of the flow restrictor for example as illustrated in FIG. 8B).

In some embodiments, inlet chamber 830 and outlet chamber 862 may entirely surround sleeve 804. Alternatively or additionally, inlet chamber 830 and outlet chamber 862 may only partially surround sleeve 804. In the case (for example where outlet chamber 862 entirely surrounds sleeve 804) the connection between outlet chamber 862 and an outlet opening of the conduit (for example perforation 548 of FIGS. 5F and/or 5G) may be independent of the angular orientation of sleeve 804 around its longitudinal axis. Optionally, a drip irrigation hose could be produced without requiring control of the angular orientation of openings 548 and/or sleeve inserts 804. Optionally, for a sleeve 804 with outlet chambers 862 on both ends (for example as illustrated in FIGS. 8A and 8B) fitting the emitter to an outlet opening of the hose may be independent of the longitudinal direction of sleeve 804. For example, a drip irrigation hose may be produced without having to control the longitudinal orientation of the sleeve inserts 804 (for example the ventral-dorsal orientation of insert 804).

In some embodiments, fluid may enter fluid inlet chamber 830 and/or posterior inlet chamber 831 through inlet openings 814.

FIG. 8B is a perspective view of a cylindrical hose insert with a mount and a flow restrictor core in accordance with an embodiment of the present invention. In some embodiments, the inner surface of mounting 860 may form an outer wall of flow resistant fluid path 808. For example, a flow resistor core 826 may be mounted directly into mounting 860 without a separate cover.

In some embodiments, flow resistor core 826 may have an elliptical cross section. Optionally, the long axis of the ellipse may be mounted parallel to the mean flow direction in the conduit (for example parallel to the longitudinal axis of sleeve 804). Alternatively or additionally the flow restrictor may have a different shape. For example the flow restrictor may have a circular cross section (for example similar to resistor 502). Alternatively or additionally the flow resistor may have a hydrodynamic shape, for example an egg shape. For example an egg shaped flow resistor may have the large end facing the flow (oriented in the ventral direction).

In some embodiments sleeve 804 may include ribs. For example, ribs may protrude radially from the sleeve. Optionally ribs may contact and/or be bonded to the inner walls of a conduit. For example ribs 838a and 838b may define outlet chamber 862 and/or inlet chamber 830. Ribs 838c may help prevent the wall of the conduit from collapsing into inlet chamber 830. Optionally, a rib may completely surround sleeve 804 (for example ribs 838a completely surround sleeve 802. Alternatively or additional a rib may partially surround the sleeve (for example ribs 838b and rib 838c only partially surround sleeve 802. Alternatively or additionally a rib may be continuous and/or discontinuous.

FIG. 8C is a perspective view of an elliptical flow restrictor core in accordance with an embodiment of the present invention. In some embodiments, a flow restricting fluid pathway 808 circles around all and/or part of a flow restrictor.

For example, flow restricting fluid path 808 passes along the inner surface of mounting 860. As is illustrated, for example, by arrow 878, path 808 optionally runs from fluid inlet duct 811 between inner curved surface of mounting 860 and outer curved wall 820 of core 826 to opening 858 to a regulating chamber (for example chamber 956 as illustrated in FIG. 9D). Path 808 is optionally bounded on the posterior side by a sealing ring 844 of core 826. Path 808 is optionally bounded on the anterior side by a sealing ring 845 of core 826. For example sealing ring 844 and/or sealing ring 845 may seal against an inner curved surface of mounting 860. Optionally water a divider 846 separates and/or prevents short circuit flow between flow inlet duct 811 and opening 858.

Figure 11A:
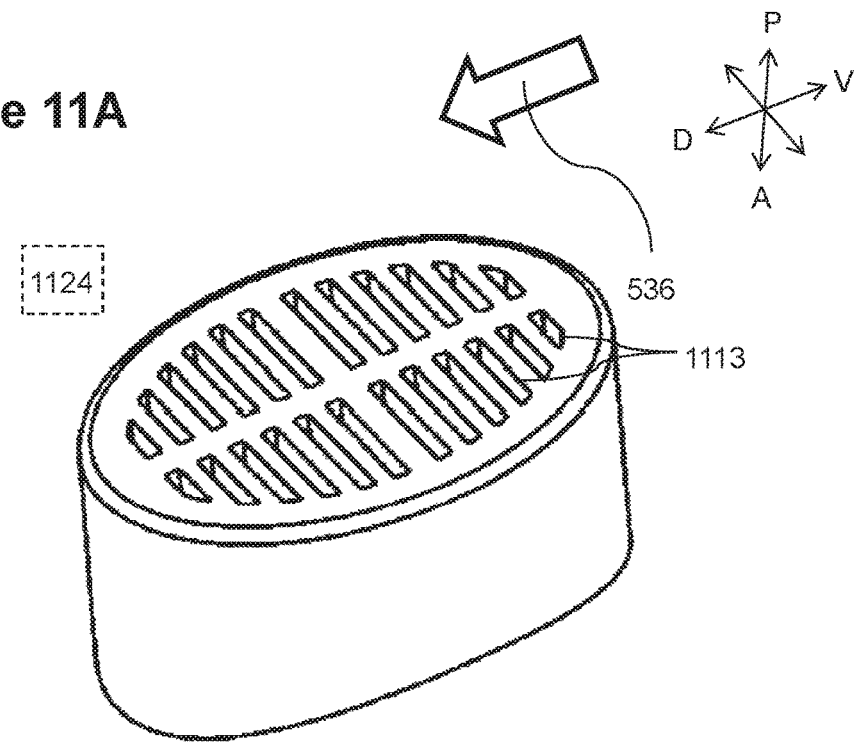
FIG. 11A is a lateral perspective view of an elliptical flow restrictor cover in accordance with an embodiment of the present invention.
Figure 11B:
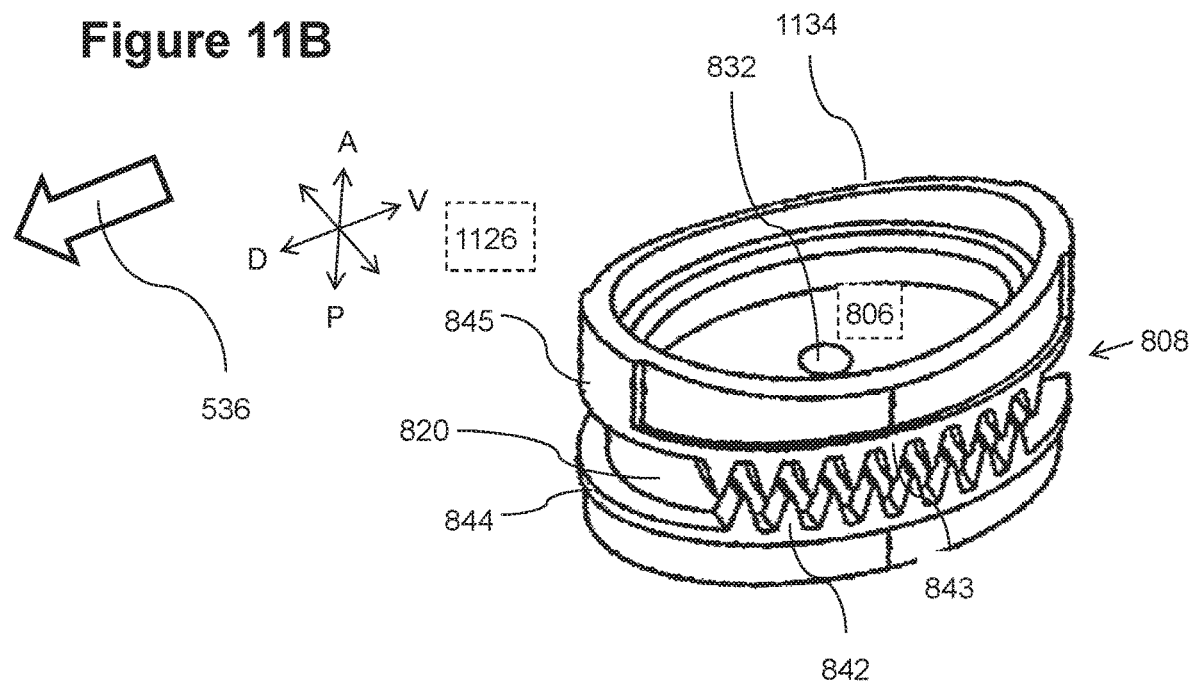
FIG. 11B is a lateral perspective view of an elliptical flow restrictor core in accordance with an embodiment of the present invention.
Figure 11C:
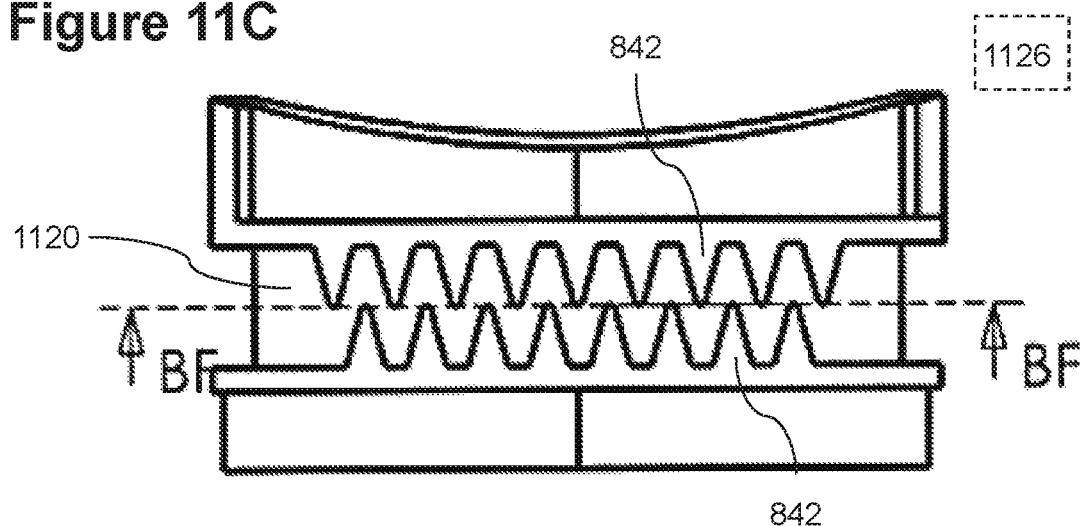
FIG. 11C is a lateral view of an elliptical flow restrictor core in accordance with an embodiment of the present invention.

Resistance on path 808 is optionally provided by cooperating baffles. For example baffles may be intermeshed (for example anterior directed baffles 842 protruding between posterior directed baffles 843) and/or the ends of baffle may line up (for example as illustrated in FIG. 11C). For example, baffles 842 protruding in an anterior direction from sealing ring 844 and baffles 843 protruding in a posterior direction from sealing ring 845. The various features on core 826 may be designed for easy molding. For example, in the embodiment of FIG. 8C, core 826 is designed to allow molding with a two part mold (for example a slip mold) and/or an injection mold where the mold and the molded parts are separated lateral motion. For example the baffles 842 and/or baffle 843 may be formed on one or both lateral surfaces of core 826. For example mold removal may be facilitate by orienting the angle of divider 846 and/or opening 858 and/or the walls of the baffles 842 and/or baffle 843 to are nearly parallel and/or pointing towards the lateral movement of the mold. The elliptical shape of core 826 optionally supplies extra length along the lateral sides of core 826 for the baffles of flow path 808. Optionally details do not protrude ventrally or dorsally in a way which would be difficult to mold with a laterally moving slip mold. In some embodiments it may be more difficult to seal an elliptical flow resistor than sealing a round flow resistor. Optionally molding baffles 842 and/or baffles 843 and/or ring 844 and/or ring 845 on core 826 may make it easier seal mounting 860 and/or cover 924 over elliptical core 826 than having sets of intermeshing baffles on the core and cover. Alternatively or additionally, an elliptical core may have a set of baffles that intermeshes with baffles on a mounting and/or cover.

Outlet Attachment Sleeve for Complete Restrictor

FIGS. 9A, 9B and 9C are perspective anterior and posterior views of an elliptical flow restrictor and an anterior view of an elliptical flow restrictor mounted in a conduit insert sleeve 904 respectively in accordance with an embodiment of the present invention. In some embodiments, a mount (for example mount 960 of FIG. 9C) may be configured to hold a complete flow restrictor (for example including a core 826 and a cover 924). For example, flow restricting fluid path 808 may pass along the inner surface of a cover (for example the inner wall of cover 924). As is illustrated, for example, by arrow 878, path 808 optionally runs from fluid inlet duct 811 between inner curved surface of cover 924 and outer curved wall 820 of core 826 to opening 858 to regulating chamber (for example chamber 956 as illustrated in FIG. 9D). Path 808 is optionally bounded on the posterior side by a sealing ring 844 of core 826. Path 808 is optionally bounded on the anterior side by a sealing ring 845 of core 826. For example sealing ring 844 and/or sealing ring 845 may seal against an inner curved surface of cover 924. Optionally water a divider 846 separates and/or prevents short circuit flow between flow inlet duct 811 and opening 858.

FIG. 9D is a longitudinal cross-sectional (cut along line BN of FIG. 9C) view of cylindrical hose insert sleeve 904 with a mount and a flow restrictor in accordance with an embodiment of the present invention. Optionally, when restrictor 902 is mounted to mounting 960 (and/or when core 826 is mounted to mounting 860) a periphery 834 of outlet channel 806 is aligned and/or co-oriented with ribs 838a and/or ribs 838b and/or ribs 838c and/or a periphery 972 of mounting 860 and or mounting 960 such that they all contact the inner side of the conduit closing the face of outlet chamber 806 and/or inlet chamber 830 and/or outlet chamber 862.

FIGS. 9E and 9F are large scale and close up (of section OO FIG. 9C) oblique cross-section (along line BZ) views of a cylindrical hose insert with a mount and a flow restrictor in accordance with an embodiment of the present invention. In some embodiments inlet opening 913 and/or inlet 910 provide fluid communication between a conduit and the inside of flow restrictor 902. For example, fluid pressure in the conduit may deform a flexible membrane 952 to bulge into regulating chamber 956. In some embodiments, fluid may flow through openings 913 to the posterior side of membrane 952 and/or through duct 811 into the beginning of fluid path 808. Alternatively or additionally, fluid may flow through openings 814 into inlet chamber 830 and/or through duct 811 to the posterior side of membrane 952 and/or the beginning of fluid path 808. Inflowing fluid optionally circles along path 808 around regulating chamber 856 and/or outlet chamber 806. The fluid optionally exits path 808 at reduced pressure through opening 858 into regulating chamber 856. Fluid optionally exits regulating chamber through port 832 to outlet chamber 806. Fluid in outlet chamber 806 optionally exits to outlet chamber 862 through passageways 864 in mounting 860 and/or passageway 866 in core 826 and/or passageway 968 in cover 924. Fluid in outlet chamber 862 optionally exits the conduit through a perforation in the conduit wall. In some embodiments, high pressure differential between outlet chamber 806 and inlet openings 813 and/or inlet duct 811 causes membrane 852 to bulge towards port 832 increasing the flow resistance in the regulating chamber. Optionally increased flow resistance under high pressure differentials regulates flow.

Two Part Labyrinth

Figure 10A:
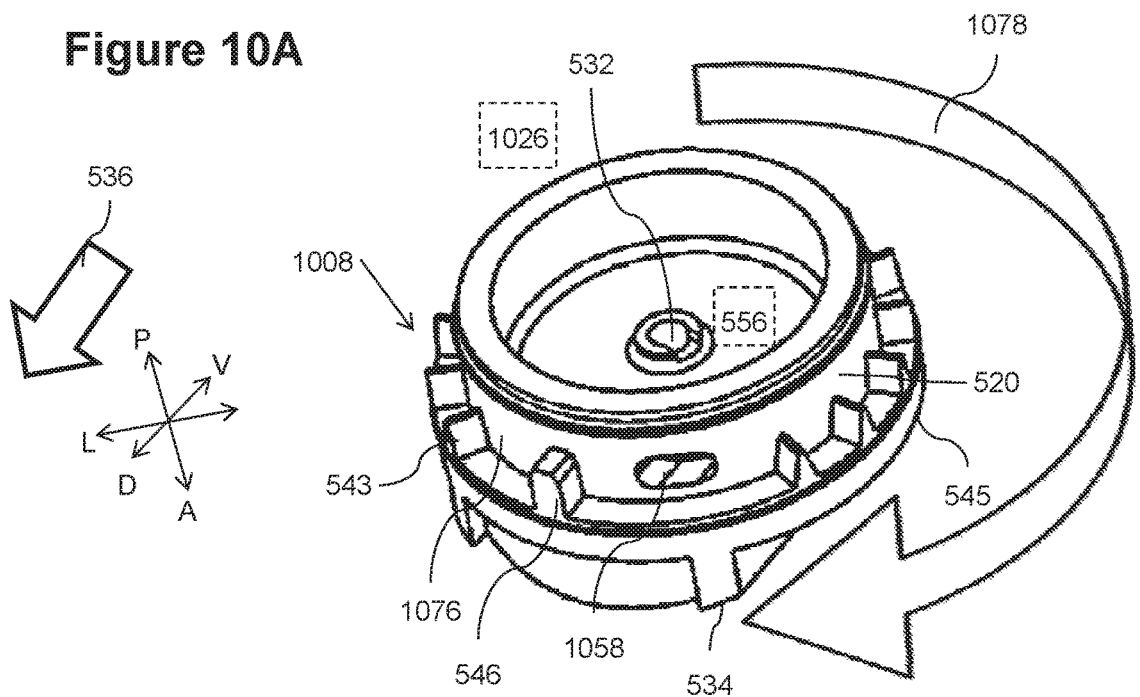
FIG. 10A is a posterior perspective view of a round flow restrictor core in accordance with an embodiment of the present invention.

FIG. 10A is a posterior perspective view of a round flow restrictor core 1026 in accordance with an embodiment of the present invention. Arrow 1078 illustrated how flow in flow resisting fluid path 1008 enters at a beginning 1076 circles and/or revolves around regulating chamber 556 and through opening 1058 into regulating chamber 556.

Figure 10B:
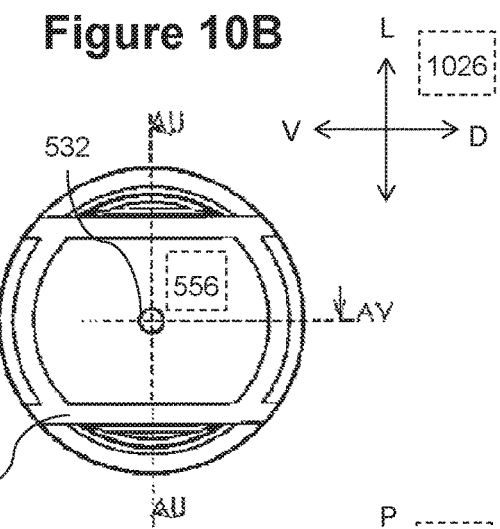
FIG. 10B-10D are orthogonal views of a round flow restrictor core in accordance with an embodiment of the present invention.
Figure 10C:
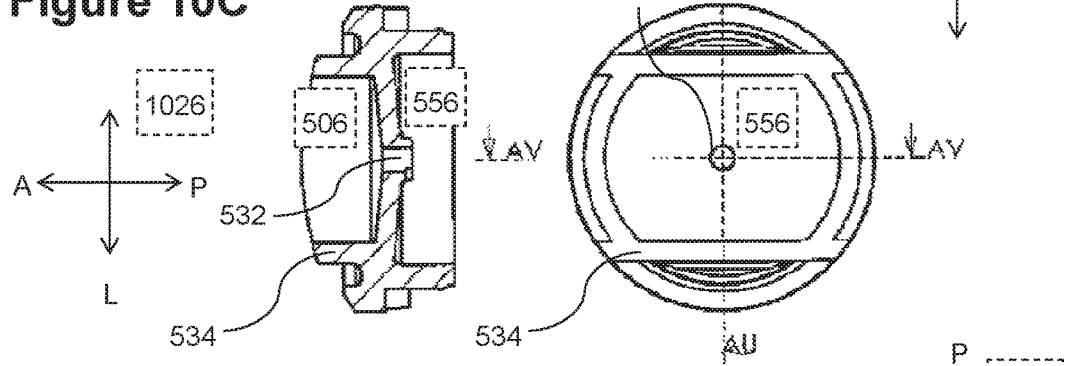
Figure 10D:
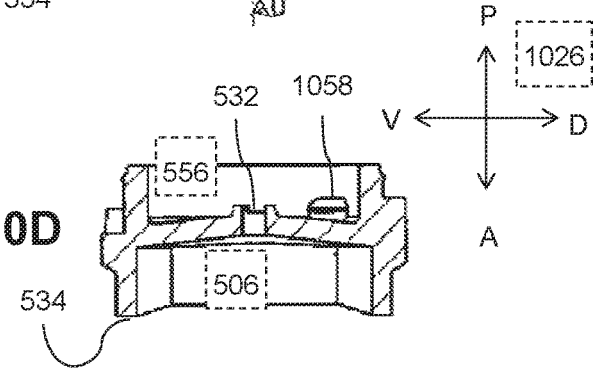
Figure 10E:
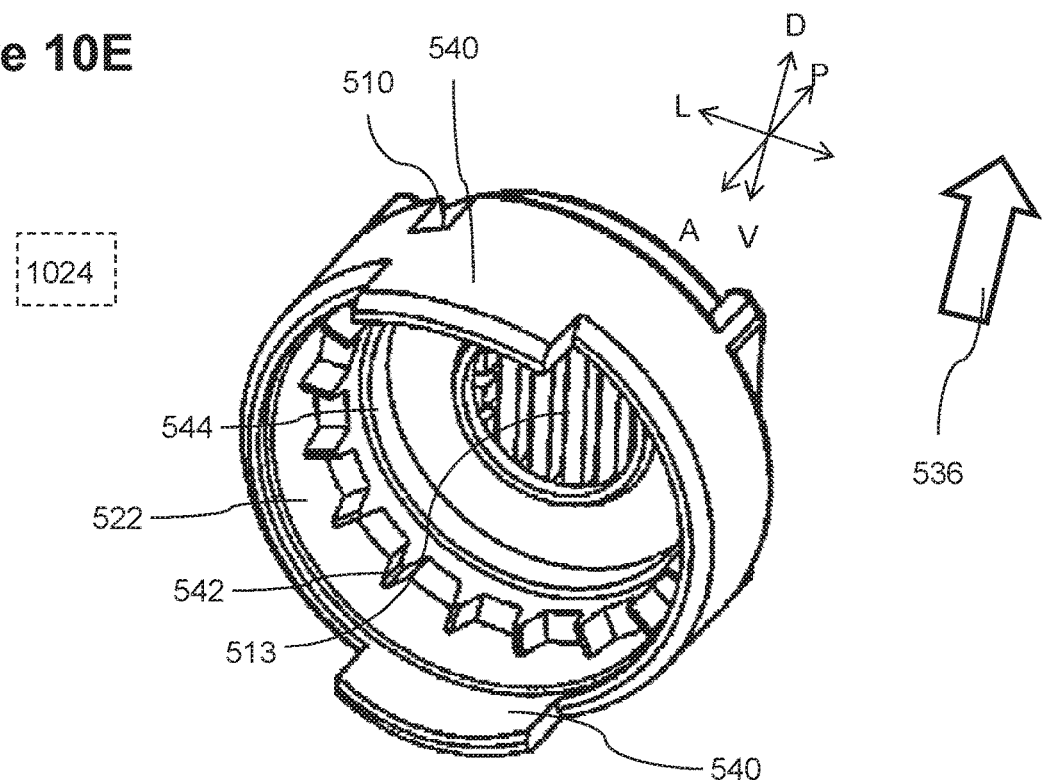
FIG. 10E is an anterior perspective view of a round flow restrictor cover in accordance with an embodiment of the present invention.
Figure 10F:
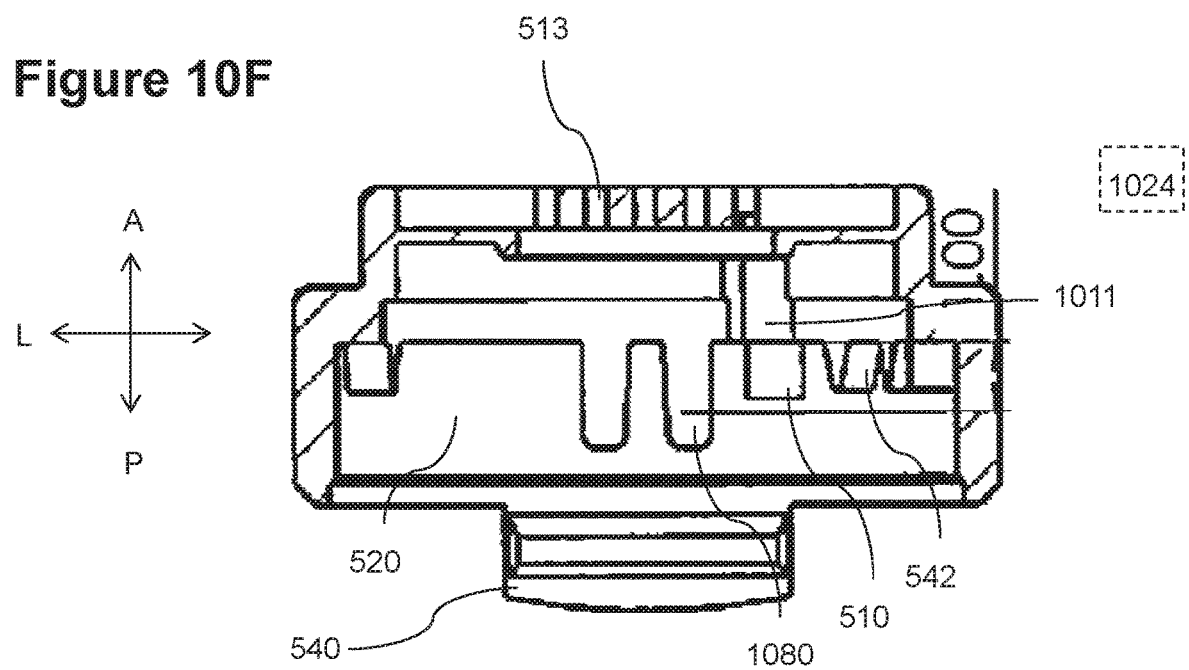
FIG. 10F is a cross section view of a round flow restrictor cover in accordance with an embodiment of the present invention.

FIG. 10B-10D are orthogonal views of a round flow restrictor core in accordance with an embodiment of the present invention. FIG. 10E is an anterior perspective view of a round flow restrictor cover 1024 in accordance with an embodiment of the present invention.

FIG. 10F is a cross section view of a round flow restrictor cover in accordance with an embodiment of the present invention. Cover 1024 optionally includes a duct 1011 that provides fluid communication from inlet openings 513 and/or the posterior side of membrane 552 to inlet 510 and/or beginning 1076 of flow resisting fluid path 1008. Optionally when cover 1024 is fit over core 1026, an aligning element 1080 grasps and/or aligns with and/or seals to divider 546. Aligning element 1080 to divider 546 may align baffles 542 (for example in between) to baffles 543. Optionally, element 1080 may close over and/or seal over divider 546 preventing and/or impeding short circuit flow from inlet 510 and/or duct 1011 to opening 1068.

Figure 10G:
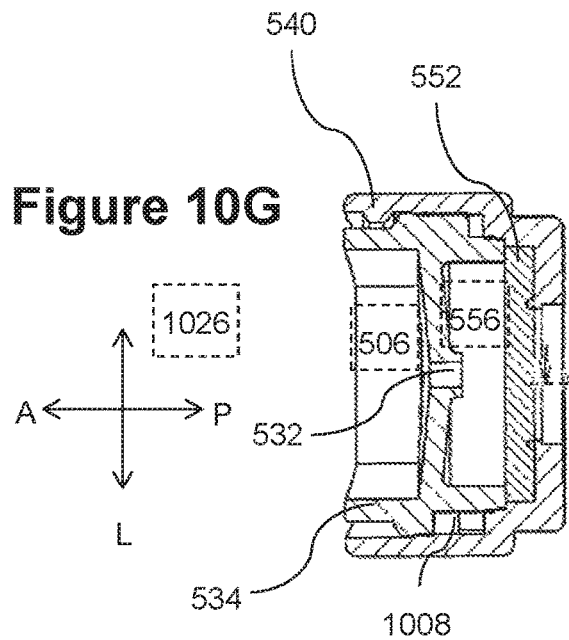
FIG. 10G-10H are orthogonal views of a round flow restrictor in accordance with an embodiment of the present invention.
Figure 10H:
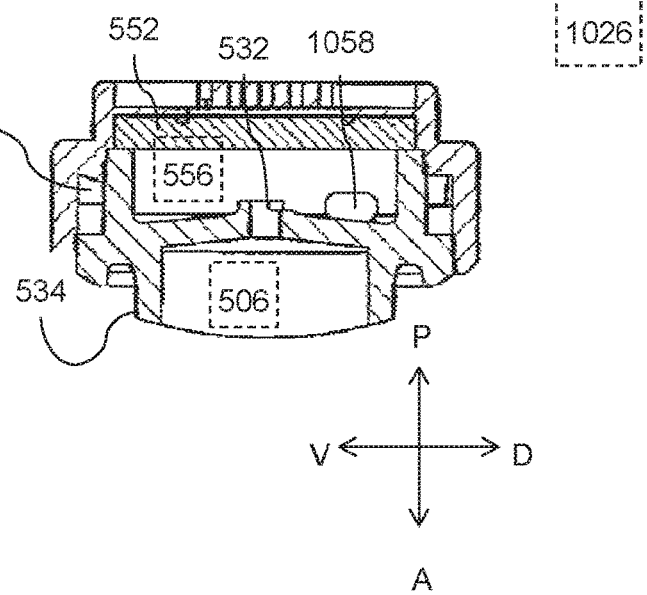

FIG. 10G-10H are orthogonal views of a round flow restrictor in accordance with an embodiment of the present invention.

Oval in Hose Button Dripper

FIGS. 1ee1A and 11B are lateral perspective views of an elliptical flow restrictor cover 1126 and core 1124 respectively in accordance with an embodiment of the present invention. For example the flow resistor of FIGS. 11A-11D may be an autonomous drip emitter. Optionally a closed periphery 1134 of outlet chamber 806 may be attached to an inner conduit wall. Optionally cover 1124 may include a duct (for example a groove) providing fluid communication between inlet openings 1113 and the beginning of fluid path 808. Optionally the long axis of the resistor will be aligned with mean flow in the conduit.

Figure 11D:
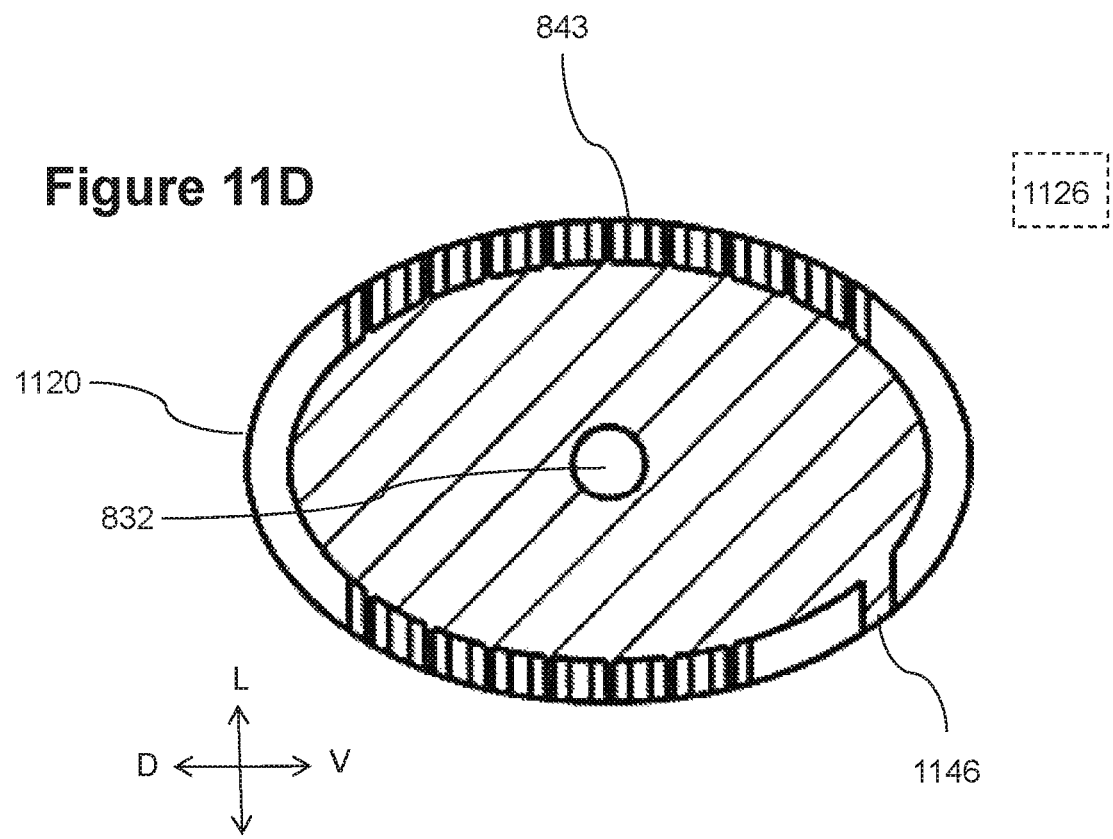
FIG. 11D is a cross sectional view of an elliptical flow restrictor core in accordance with an embodiment of the present invention.

FIG. 11C is a lateral view of an elliptical flow restrictor core in accordance with an embodiment of the present invention and FIG. 11D is a cross sectional view of the elliptical flow restrictor core (cut along line BF) in accordance with an embodiment of the present invention. It can be seen that baffles 842 and/or 843 and/or divider 846 are oriented to facilitate lateral removal of mold parts.

Figure 11E:
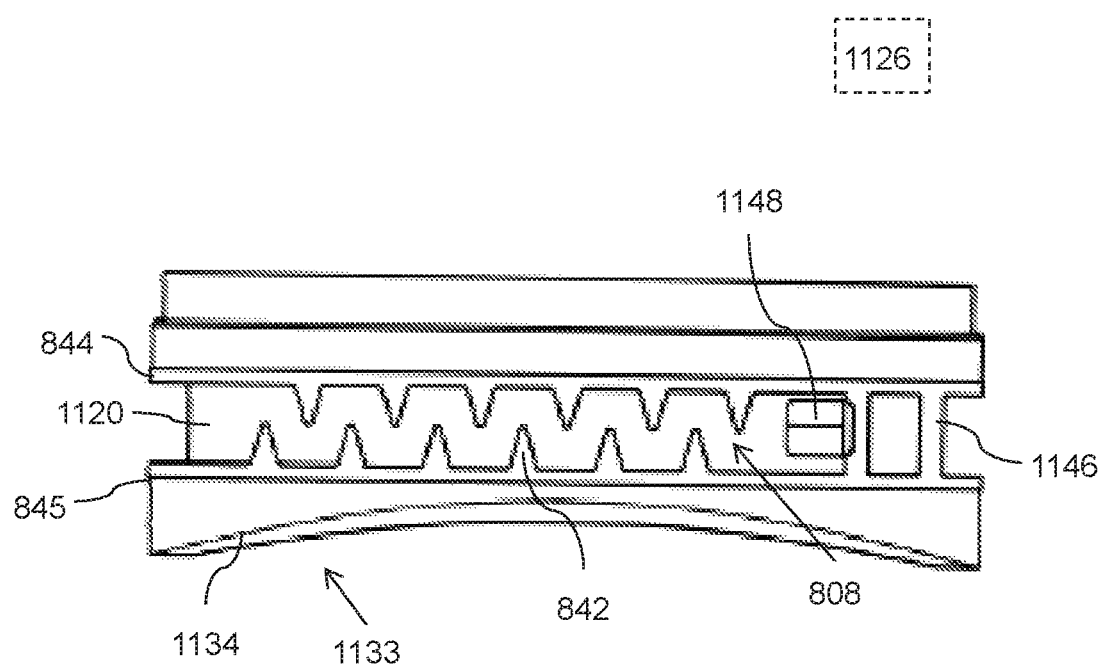
FIG. 11E is a lateral orthogonal view of an elliptical flow restrictor core in accordance with an embodiment of the present invention.

FIG. 11E is an orthogonal view of an elliptical flow restrictor core 1126 looking towards the dripper along the lateral axis in accordance with an embodiment of the present invention. In some embodiments, the long (longitudinal Dorsal-Ventral) axis of an elliptical dripper is oriented parallel to the main flow direction in an irrigation tube. Optionally there is a vertical axis (the anterior-posterior axis). Optionally, the vertical axis is perpendicular to the tube wall when the dripper is installed into an irrigation tube. For example an anterior face of the core 1126 may be bonded to the inner wall of the tube and/or a posterior face of the core 1126 may face the central axis of the tube. Optionally the lateral axis of the dripper is oriented across the tube.

In some embodiments, the core is asymmetrical over one or more planes. For example, as illustrated in FIG. 11D, core 1126 does not have longitudinal symmetry, for example because divider 1146 is only on the ventral end of core 1126 and/or there is no analogous structure on the distal end of the core. For example, core 1126 does not have lateral symmetry, for example, because divider 1146 is on only one side of the core and/or there is no analogous structure on the opposite side of the core. Optionally, the orientation of the core 1126 with respect to a cap may be insensitive to rotation over 180 degrees around the vertical access. Optionally, the orientation of the core 1126 with respect to the flow direction may be reversible, that is to say the core and/or the assembled dripper may be insensitive to rotation over 180 degrees around the vertical axis. In some embodiments, an asymmetric core may fit into a symmetric cover. For example, core 1126 may fit into cover 1124 and/or core 1126 may fit into cover 1404 as illustrated for example in FIGS. 14A, 14B and 15A to 15D, for core 1226.

In some embodiments, a pressure reducing flow path 808 supply a fluid path connecting an opening 1148 in the regulation chamber wall to a fluid inlet 811. Optionally, in use, fluid inlet 811 is in communication with high pressure fluid for example in an irrigation tube. Optionally, the regulation chamber may include an open chamber to the posterior end of the core 1126 (for example as illustrated for core 1226 in FIG. 12B).

In some embodiments, the anterior surface 1133 of a dripper includes a bonding surface 1134 configured to bond with an inner face of an irrigation hose. Optionally surface 1133 is arched to match the inner surface of the irrigation tube. For example, the bounding surface may lie on a substantially cylindrical virtual surface with a longitudinal axis parallel to the long axis of the elliptical cross section of core 1226. For example, the axis of the arched surface 1133 illustrated in FIG. 13A is parallel to line B-B which is the long axis of the cross section of core. The 3D arched shape of the bonding surface 1134 is explained herein below in connection to the perspective view of FIG. 16C.

In some embodiments, a divider 1146 prevents shortcut flow between the dripper inlet 811 and the opening 1148 to the regulation chamber 856. For example, to reach the regulating chamber 856, flow entering the dripper may be forced to traverse a pressure reducing path encircling nearly the entire dripper (for example more than 90% and/or between 75% to 90% of the dripper and/or between 50% to 75% of the dripper). Alternatively or additionally, flow from the dripper inlet 811 to the regulation chamber opening 1148 may traverse less than half the circumference of the dripper core 1126. For example, flow entering the inlet 811 may split to two paths passing either side of the dripper to one or more openings to the regulation chamber. For example, a flow path from the dripper inlet to the regulation chamber may traverse between 40% to 50% of the circumference of core 1126. Optionally, flow obstructers (for example baffles 842) are arranged along path 808, for example, along the long sides of the dripper (for example as illustrated in FIG. 11D). Alternatively or additionally flow obstructers may be arranged at one or both short sides of core 826.

Figure 12B:
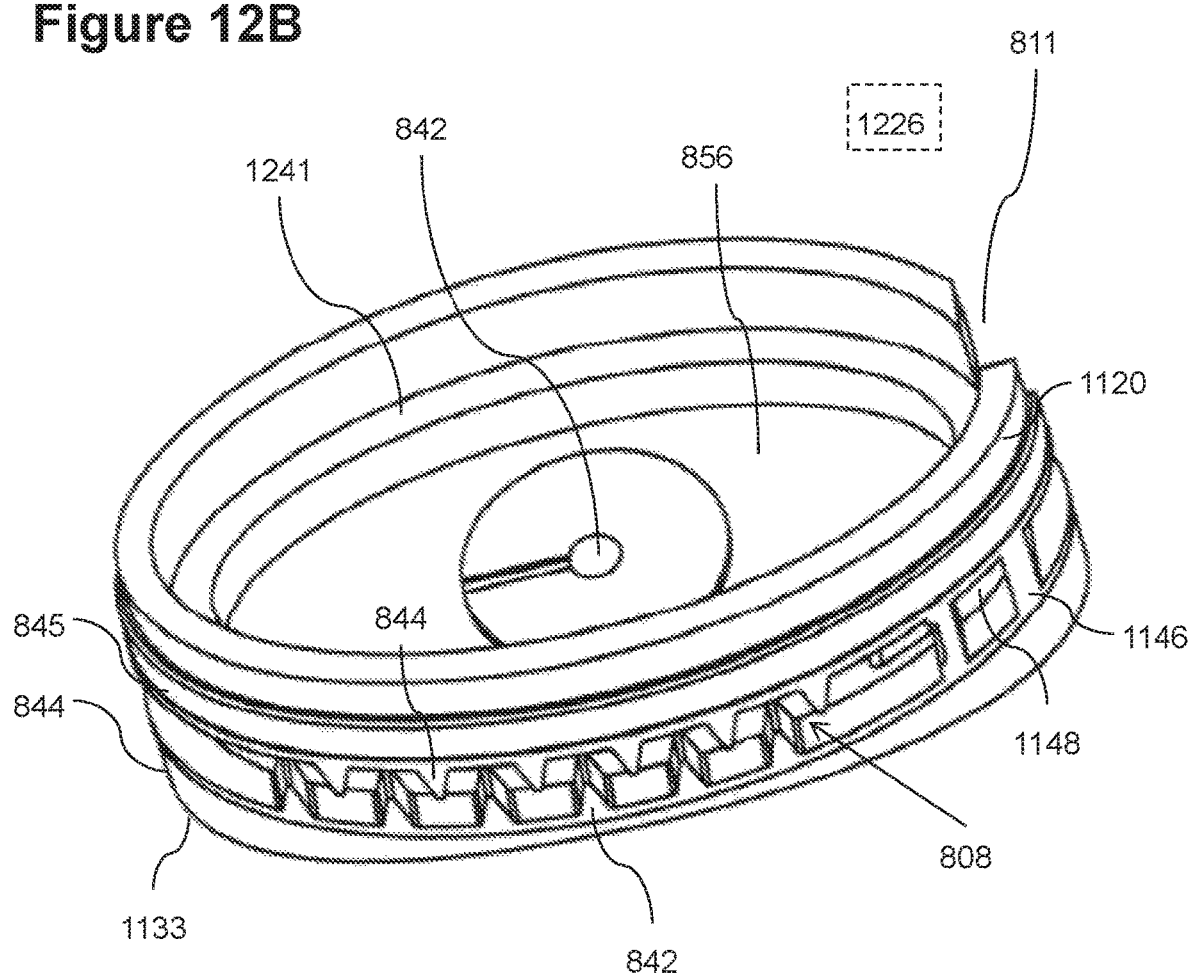

FIGS. 12A and 12B are perspective views of an elliptical flow restrictor core in accordance with an embodiment of the present invention. In some embodiments the core includes a cylindrical portion. For example, core 1226 has the form of a right cylinder with an elliptical cross section. Optionally, the axes of the system me be defined as an anterior-posterior axis which is the main access of the cylinder. Optionally, the ventral-dorsal axis is defined parallel to the long axis of the elliptical cross section. Optionally, the lateral axis is defined parallel to the short axis of the elliptical cross section.

In some embodiments, the posterior face of the core includes a face flange. For example, the posterior face of core 1226 includes a female face flange. For example, the flange includes a ledge 1241 surrounded by an outer wall 1120. Optionally, ledge 1241 and/or outer wall 1120 at least partially surround the regulation chamber 856 on the posterior face of the core 1226.

In some embodiments, an outer wall 1120 optionally extends outward posterior to surrounding path 808 to form a posterior sealing ring 845. Outer wall 1120 optionally extends outward anterior to path 808 to form an anterior sealing ring 844. In some embodiments sealing rings 844 and 845 seal against a wall of a cover to delimit flow path 808 (for example as illustrated in FIGS. 16A and 16B where sealing rings 844 and 845 seal against wall 1424 of cap 1404). An inlet 811 to the pressure reducing flow path 808 optionally has the form of break in posterior sealing ring 845 and/or outer wall 1120. For example, an outer wall may surround a regulating chamber except for one or more breaks that make up less than 5% of the circumference and/or between 5% to 10% of the circumference and/or between 10% to 20% of the circumference and/or between 20% to 40% of the circumference. In some embodiments, core 1226 will include an outlet chamber. For example, the outlet chamber may be on an anterior face thereof, for example as illustrated in chamber 1106 of FIG. 11B and/or chamber 1406 of FIG. 16C.

In some embodiments, the cross section of a chamber on the face of an emitter component may match the cross section of the component. For example, regulating chamber 856 is elliptical matching the elliptical cross section of core 1226. Alternatively or additionally, the cross section of a chamber on the face of an emitter component may differ from the cross section of the component. For example, an elliptical core may include a circular regulating chamber (for example the walls of the regulating chamber may thicker on the short sides (e.g. the ventral and dorsal walls of regulating chamber 856) of the component than on the long sides (e.g. the lateral walls of regulating chamber 856).

In some embodiments, the cross section of a chamber on the face of an emitter component may match the cross section of a face flange. For example, regulating chamber 856 is elliptical matching the elliptical cross section of facing face flange 1419. Alternatively or additionally, the cross section of a chamber on the face of an emitter component may differ from the cross section of face flange.

FIGS. 13A, 13B and 13C are orthogonal views of an elliptical flow restrictor core in accordance with an embodiment of the present invention. Cross section 13B is cut across line B-B (illustrated in FIG. 13C). Cross section 13A is cut across line A-A (illustrated in FIG. 13C). In some embodiments an anterior face 1133 of core 1226 may be arched to fit a curved inner wall of an irrigation tube, for example as illustrated in FIG. 13A. Optionally, anterior face has an elliptical cross section which extends laterally outward. As illustrated, for example in FIG. 13B, the longitudinal profile of the anterior face 1133 may appear to have a concave form. An exemplary form of the anterior face is illustrated in a 3D perspective view in FIG. 16C.

In some embodiments, a part of an in line dripper may include an orientation marking 1380. Optionally, an orientation marking and/or a set of markings may indicate a position on the part. Alternatively or additionally, an orientation marking and/or a set of markings may indicate a direction. For example, markings 1380 mark the central longitudinal axis of the anterior face of core 1226. For example, markings 1380 are illustrated in a 3D perspective view in FIG. 16C.

Figure 14A:
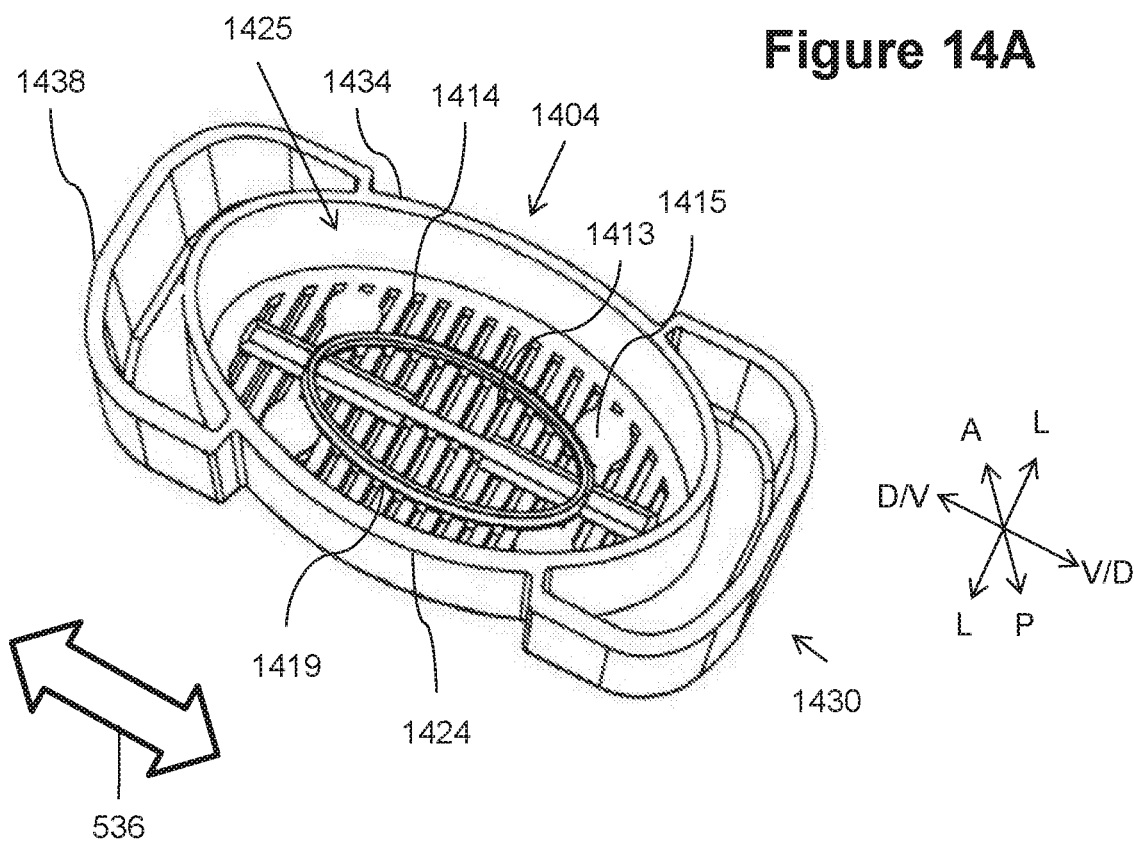
FIG. 14A is a posterior perspective view of an elliptical flow restrictor cover in accordance with an embodiment of the present invention.

FIG. 14A is an anterior perspective view of a cover 1404 for a flow restrictor in accordance with an embodiment of the present invention. Optionally, cover 1404 includes a section 1425 sized and shaped to couple to and/or grasp elliptical core 1226. For example, a wall 1424 of section 1425 closes against sealing rings 844 and/or 845. For example, when core 1226 is inserted into section 1425, wall 1424 may seal to rings 844 and/or 845 and/or delimit the outer face of channel 808 and/or form a closed conduit between inlet 811 and opening 1148. Optionally, section 1425 includes an oval and/or cylindrical chamber surrounded by wall 1424. Alternatively or additionally, wall 1424 may include breaks and/or may grasp core 1426 from opposing sides.

In some embodiments, cover 1404 includes a face flange 1419. Optionally, face flange 1419 is configured to push a membrane against corresponding face flange on a core (for example ledge 1241 of core 1226). For example, flange 1419 includes an elliptical shaped male face flange protruding from an anterior facing surface. Optionally, flange 1419 matches regulation chamber 856 of core 1226. Optionally, flange 1418 has the form of a closed ellipse. Alternatively or additionally, flange 1419 may non-continuous (for example with breaks).

In some embodiments, a cover may include an extension, extending the cover beyond the section 1425 that is coupled to core 1226. Optionally, cover 1404 includes longitudinal extensions 1430. For example, extensions 1430 include a surface 1438 configured to bond to an inner wall of an irrigation hose. For example surface 1438 may increase the bonding surface area of the dripper and/or improve connection to the inner wall of irrigation tube. For example, cover 1404 is configured for welding to an inner wall of an irrigation tube. In some embodiments, wall 1424 separates extensions 1430 from section 1425. For example when surface 1434 and/or surface 1438 are bonded to a hose there may be no fluid communication between extension 1430 and section 1425. Alternatively or additionally, fluid may flow between extension 1430 and section 1425. For example, section 1430 may include a fluid inlet in communication with a fluid inlet of core 1226 and/or a section 1430 may include a fluid outlet in communication without a fluid outlet (for example outlet chamber 1106 and/or 1406).

In some embodiments, cover 1404 may be configured to be insensitive to the direction of flow in a tube. For example, a dripper may be insensitive to 180 degree rotation around the vertical axis. For example, the dripper may be reversible in orientation as long as a longitudinal axis of the dripper is parallel to the main flow direction in the tube. In some embodiments, the dripper may be insensitive to reversal in the lateral direction. For example, cover 1404 has longitudinal symmetry and/or lateral symmetry. Alternatively or additionally, a cover may not be symmetrical and/or may have a preferred orientation towards flow.

In some embodiments, a dripper cover will include a fluid inlet. For example, a fluid inlet of cover 1404 includes slits 1413 and 1414. Optionally, the fluid inlet will include a filter. For example, slits 1413 and/or 1414 may be thin enough to block entry to particles into the emitter. Optionally, a fluid inlet may overlie a regulator member and/or facilitate pressure communication between fluid from the irrigation tube and the flexible regulator membrane. For example, inlets 1413 are on the inside of flange 1419 and/or overlie membrane 552 (for example as illustrated in FIG. 16A). Optionally, flange 1419 contacts a membrane and/or prevents flow from slits 1413 inside of flange 1419 to the inlet opening 1148 of the regulating chamber. Alternatively or additionally, a fluid inlet may be in communication with an inlet of the fluid restrictor. For example, fluid inlet 1414 is in communication with inlet 811. Optionally, flange 1419 contacts a membrane and/or prevents communication between slits 1414 outside of flange 1419 to the surface of the membrane that is inside flange 1419. Alternatively or additionally, a single fluid inlet may supply both pressure communication to a membrane and flow to a fluid inlet. For example, there may be flow across flange 1419 allowing fluid to apply pressure to membrane 552 and/or continue flowing into inlet 811. For example flange 1419 may be offset inside ledge 1241 allowing flow through inlets 1414 to apply pressure to membrane 552 and flow to inlet 811 (for example as illustrated in FIGS. 16A and 16A').

In some embodiments, some or all of cover 1404 may be made of a special material. For example, some parts may be sized to high tolerance and/or use materials intended for high tolerance molding and/or preferred physical properties such as strength and/or flexibility. For example, wall 1424 may be made to fit properly core 1226. For example, other parts that are not part of the section 1225 may be configured to have other properties. For example, extensions 1430 may incorporate chemicals with special properties (for example chemicals to inhibit growth of algae). Such chemicals may reduce the precision of molding and/or weaken extensions 1430, but in some embodiments these physical properties of extensions 1430 are not as critical as in the restrictor portion 1425.

In some embodiments, an emitter part may include features to facilitate molding of the parts. For example, cover 1404 includes portions 1415 that are designed to withstand pressure from injection molding ejector pins when cover 1404 is ejected from a mold. For example, portions 1415 may be designed without inlet slits and/or with smaller and/or fewer inlet slits than slits 1413 and/or 1414. Optionally, portions 1415 may be used as orientation indicators.

Figure 14B:
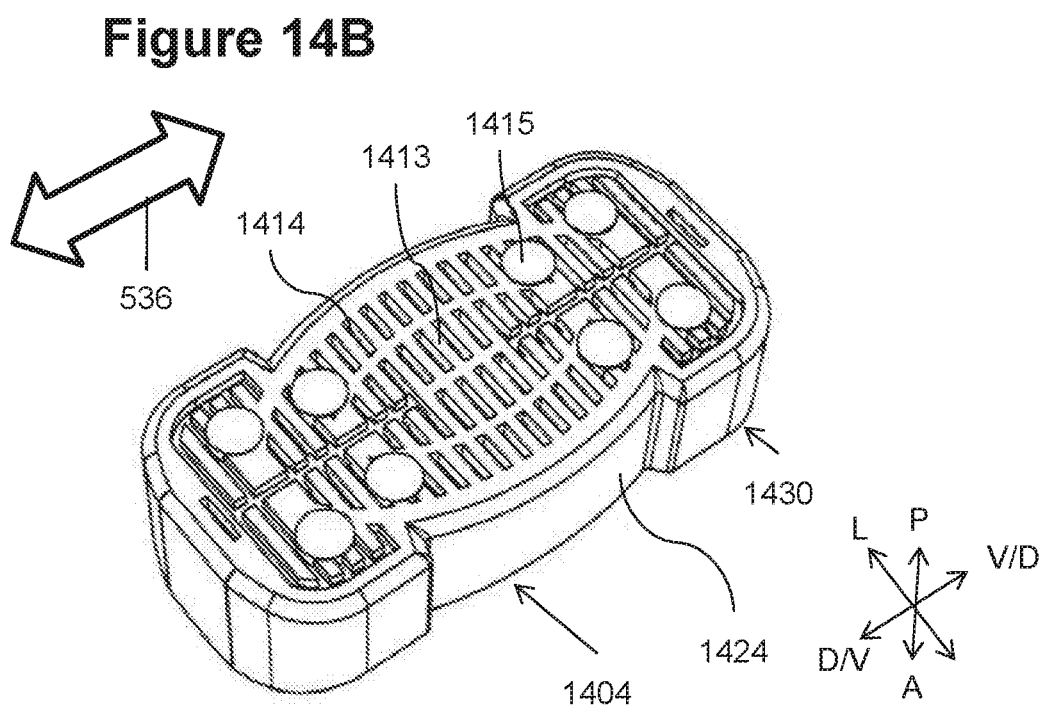
FIG. 14B is an anterior perspective view of an elliptical flow restrictor cover in accordance with an embodiment of the present invention.

FIG. 14B is an anterior perspective view of an elliptical flow restrictor cover in accordance with an embodiment of the present invention.

FIGS. 15A, 15A', 15B, 15C and 15D are orthogonal views of elliptical flow restrictor cover 1404 in accordance with an embodiment of the present invention. Transverse cross section 15B is a transverse cross section cut across line B-B (illustrated in FIG. 15D). Longitudinal cross section 15A is cut across line A-A (illustrated in FIG. 15C). In some embodiments, a bonding zone of a dripper core and/or cover is shaped to fit an inner wall of an irrigation tube. For example, as illustrated in FIG. 15B, the anterior surface 1533 of cover 1404 is arched to fit an inner wall of an irrigation tube. For example, as explained above with respect to surface 1133 in FIGS. 13A and 13B, due to the widening of the bonding surface towards the middle of the length of the dripper, the arched cross section (for example as illustrated in FIG. 15B) of surface 1533 appears as a concave form in the longitudinal cross section (for example as illustrated in FIG. 15A). A 3D perspective view of the shape of the anterior surface 1133 and 1533 is illustrated in FIG. 16C.

FIGS. 16A, 16A' and 16B are orthogonal views of an assembled elliptical flow restrictor in accordance with an embodiment of the present invention. In some embodiments, a face flange may hold a flexible membrane over a regulating chamber. For example, membrane 552 is sandwiched between flange 1419 and ledge 1241. Optionally a flange on a cover may be offset from a face flange on a core. For example, a male face flange may overhang a ledge. Optionally, a flexible membrane may be bent across the interface between opposing flanges (for example like a tongue and groove structure). For example, face flange 1419 on a posterior facing surface of cover 1402 is offset (inward toward the inside of regulating chamber 856) with respect to ledge 1241 on an anterior facing surface of core 1226. Flange 1419 is optionally offset from ledge 1241 in the transverse direction (for example as illustrated in FIG. 16B) and/or the longitudinal direction (for example as illustrated in FIG. 16A).

In some embodiments, a face flange will divide flow regions. For example, flange 1419 may divide between an inner region, where fluid coming through inlets 1413 puts pressure onto membrane 552 regulating flow and an outer region where fluid entering inlets 1414 flows to inlet 811. Alternatively or additionally, flow may pass between the inner and outer regions. For example, flow may pass through openings in the flange and/or between the flange and the membrane. For example, when pressure applied at inlets 1413 causes membrane 552 to bow into chamber 1406, space may be formed between flange 1419 and membrane 552 allowing fluid to flow between the inner and outer regions. Optionally the fluid pressure will keep membrane 552 seated against ledge 1241.

In some embodiments, one or more orientation features will be arrange to facilitate machine handling of parts, for example positioning and/or orientation of a part for assembly and/or positioning in a tube. For example, in the exemplary embodiment of FIG. 16C, markers 1380 are arranged along the central longitudinal axes of core 1226 on the anterior facing face of the outlet chamber 1406. The anterior surface 1433 of section 1425 is optionally arched to fit the inner wall of an irrigation hose, for example the shape of surface 1433 may be similar to surface 1133 of core 1226. The anterior surface 1433 of section 1425 is optionally arched to fit the inner wall of an irrigation hose, for example the shape of surface 1433 may be similar to surface 1133 of core 1226.

Figure 17:
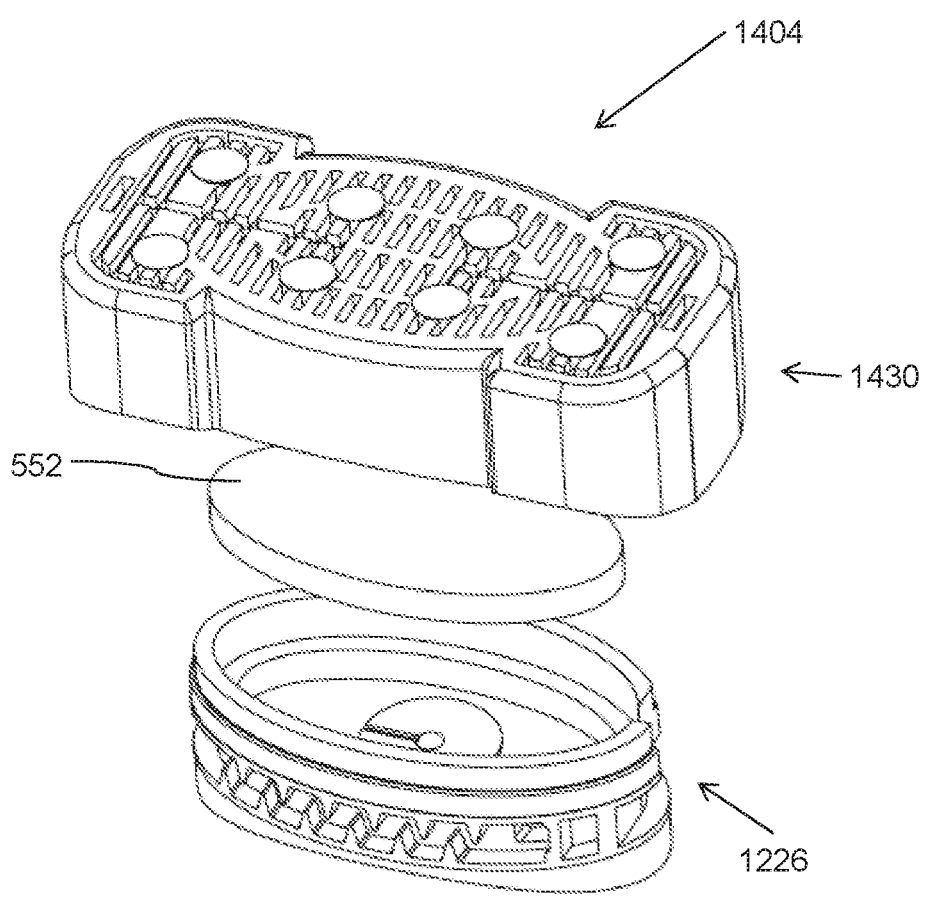
FIG. 17 is an exploded perspective view of an assembled elliptical flow restrictor in accordance with an embodiment of the present invention.

FIG. 17 is an exploded perspective view of an assembled elliptical flow restrictor in accordance with an embodiment of the present invention.

Emitters

Emitters may be divided into various categories. In line emitters may be installed in a conduit during manufacture. On line emitters may be added to a conduit after manufacture. In line emitters may include embedded restrictors. In line emitters include cylindrical insert sleeves that are optionally attached to the entire inner circumference of the conduit and/or at least half of the inner circumference of the conduit and/or opposing points on the inner surface of the conduit. In line emitters may include embedded emitters that may be embedded into the wall of a conduit. For example the majority of the thickness of an embedded emitter may protrude out from the inner passageway of the conduit.

In line drippers may include flat emitters that are attached to a small portion of the inner circumference of the conduit. Such drippers often have an elongated rectangular form. The majority of the thickness of the emitter may protrude into the inner pathway of the conduit. Emitters may be further divided according to whether they include a self contained flow restrictor. A self contained flow restrictor is not dependent on connection to a conduit wall. Conduit dependent flow restrictors may depends on connection to a conduit wall. For example a conduit dependent flow restrictor may include a pressure reducing labyrinth which employs the conduit wall to confine a labyrinth flow restrictor.

Self contained button emitters (sometimes referred to a cylindrical emitters and/or disk emitters) may be used as in line emitters. Self contained button drippers may have significant advantages. For example button drippers may include a labyrinth flow path set between two cylindrical and/or curved surfaces. In some embodiments tight sealing cylindrical and/or curved surfaces can be formed from molded plastic. For example, an initial labyrinth flow path may be formed between two plastic curved surfaces without an expensive flexible membrane and/or gasket. In some embodiments of a button dripper a small flexible membrane may cover only the regulating portion of a flow restrictor. This may save production costs compared to, for example, elongated emitters that in some cases may use a larger membrane to cover and/or seal various portions of the flow restrictor, for example including an initial labyrinth.

The external casing of a button type flow restrictor may optionally be symmetrical about an axis. In some embodiments, button drippers include an outlet that is also symmetrical around the same axis as the flow restrictor. For example, conventional outlets may have a flat and/or dome shape.

In some embodiments, flat or domed button drippers are bonded to the inside of a conduit is by locally deforming the conduit and or embedding the emitter mostly and or entirely into the wall of the conduit.

In some embodiments of the present invention the button dripper may include a coupler including an outlet zone with a vaulted and/or arched profile. The arched profile may not have radial symmetry around the same axis as the button flow restrictor. For example, the outlet zone may be arched to conform to a cylindrical inner surface of a hose.

In some embodiments of the present invention, a self contained button flow restrictor may be joined to a coupler for connection to the wall of a conduit as an in line emitter. The self contained button flow restrictor may optionally produce reliable flow without being sensitive to the quality and/or depth of bonding to a conduit. The coupler may optionally include a surface that facilitates alignment and/or bonding to a conduit wall and/or produces an outlet zone that is suited to perforation by automated machinery. The coupler may optionally bond to the wall without significantly changing the external properties of the conduit.

In some embodiments the fluid outlet of the coupler may be shaped to match the inside curvature of the conduit wall. For example, the fluid outlet may include a rim and/or a periphery and/or a bonding surface arched to lie on a virtual cylindrical surface. The virtual surface may match the inner cylindrical surface of the conduit. Optionally the coupler surface may bond to less than less than half of the circumference of the conduit. Optionally, fitting the outlet to the curvature of the conduit may allow a larger outlet zone and/or bonding surface with less disturbance to the external properties of the conduit.

In some embodiments an irrigation hose may include a plurality of in hose drip emitters. Optionally, the hose may retain flexibility (for example the bonding zone may be configured so as to not constitute a large inflexible zone). Optionally, the hose may retain a smooth outer geometry, allowing it to be handled and/or stored like conventional hoses. For example the hose may bend enough to be rolled in a standard manner.

Some embodiment of the current invention may include a two part labyrinth. Optionally baffles on each part of a two part labyrinth may be oriented in a single direction. In some embodiments, when assembled together two relatively simple parts may provide a winding labyrinth of baffles having different orientations.

Some embodiments of a flow restrictor may be designed to facilitate production. For example a labyrinth flow path may be formed having baffles of differing orientations with easily molded parts wherein on a given part, feature have similar orientation and/or a labyrinth path may be molded on two sides of a piece having orientation to assist in mold removal.

The two part labyrinth may optionally be confined between two parts, for example body having a cylindrical outer surface and a cover having a cylindrical inner cavity.

Optionally intervening baffles on the two parts may form a winding fluid pathway. The fluid pathway may optionally circle the cylindrical surface. The fluid pathway may optionally wind along the cylindrical surface.

Alternatively or additionally, the cylindrical surface may include a conical portion and/or an irregular convex portion. For the sake of the description herein, cylindrical may include for example a truncated cone having an aperture of 0-10°. Optionally the directrix of the cylinder may not be circular.

Caveats

It is expected that during the life of a patent maturing from this application many relevant technologies will be developed and the scope of the terms are intended to include all such new technologies a priori.

As used herein the term "about" refers to ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A drip emitter comprising:
    A) a cover including:
        i) a cavity having a first end, a second end and a side wall having a curved inner surface and a cross section of said cavity having a long axis and a short axis,
        ii) a fluid inlet
    B) a flexible membrane and
    C) a core formed as a non-circular cross section fitting into said cavity including;
        i) a fluid outlet chamber, said fluid outlet chamber having an open face directed toward a first end of said core, a perimeter of said open face suitable for bonding to an inner surface of a conduit over less than the circumference thereof with a long axis of said non-circular cross section directed substantially parallel to the main flow direction in said conduit;
        ii) a regulating chamber having an open face directed towards a second end of said core opposite said first end, said regulating chamber in fluid communication with said fluid outlet chamber, wherein the flexible membrane closes said open face of the regulating chamber;
        iii) and at least two open faced labyrinth flow channels separated from each other, each of the two open-faced labyrinth flow channels at least partially configured on at least one respective long side of an outer curved surface of said core,
        wherein when said core is fit into said cavity, each said labyrinth flow channel provides fluid communication between said fluid inlet of said cover and an opening of said regulating chamber, and
        wherein a divider is configured within at least one of said at least two labyrinth flow channels, the divider configured to prevent shortcut flow between the fluid inlet and the opening to the regulating chamber.

2. The drip emitter of claim 1, where said cross section of said core is elliptical.

3. A drip irrigation system comprising a plurality of drip emitters according to claim 1 attached to an inner surface of an irrigation tube, the irrigation tube including a plurality of openings, each said opening surrounded by said perimeter of said outlet chamber of a respective emitter of said plurality of drip emitters.

4. The drip emitter of claim 1, wherein said core fits into said cover in more than one orientation.

5. The drip emitter of claim 4, where said more than one orientation include a first orientation and a second orientation rotated 180 degrees around a main axis of said core with respect to said first orientation.

6. The drip emitter of claim 5, wherein said core is not symmetric along at least one of a long axis of said non-circular cross section and a short axis of said-circular cross section.

7. The drip emitter of claim 2, wherein a ratio of said long axis and short axis is at least 1.1 to 1.

* * * * *